(12) United States Patent
Polleri et al.

(10) Patent No.: US 11,625,648 B2
(45) Date of Patent: Apr. 11, 2023

(54) TECHNIQUES FOR ADAPTIVE PIPELINING COMPOSITION FOR MACHINE LEARNING (ML)

(71) Applicant: Oracle International Corporation, Redwood Shores, CA (US)

(72) Inventors: Alberto Polleri, London (GB); Larissa Cristina Dos Santos Romualdo Suzuki, Wokingham (GB); Sergio Aldea Lopez, London (GB); Marc Michiel Bron, London (GB); Dan David Golding, London (GB); Alexander Ioannides, London (GB); Maria del Rosario Mestre, London (GB); Hugo Alexandre Pereira Monteiro, London (GB); Oleg Gennadievich Shevelev, London (GB); Xiaoxue Zhao, London (GB); Matthew Charles Rowe, Milton Keynes (GB)

(73) Assignee: Oracle International Corporation, Redwood Shores (CA)

( * ) Notice: Subject to any disclaimer, the term of this patent is extended or adjusted under 35 U.S.C. 154(b) by 373 days.

(21) Appl. No.: 16/892,935

(22) Filed: Jun. 4, 2020

(65) Prior Publication Data
US 2021/0081848 A1 Mar. 18, 2021

Related U.S. Application Data

(60) Provisional application No. 62/900,537, filed on Sep. 14, 2019.

(51) Int. Cl.
*G06N 20/20* (2019.01)
*G06N 5/00* (2023.01)
(Continued)

(52) U.S. Cl.
CPC ............... *G06N 20/20* (2019.01); *G06F 8/75* (2013.01); *G06F 8/77* (2013.01); *G06F 11/3003* (2013.01);
(Continued)

(58) Field of Classification Search
CPC ...................................................... G06N 20/20
See application file for complete search history.

(56) References Cited

U.S. PATENT DOCUMENTS

| 5,343,527 A | 8/1994 | Moore |
| 5,699,507 A | 12/1997 | Goodnow, II et al. |

(Continued)

FOREIGN PATENT DOCUMENTS

| CN | 101782976 | 7/2010 |
| WO | 2018111270 | 6/2018 |

(Continued)

OTHER PUBLICATIONS

Sacha, et al., VIS4ML: An Ontology for Visual Analytics Assisted Machine Learning, IEEE Transactions on Visualization and Computer Graphics, vol. 25, No. 1, pp. 385-395, Jan. 1, 2019.

(Continued)

*Primary Examiner* — Shirley X Zhang
(74) *Attorney, Agent, or Firm* — Kilpatrick, Townsend & Stockton, LLP

(57) ABSTRACT

The present disclosure relates to systems and methods for an adaptive pipelining composition service that can identify and incorporate one or more new models into the machine learning application. The machine learning application with the new model can be tested off-line with the results being compared with ground truth data. If the machine learning application with the new model outperforms the previously used model, the machine learning application can be upgraded and auto-promoted to production. One or more (Continued)

parameters may also be discovered. The new parameters may be incorporated into the existing model in an off-line mode. The machine learning application with the new parameters can be tested off-line and the results can be compared with previous results with existing parameters. If the new parameters outperform the existing parameters as compared with ground-truth data, the machine learning application can be auto-promoted to production.

20 Claims, 22 Drawing Sheets

(51) Int. Cl.
    *G06F 16/36*     (2019.01)
    *G06N 20/00*     (2019.01)
    *G06F 16/901*     (2019.01)
    *G06F 11/34*     (2006.01)
    *G06F 16/907*     (2019.01)
    *G06F 16/9035*     (2019.01)
    *G06F 8/75*     (2018.01)
    *G06F 8/77*     (2018.01)
    *G06N 5/025*     (2023.01)
    *G06F 16/28*     (2019.01)
    *G06F 16/21*     (2019.01)
    *G06F 16/2457*     (2019.01)
    *H04L 9/08*     (2006.01)
    *H04L 9/32*     (2006.01)
    *G06K 9/62*     (2022.01)
    *G06F 16/23*     (2019.01)
    *G06F 11/30*     (2006.01)

(52) U.S. Cl.
    CPC ...... *G06F 11/3409* (2013.01); *G06F 11/3433* (2013.01); *G06F 11/3452* (2013.01); *G06F 11/3466* (2013.01); *G06F 16/211* (2019.01); *G06F 16/2365* (2019.01); *G06F 16/24573* (2019.01); *G06F 16/24578* (2019.01); *G06F 16/285* (2019.01); *G06F 16/367* (2019.01); *G06F 16/907* (2019.01); *G06F 16/9024* (2019.01); *G06F 16/9035* (2019.01); *G06K 9/6231* (2013.01); *G06K 9/6232* (2013.01); *G06K 9/6259* (2013.01); *G06K 9/6298* (2013.01); *G06N 5/003* (2013.01); *G06N 5/025* (2013.01); *G06N 20/00* (2019.01); *H04L 9/088* (2013.01); *H04L 9/3236* (2013.01)

(56) References Cited

U.S. PATENT DOCUMENTS

| | | | |
|---|---|---|---|
| 9,306,738 | B2 | 4/2016 | Loftus et al. |
| 9,384,450 | B1 | 7/2016 | Cordes et al. |
| 10,198,399 | B1 | 2/2019 | Fritchman et al. |
| 10,417,577 | B2 | 9/2019 | Bowers et al. |
| 10,657,447 | B1* | 5/2020 | McDonnell .............. G06N 3/04 |
| 11,238,377 | B2 | 2/2022 | Polleri et al. |
| 2004/0006761 | A1 | 1/2004 | Anand et al. |
| 2005/0102227 | A1 | 5/2005 | Solonchev |
| 2007/0043734 | A1 | 2/2007 | Cannon et al. |
| 2007/0239630 | A1 | 10/2007 | Davis et al. |
| 2009/0144698 | A1 | 6/2009 | Fanning et al. |
| 2014/0180738 | A1 | 6/2014 | Phillipps et al. |
| 2015/0170053 | A1 | 6/2015 | Miao |
| 2016/0055426 | A1 | 2/2016 | Aminzadeh et al. |
| 2016/0110657 | A1 | 4/2016 | Gibiansky et al. |
| 2016/0179063 | A1 | 6/2016 | De Baynast De Septfontaines et al. |
| 2016/0358099 | A1 | 12/2016 | Sturlaugson et al. |
| 2017/0061021 | A1 | 3/2017 | Royzner |
| 2017/0277693 | A1 | 9/2017 | Mehedy et al. |
| 2018/0052824 | A1 | 2/2018 | Ferrydiansyah et al. |
| 2018/0089593 | A1 | 3/2018 | Patel et al. |
| 2018/0314250 | A1 | 11/2018 | Lewis et al. |
| 2018/0314926 | A1 | 11/2018 | Schwartz et al. |
| 2018/0314936 | A1 | 11/2018 | Barik et al. |
| 2018/0322365 | A1 | 11/2018 | Yehezkel Rohekar |
| 2018/0322387 | A1 | 11/2018 | Sridharan et al. |
| 2018/0322403 | A1 | 11/2018 | Ron et al. |
| 2018/0222776 | A1 | 12/2018 | MacCartney et al. |
| 2018/0349447 | A1 | 12/2018 | Maccartney et al. |
| 2018/0349499 | A1 | 12/2018 | Pawar et al. |
| 2019/0108417 | A1 | 4/2019 | Talagala et al. |
| 2019/0163758 | A1 | 5/2019 | Zhivotvorev et al. |
| 2019/0228261 | A1* | 7/2019 | Chan .................. G06F 8/36 |
| 2019/0279114 | A1 | 9/2019 | Deshpande et al. |
| 2019/0317805 | A1 | 10/2019 | Metsch et al. |
| 2019/0334716 | A1 | 10/2019 | Kocsis et al. |
| 2020/0081899 | A1 | 3/2020 | Shapur et al. |
| 2020/0333772 | A1 | 10/2020 | Srivastava et al. |
| 2020/0410011 | A1 | 12/2020 | Shi et al. |
| 2021/0081720 | A1* | 3/2021 | Polleri .................. G06F 8/75 |
| 2021/0081819 | A1* | 3/2021 | Polleri .................. G06N 5/046 |
| 2021/0081837 | A1* | 3/2021 | Polleri .................. G06N 20/00 |
| 2021/0133670 | A1 | 5/2021 | Cella et al. |

FOREIGN PATENT DOCUMENTS

| | | |
|---|---|---|
| WO | 2018217635 | 11/2018 |
| WO | 2018222776 | 12/2018 |
| WO | 2019236894 | 12/2019 |

OTHER PUBLICATIONS

International Application No. PCT/US2020/049429, International Search Report and Written Opinion dated Nov. 27, 2020, 14 pages.
International Application No. PCT/US2020/049500, International Search Report and Written Opinion dated Nov. 27, 2020, 13 pages.
International Application No. PCT/US2020/050600, International Search Report and Written Opinion dated Nov. 27, 2020, 13 pages.
U.S. Appl. No. 17/019,255, Notice of Allow ance dated Nov. 2, 2021, 9 pages.
U.S. Appl. No. 16/893,073, Non-Final Office Action dated Dec. 20, 2021, 13 pages.
U.S. Appl. No. 16/892,724, Non-Final Office Action dated May 5, 2022, 12 pages.
U.S. Appl. No. 16/893,193, First Action Interview Pilot Program Pre-Interview Communication dated Jun. 8, 2022, 6 pages.
Amazon SageMaker, Available Online at https://aws.amazon.com/sagemaker/, Accessed from Internet on: Sep. 17, 2020, 13 pages.
AutoKeras, Available Online at https://autokeras.com/, Accessed from Internet on: Sep. 17, 2020, 3 pages.
Cloud AutoML, Google Cloud, Available Online at https://cloud.google.com/automl/, Accessed from Internet on: Sep. 17, 2020, 3 pages.
Datarobot Flagship Product, "Empowering the Human Heroes of the Intelligence Revolution", Robot, Available Online at https://www.datarobot.com/, 2020, 7 pages.
File Encryption and Decryption Using Python, Eduonix Blog, Available Online at https://blog.eduonix.com/software-development/file-encryption-decryption-using-python/, Novembers, 2018, 11 pages.
H20 Driverless AI, Open Source Leader in AI and ML, Available Online at https://www.h2o.ai/products/h2o-driverless-ai/, Accessed from Internet on: Sep. 17, 2020, 12 pages.
Home—Welcome to Mlbox's Official Documentation, MLBox, Machine Learning Box Available Online at https://mlbox.readthedocs.io/en/latest/, Accessed from Internet on: Sep. 17, 2020, 2 pages.
Overview of Kubeflow Pipelines, Kubeflow, Available Online at https://www.kubeflow.org/docs/pipelines/overview/pipelines-overview/, last modified Mar. 8, 2020, Accessed from Internet on: Sep. 17, 2020, 7 pages.
PurePredictive, Available Online at https://www.purepredictive.com/, Accessed from Internet on: Sep. 17, 2020, 3 pages.

(56) References Cited

OTHER PUBLICATIONS

SecML: A Library for Secure and Explainable Machine Learning, Released Aug. 6, 2020, Available Online at https://pypi.org/project/secml/, 8 pages.
Set Up Authentication for Azure Machine Learning Resources and Workflows, Azure Machine Learning | Microsoft Docs, Available Online at https://docs.microsoft.com/en-us/azure/machine-learning/how-to-setup-authentication, Jun. 17, 2020, 13 pages.
Tensor flow, The TFX User Guide, Available Online at https://www.tensorflow.org/tfx/guide, Accessed from Internet on: Sep. 17, 2020, 17 pages.
The ModelValidator TFX Pipeline Component (Deprecated), TensorFlow, Last updated Jul. 8, 2020, Available Online at https://www.tensorflow.org/tfx/guide/modelval, Accessed from Internet on: Sep. 17, 2020, 2 pages.
TPOT Automated Machine Learning in Python, Available Online at http://epistasislab.github.io/tpot/, 3 pages.
Track Model Metrics and Deploy ML Models with MLflow and Azure Machine Learning (Preview), Microsoft Docs, Available Online at https://docs.microsoft.com/en-us/azure/machine-learning/how-to-use-mlflow, Jun. 4, 2020, 13 pages.
TransmogrifAI, Available Online at https://transmogrif.ai/, Accessed from Internet on: Sep. 17, 2020, 4 pages.
Using TPOT, Available Online at http://epistasislab.github.io/tpot/using/#crashfreeze-issue-with-n_jobs-1-under-osx-or-linux, 10 pages.
Waymo: Automated Model Selection for Self-Driving Vehicles, Available Online at https://waymo.com/, Accessed from Internet on: Sep. 17, 2020, 5 pages.
What is Automated Machine Learning (AutoML)?, Microsoft Docs, Available Online at https://docs.microsoft.com/en-us/azure/machine-learning/concept-automated-ml, Apr. 22, 2020, 13 pages.
Xpanse AI, The power of AI at the click of a button. Automated Data Science, Available Online at https://xpanse.ai/, Accessed from Internet on: Sep. 17, 2020, 4 pages.
Abrams, Machine Learning Model Pipelines: Part I, Hacker Noon, Available Online at https://hackernoon.com/machine-learning-model-pipelines-part-i-e138b7a7c1ef, Aug. 29, 2018, 10 pages.
Altunay et al., Generate Machine Learning Model Pipelines to Choose the Best Model for Your Problem, AutoAI, IBM Developer, Available Online at https://developer.ibm.com/tutorials/generate-machine-learning-model-pipelines-to-choose-the-best-model-for-your-problem-autoai/, Aug. 19, 2019, 11 pages.
Gordon, AI & Security Innovations Help Developers Preserve Privacy While Delivering Insight, Available Online at https://software.intel.com/content/www/us/en/develop/articles/ai-security-innovations-help-developers-preserve-privacy-while-delivering-insight.html, Jun. 18, 2019, 6 pages.
Jarmul; Katharine, "Privacy Attacks on Machine Learning Models", Virtual Event, InfoQLive: Delivering Technology Through Software Engineering Leadership, Sep. 23, 2020. Available Online at https://www.infoq.com/articles/privacy-attacks-machine-learning-models/, Accessed from Internet on: Sep. 16, 2020, 7 pages.
Lariffle, OpenMined/PySyft, GitHub—OpenMined/PySyft: A library for answering questions using data you cannot see, Available Online at https://github.com/OpenMined/PySyft, Accessed from Internet on: Sep. 16, 2020, 7 pages.
Lokuciejewski et al., Automatic Selection of Machine Learning Models for Compiler Heuristic Generation, Available Online at https://www.semanticscholar.org/paper/Automatic-Selection-of-Machine-Learning-Models-for-Lokuciejewski-Stolpe/5f4d110827f0e43eec77f6b78f02acd8550cc8b9?p2df, 2013, 15 pages.
Luo, A Review of Automatic Selection Methods for Machine Learning Algorithms and Hyper-Parameter Values, Network Modeling Analysis in Health Informatics and Bioinformatics, vol. 5, No. 18, May 23, 2016, pp. 1-16.
Mohr et al., Towards the Automated Composition of Machine Learning Services, 2018 IEEE International Conference on Services Computing (SCC), 2018, pp. 241-244.
Neustadter, Why AI Needs Security, Available Online at https://www.synopsys.com/designware-ip/technical-bulletin/why-ai-needs-security-dwtb-q318.html, Accessed from Internet on: Sep. 16, 2020, 9 pages.
Pathak, TPOT in Python, DataCamp, Available Online at https://www.datacamp.com/community/tutorials/tpot-machine-learning-python, Sep. 21, 2018, 18 pages.
Sparks et al., KeystoneML: Optimizing Pipelines for Large-Scale Advanced Analytics, 2017 IEEE 33rd International Conference on Data Engineering (ICDE), Apr. 2017, pp. 1-15.
Xu et al., CryptoNN: Training Neural Networks over Encrypted Data, Available Online at http://www.lichao.work/files/2019-C-ICDCS.pdf, Apr. 15, 2019, 11 pages.
Zoller et al., Benchmark and Survey of Automated Machine Learning Frameworks, Journal of Artificial Intelligence Research 1, 1993, pp. 1-65.
U.S. Appl. No. 16/892,724, Notice of Allowability dated Sep. 28, 2022, 6 pages.
U.S. Appl. No. 16/893,193, Notice of Allowance dated Sep. 16, 2022, 15 pages.

\* cited by examiner

TECHNIQUES FOR ADAPTIVE PIPELINING COMPOSITION FOR MACHINE LEARNING (ML)

CROSS-REFERENCE TO RELATED APPLICATIONS

This application claims priority of U.S. Provisional Patent Application No. 62/900,537 filed Sep. 14, 2019, entitled "AUTOMATED MACHINE LEARNING SYSTEMS AND METHODS", which is hereby incorporated by reference in its entirety and for all purposes.

FIELD

The present disclosure relates to systems and techniques for machine learning. More particularly, the present disclosure relates to systems and techniques for generating and managing a library of machine learning applications.

BACKGROUND

Machine learning has a wide range of applications, such as search engines, medical diagnosis, text and handwriting recognition, image processing and recognition, load forecasting, marketing and sales diagnosis, chatbots, autonomous driving, and the like. Various types and versions of machine learning models may be generated for similar applications using training data based on different technologies, languages, libraries, and the like, and thus may lack interoperability. In addition, different models may have different performances in different contexts and/or for different types of input data. Data scientists may not have the programming skills to generate the code necessary to build custom machine learning models. In addition, available machine learning tools do not store the various machine learning model components as part of a library to allow for efficient reuse of routines in other machine learning models.

Existing machine learning applications can require considerable programming knowledge by a data scientist to design and construct a machine learning application to solve specific problems. Intuitive interfaces can assist the data scientist construct a machine learning application through a series of queries.

Some organizations can store data from multiple clients or suppliers with customizable schemas. These customizable schemas may not match standardized data storage schemas used by existing machine learning models. Therefore, these other systems would need to perform a reconciliation process prior to using the stored data. The reconciliation process can be either a manual process or through a tedious extract, transform, load automated process prior to using the data for generating machine learning applications.

Machine learning applications based only on metrics (e.g., Quality of Service (QoS) or Key Performance Indicators) may not be sufficient to compose pipelines with minimal human intervention for a self-adaptive architecture. Pre-existing machine learning tools do not combine non-logical based and logic-based semantic services to generate a machine learning application.

Existing machine learning tools tend to maximize classification accuracy over new data from the same source. In doing so, these existing frameworks attempt to compose the best pipeline based on model performance. However, model performance on its own does not cover the cases where the pipeline must be adapted at run-time due to changes in online data metrics or QoS violations.

BRIEF SUMMARY

Certain aspects and features of the present disclosure relate to machine learning platform that generates a library of components to generate machine learning models and machine learning applications. The machine learning infrastructure system allows a user (i.e., a data scientist) to generate machine learning applications without having detailed knowledge of the cloud-based network infrastructure or knowledge of how to generate code for building the model. The machine learning platform can analyze the identified data and the user provided desired prediction and performance characteristics to select one or more library components and associated API to generate a machine learning application. The machine learning techniques can monitor and evaluate the outputs of the machine learning model to allow for feedback and adjustments to the model. The machine learning application can be trained, tested, and compiled for export as stand-alone executable code.

The machine learning platform can generate and store one or more library components that can be used for other machine learning applications. The machine learning platform can allow users to generate a profile which allows the platform to make recommendations based on a user's historical preferences. The model creation engine can detect the number and type of infrastructure resources necessary to achieve the desired results within the desired performance criteria.

A chatbot can provide an intuitive interface to allow the data scientist to generate a machine learning application without considerable programming experience. A chatbot is able to translate natural language into a structured representation of a machine learning solution using a conversational interface. A chatbot can be used to indicate the location of data, select a type of machine learning solution, display optimal solutions that best meet the constraints, and recommend the best environment to deploy the solution.

A self-adjusting corporation-wide discovery and integration feature can review a client's data store, review the labels for the various data schema, and effectively map the client's data schema to classifications used by the machine learning model. The various techniques can automatically select the features that are predictive for each individual use case (i.e., one client), effectively making a machine learning solution client-agnostic for the application developer. A weighted list of common representations of each feature for a particular machine learning solution can be generated and stored. When new data is added to the data store, a matching service can automatically detect which features should be fed into the machine-learning solution based at least in part on the weighted list. The weighted list can be updated as new data is made available to the model.

Existing data ontologies can be used for generating machine learning solutions for a high-precision search of relevant services to compose pipelines with minimal human intervention. Data ontologies can be used to create a combination of non-logic based and logic-based sematic services that can significantly outperform both kinds of selection in terms of precision. QoS and product KPI constraints can be used as part of architecture selection. For data sets without existing ontologies, one or more ontologies be generated.

The proposed system can use best available models at the time of construction to solve problems using the machine learning application. An adaptive pipelining composition service can identify and incorporate one or more new models into the machine learning application. The machine learning application with the new model can be tested off-line with the results being compared with ground truth data. If the machine learning application with the new model outperforms the previously used model, the machine learning application can be upgraded and auto-promoted to production. One or more parameters may also be discovered. The new parameters may be incorporated into the existing model in an off-line mode. The machine learning application with the new parameters can be tested off-line and the results can be compared with previous results with existing parameters. If the new parameters outperform the existing parameters as compared with ground-truth data, the machine learning application can be auto-promoted to production.

These and other embodiments are described in detail below. For example, other embodiments are directed to systems, devices, and computer readable media associated with methods described herein.

A better understanding of the nature and advantages of embodiments of the present disclosed may be gained with reference to the following detailed description and the accompanying drawings.

BRIEF DESCRIPTION OF THE DRAWINGS

The specification makes reference to the following appended figures, in which use of like reference numerals in different figures is intended to illustrate like or analogous components.

FIG. 11 illustrates an exemplary flow chart for a real time code analysis plug-in.

DETAILED DESCRIPTION

Certain embodiments of the present disclosure relate to systems, devices, computer-readable medium, and computer-implemented methods for implementing various techniques for machine learning. The machine learning techniques can allow a user (i.e., a data scientist) to generate machine learning applications without having detailed knowledge of the cloud-based network infrastructure or knowledge of how to generate code for building the model. The machine learning platform can analyze the identified data and the user provided desired prediction and performance characteristics to select one or more library components and associated API to generate a machine learning application.

The machine learning techniques can employ a chatbot to indicate the location of data, select a type of machine learning solution, display optimal solutions that best meet the constraints, and recommend the best environment to deploy the solution.

The techniques described herein can include a self-adjusting corporation-wide discovery and integration feature can review a client's data store, review the labels for the various data schema, and effectively map the client's data schema to classifications used by the machine learning model. The various techniques can automatically select the features that are predictive for each individual use case (i.e., one client), effectively making a machine learning solution client-agnostic for the application developer. A weighted list of common representations of each feature for a particular machine learning solution can be generated and stored.

The techniques can utilize existing data ontologies for generating machine learning solutions for a high-precision search of relevant services to compose pipelines with minimal human intervention. For data sets without existing ontologies, one or more ontologies be generated.

The techniques can employ an adaptive pipelining composition service to identify and incorporate or more new models into the machine learning application. The machine learning application with the new model can be tested off-line with the results being compared with ground truth data. If the machine learning application with the new model outperforms the previously used model, the machine learning application can be upgraded and auto-promoted to production.

I. Machine Learning Infrastructure Platform

Figure 1:
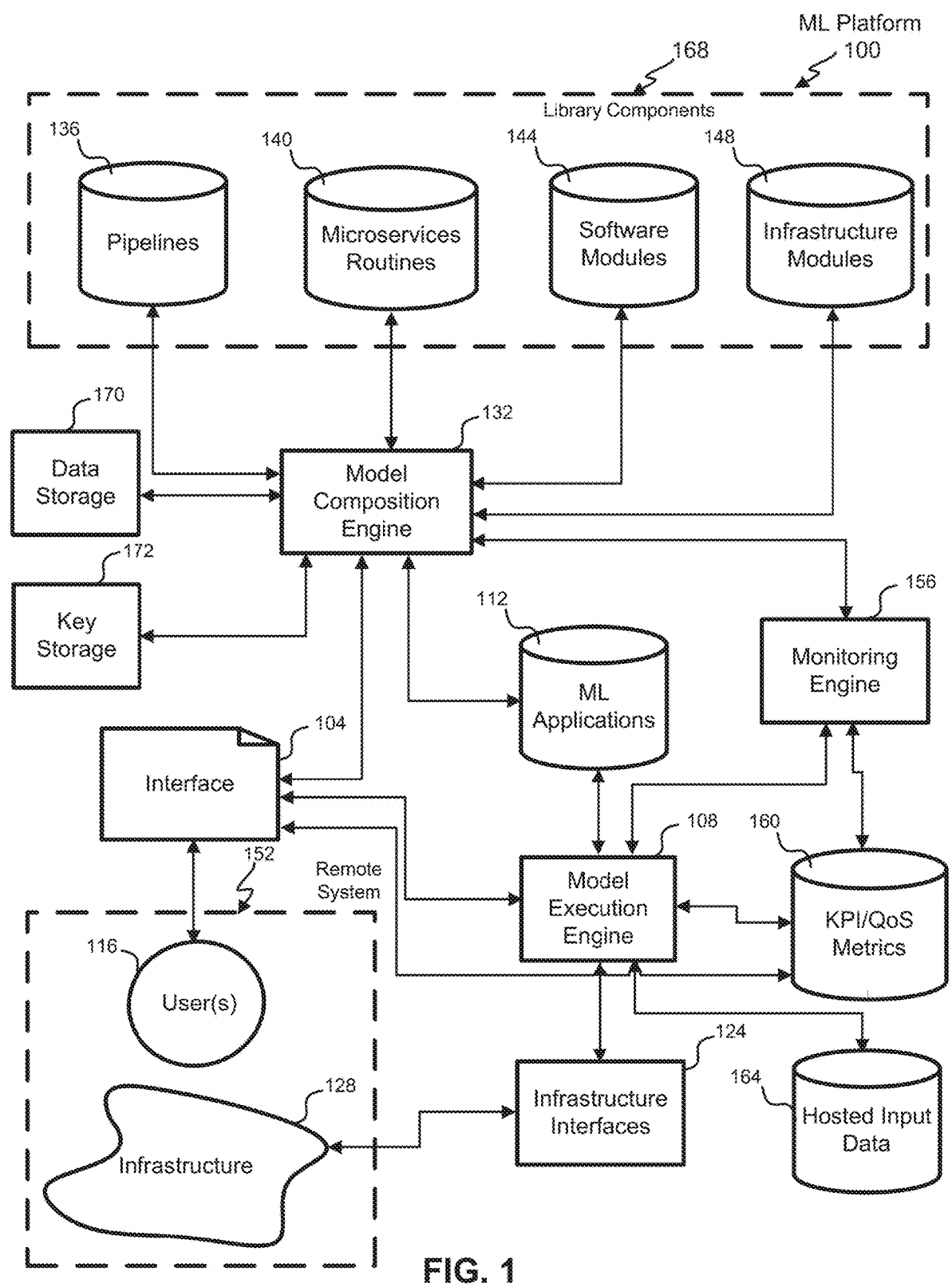
FIG. 1 is a block diagram illustrating an exemplary machine learning infrastructure system.

FIG. 1 is a block diagram illustrating an exemplary machine learning platform 100 for generating a machine learning model. The machine learning platform 100 has various components that can be distributed between different networks and computing systems. A machine learning infrastructure library can store one or more components for generating machine learning applications 112. All of the infrastructure required to productionize the machine learning applications 112 can be encapsulated and stored in the library.

Machine learning configuration and interaction with the model composition engine 132 allows for selection of various library components 168 (e.g., pipelines 136 or workflows, micro services routines 140, software modules 144, and infrastructure modules 148) to define implementation of the logic of training and inference to build machine learning applications 112. Different parameters, variables, scaling, settings, etc. for the library components 168 can be specified or determined by the model composition engine 132. The complexity conventionally required to create the machine learning applications 112 can be performed largely automatically with the model composition engine 132.

The library components 168 can be scalable to allows for the definition of multiple environments (e.g., different Kubernetes clusters) where the various portions of the application can be deployed to achieve any Quality of Service (QoS) or Key Performance Indicators (KPIs) specified. A Kubernetes cluster is a set of node machines for running containerized applications. The scalability can hide or abstract the complexity of the machine learning platform 100 from the application developer. A monitoring engine 156 can monitor operation of the machine learning applications 112 according to the KPI/QoS metrics 160 to assure the machine learning application 112 is performing according to requirements. In addition the monitoring engine 156 can seamlessly test end-to-end a new or evolving machine learning application at different scales, settings, loading, settings, etc. The monitoring engine 156 can recommend various adjustments to the machine learning application 112 by signaling needed changes to the model composition engine 132.

To address scalability in some embodiments, the machine learning platform 100 creates infrastructure, which is based on a micro services architecture, making it robust and scalable. For example, various micro services routines 140 and infrastructure modules 148 can be configured and customized for embedding into the machine learning application 112. The machine learning platform 100 can allow a developer to define the amount of resources (e.g. CPU, memory) needed for different library components 168 of the machine learning application 112.

The machine learning platform 100 can generate highly customizable applications. The library components 168 contain a set of predefined, off-the-shelf workflows or pipelines 136, which the application developer can incorporate into a new machine learning application 112. A workflow specifies various micro services routines 140, software modules 144 and/or infrastructure modules 148 configured in a particular way for a type or class of problem. In addition to this, it is also possible to define new workflows or pipelines 136 by re-using the library components or changing an existing workflow or pipeline 136. The infrastructure modules 148 can also include services such as data gathering, process monitoring, and logging.

A model composition engine 132 can be executed on one or more computing systems (e.g., infrastructure 128). The model composition engine 132 can receive inputs from a user 116 through an interface 104. The interface 104 can include various graphical user interfaces with various menus and user selectable elements. The interface 104 can include a chatbot (e.g., a text based or voice based interface). The user 116 can interact with the interface 104 to identify one or more of: a location of data, a desired prediction of machine learning application, and various performance metrics for the machine learning model. The model composition engine 132 can interface with library components 168 to identify various pipelines 136, micro service routines 140, software modules 144, and infrastructure models 148 that can be used in the creation of the machine learning model 112.

The model composition engine 132 can output one or more machine learning applications 112. The machine learning applications 112 can be stored locally on a server or in a cloud-based network. The model composition engine 132 can output the machine learning application 112 as executable code that be run on various infrastructure 128 through the infrastructure interfaces 124.

The model execution engine 108 can execute the machine learning application 112 on infrastructure 128 using one or more the infrastructure interfaces 124. The infrastructure 128 can include one or more processors, one or more memories, and one or more network interfaces, one or more buses and control lines that can be used to generate, test, compile, and deploy a machine learning application 112. In various embodiments, the infrastructure 128 can exit on a remote system 152 that is apart from the location of the user 116. The infrastructure 128 can interact with the model execution engine 108 through the infrastructure interfaces 124 The model execution engine 108 can input the performance characteristics (e.g., KPI/QoS metrics storage 160) and the hosted input data 164. The model execution engine 108 can generate one or more results from the machine learning application 112.

The KPI/QoS metrics storage 160 can store one or more metrics that can be used for evaluating the machine learning application 112. The metrics can include inference query metrics, performance metrics, sentiment metrics, and testing metrics. The metrics can be received from a user 116 through a user interface 104.

The monitoring engine 156 can receive the results of the model execution engine 108 and compare the results with the performance characteristics (e.g., KPI/QoS metrics 160). The monitoring engine 156 can use ground truth data to test the machine learning application 112 to ensure the model can perform as intended. The monitoring engine 156 can provide feedback to the model composition engine 132. The feedback can include adjustments to one or more variables or selected machine learning model used in the machine learning model 112.

The library components 168 can include various pipelines 136, micro service routines 140, software modules 144, and infrastructure modules 148. Software pipelines 136 can consist of a sequence of computing processes (e.g., commands, program runs, tasks, threads, procedures, etc.).

Micro services routines 140 can be used in an architectural approach to building applications. As an architectural framework, micro services are distributed and loosely coupled, to allow for changes to one aspect of an application without destroying the entire application. The benefit to using micro services is that development teams can rapidly build new components of applications to meet changing development requirements. Micro service architecture breaks an application down into its core functions. Each function is called a service, and can be built and deployed independently, meaning individual services can function (and fail) without negatively affecting the others. A micro service can be a core function of an application that runs independent of other services. By storing various micro service routines 140, the machine learning platform 100 can generate a machine learning application incrementally by identifying and selecting various different components from the library components 168.

Software modules 144 can include batches of code that form part of a program that contains one or more routines. One or more independently developed modules make up a program. An enterprise-level software application can contain several different software modules 144, and each module can serve unique and separate operations. A module interface can express the elements that are provided and required by the module. The elements defined in the interface can be detectable by other modules. The implementation can contain the working code that corresponds to the elements declared in the interface. Modular programming can be related to structured programming and object-oriented programming, all having the same goal of facilitating construction of large software programs and systems by decomposition into smaller pieces. While the historical usage of these terms has been inconsistent, "modular programming" as used herein refers to high-level decomposition of the code of an entire program into pieces: structured programming to the low-level code use of structured control flow, and object-oriented programming to the data use of objects, a kind of data structure. In object-oriented programming, the use of interfaces as an architectural pattern to construct modules is known as interface-based programming.

Infrastructure modules 148 can include the technology stack necessary to get machine learning algorithms into production in a stable, scalable and reliable way. A technology stack can include set of software subsystems or components needed to create a complete platform such that no additional software is needed to support applications. For example, to develop a web application the architect defines the stack as the target operating system, web server, database, and programming language. Another version of a software stack is operating system, middleware, database, and applications. The components of a software stack can be developed by different developers independently from one another. The stack can extend from the data science tools used to select and train machine learning algorithms down to the hardware those algorithms run on and the databases and message queues from which they draw the datasets.

The machine learning platform 100 can include one or more data storage locations 170. The user can identify the one or more data storage locations 170. The data storage location 170 can be local (e.g., in a storage device electrically connected to the processing circuitry and interfaces used to generate, test, and execute the application). In various embodiments the data storage location 170 can be remote (e.g., accessible through a network such as a Local Area Network or the Internet). In some embodiments, the data storage location 170 can be a cloud-based server.

The data used for the machine learning model 112 often includes personally-identifiable information (PII), and thus, triggers certain safeguards provided by privacy laws. One way to protect the information contained in the data storage 170 can be to encrypt the data using one or more keys. Public-key cryptography, or asymmetric cryptography, is a cryptographic system that uses pairs of keys: public keys which may be disseminated widely, and private keys which are known only to the owner of the data. The private keys can be stored in the key storage 172 module to enable decrypting data for use by the machine learning platform 100.

The model execution engine 108 can use hosted input data 164 to execute and test the machine learning application 112. The hosted input data 164 can include a portion of the data stored at the data storage 170. In various embodiments, a portion of the hosted input data 164 can be identified as testing data.

Figure 2:
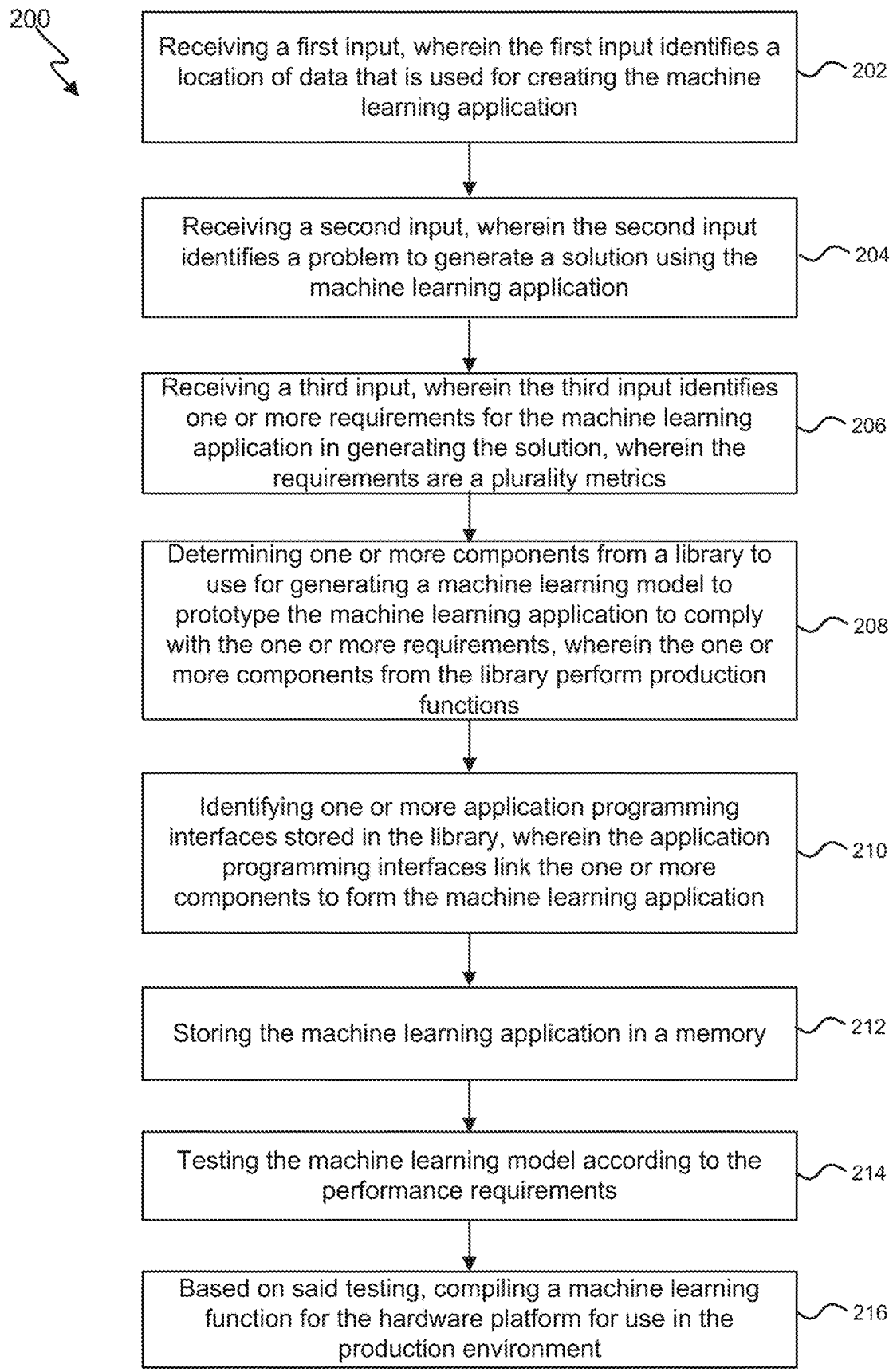
FIG. 2 is a flowchart illustrating an exemplary technique for generating a machine learning application.

FIG. 2 illustrates a process 200 for generating a machine learning application using machine learning library infrastructure. Alternative embodiments may vary in function by combining, separating, or otherwise varying the functionality described in the blocks illustrated in FIG. 2. Means for performing the functionality of one or more of the blocks illustrated in FIG. 2 may comprise hardware and/or software components of a distributed system including computing devices, storage devices, network infrastructure, and servers illustrated in FIGS. 20, 21, and 22 and as described below.

The functionality can include providing user access to a machine learning platform that develops production code bespoke to a hardware platform and user defined requirements. The interface for user access can include a graphical user interface on a touchscreen display, a keyboard, a keypad, a microphone to receive voice instructions, a chatbot, and/or a pointing device (e.g., a mouse, trackball for selecting one or more items in a graphical user interface).

At 202, the functionality can include receiving a first user input identifying a location of data. In various embodiments, the user can use the interface to identify the one or more locations of data that will be used for generating the machine learning model. As described above, the data can be stored locally or remotely. In various embodiments, the user can enter a network location for the data (e.g., Internet Protocol (IP) address). In various embodiments, the user can select a folder from a plurality of folders on a storage device (e.g., a cloud-storage device). In various embodiments, the user can select a file on portable media device (e.g., a USB thumb drive, an optical disk, or solid state or magnetic disk drive). In various embodiments, the technique can suggest a location of data based at least upon a user's previous interactions with the machine learning interface.

At 204, the functionality includes receiving a second user input identifies a problem for which a solution can be generated by the machine learning application. In various embodiments the second user input can specify a type of problem that the user would like to implement machine learning for. In various embodiments, the problem can be identified through input of text via a user interface. In various embodiments, the problems can be entered as native language speech or text (e.g., through the use of a chatbot). The technique can decipher the native language to understand the goals of the machine learning model. Some of types of problems that machine learning can solve can include classification, regression, product recommendations, medical diagnosis, financial analysis, predictive maintenance, image and sound recognition, text recognition, and tabular data analysis. The techniques can recognize one or more keywords in the native language to recommend or select a particular machine learning algorithm.

In various embodiments, a user can select the type of problem through a graphical user interface. The technique can display several generic models available to the user through a graphical user interface. The user can select one of the models by selecting, using a pointing device or touch screen display, one of the model descriptions. In addition to the generic models, additional custom models can be selected and modified to solve the problem received as the second input.

At 206, the functionality includes receiving a third input of one or more performance requirements for the machine learning application. The third input can be entered as native language speech or text (e.g., through the use of a chatbot) or selected via an interface (e.g., a graphical user interface).

The performance requirements can include Quality of Service (QoS) metrics. QoS metrics refer to objective, system-related characteristics that provide insight into the performance of the delivery service at the network/transmission level. QoS metrics are parameters that reflect the quality of service on the sender side, rather than on the application side. Example QoS metrics can include system latency and reliability.

The performance requirements can include one or more Key Performance Indicators (KPI). Key Performance Indicators are measurable values that demonstrate how effectively the model is achieving its objectives. KPIs can be problem/solution specific and can include a measurement of the accuracy of the results of the machine learning application as compared with some ground truth test data.

The third user input can include inference indicators. Inference indicators are words commonly found at the beginning of premises and conclusions. Inference indicators alert the system of the premise or conclusion to follow.

The third user input can include sentiment indicators. A sentiment indicator refers to a graphical or numerical indicator designed to show how a group feels about a condition or state (e.g., market or economy). A sentiment indicator seeks to quantify how current beliefs and positions affect future behavior.

The third user input can include testing metrics. Testing metrics can include a quantitative measure that helps to estimate the progress, quality, and health of a software testing effort. A testing metric defines in quantitative terms the degree to which a system, system component, or process possesses a given attribute. Example testing metrics can include schedule variance, test design efficiency, number of defects per test hour, and fixed defects percentage.

The third user input can include training metrics. The training metrics help evaluate the performance of the model. Example training metrics can include classification accuracy, logarithmic loss, area under curve, F1 Score, mean absolute error, and mean squared error. The accuracy metric is a ratio of the number of correct predictions divided by the number of predictions made. The logarithmic loss metric works by penalizing false classifications. Area Under Curve (AUC) can be used for binary classification problem. AUC of a classifier is equal to the probability that the classifier will rank a randomly chosen positive example higher than a randomly chosen negative example. F1 Score is used to measure a test's accuracy. F1 Score is the Harmonic Mean between precision and recall. The range for F1 Score is [0, 1]. F1 Score can inform the user how precise a classifier is (how many instances it classifies correctly), as well as how robust it is (it does not miss a significant number of instances).

Mean Absolute Error is the average of the difference between the original values and the predicted values. Mean Absolute Error provides a measure of how far the predictions were from the actual output. However, Mean Absolute Error does not provide any idea of the direction of the error i.e., whether the model is under predicting the data or over predicting the data.

Mean Squared Error (MSE) is quite similar to Mean Absolute Error, the only difference being that MSE takes the average of the square of the difference between the original values and the predicted values. The advantage of MSE being that it is easier to compute the gradient, whereas Mean Absolute Error requires complicated linear programming tools to compute the gradient. As the system takes the square of the error, the effect of larger errors become more pronounced then smaller error, hence the model can now focus more on the larger errors.

The third user input can include Maintainability metrics. Maintainability metrics can be defined as the ease with which a system can be maintained. It is an internal attribute of the system which cannot be measured directly. A solution to this problem is to build models to predict the maintenance process measures from software product measures like cohesion, coupling and complexity.

The third user input can include reusability metrics. Reusability metrics can be used to measure code reuse and reusability. Reusability metrics can be categorized into six types: reuse cost-benefits models, maturity assessment, amount of reuse, failure modes, reusability, and reuse library metrics.

At 208, the functionality includes determining one or more library components to be selected for generating a machine learning model to prototype the machine learning application to comply with the performance requirements. The one or more library components can perform production functions. The library components can comprise at least one of pipelines 136, workflows and micro services routines 140, software modules 144, and infrastructure modules 148 as described above for FIG. 1.

The library components 168 can include metadata that identifies features and functions of each of the library components 168. The technique can determine the one or more library components 168 to select based at least in part on the identified problem received via the second input to achieve the performance metrics of the third input. One or more variables of each of the library components can be adjusted to customize the machine learning model to achieve a solution to the identified problem.

At 210, the functionality can include identifying one or more application programming interfaces stored in the library, wherein the application programming interfaces link the one or more components to form the machine learning application. Application Programming Interfaces (API) can be used to connect the one or more library components to generate a machine learning model.

In various embodiments, the production functions can include at least one of load balancing, fail-over caching, security, test capability, audit function, scalability, predicted performance, training models, predicted power, maintenance, debug function, and reusability. Load balancing refers to the process of distributing a set of tasks over a set of resources (computing units), with the aim of making their overall processing more efficient. Load balancing techniques can optimize the response time for each task, avoiding unevenly overloading compute nodes while other compute nodes are left idle. The primary mechanism for maintaining high system availability is called failover. Under this approach, a failed primary system is replaced by a backup system; that is, processing fails over to the backup system. Many high availability configurations also provide mechanisms for disaster recovery, which is the resumption of system availability when failover mechanisms have been unable to keep the system available. Test capability can address the ease of testing the machine learning application to the desired performance characteristics. Audit function can address the ability the machine learning application can be evaluated against internal controls. Predicted power can refer the percentage of available processing power is required to execute the machine learning application.

After the machine learning model has been generated it can use the training data to training the machine learning model to the desired performance parameters. The training can adjust the one or more variables for the generated model.

At 212, the functionality can include storing the machine learning application in a memory.

At 214, the functionality includes testing the machine learning model according to the performance requirements. After the machine learning model has been generated and trained the technique can be tested by the model execution engine using unseen test data. Test data can be a selected percentage of the training data that is withheld from training the model. Test data can also be a separate set of data. The monitoring engine can determine if the machine learning model meets the Key Performance Indicators/Quality of Service metrics. Feedback from the monitoring engine can be sent to the model composition engine to provide recommendations to revise the machine learning model.

At 216, the functionality includes compiling a machine learning application based upon the machine learning model depending on an outcome from the testing of the machine learning model. After the machine learning model has been training and tested, it can be compiled to output stand-alone executable code.

It should be appreciated that the specific steps illustrated in FIG. 2 provide particular techniques for generating a machine learning application according to various embodiments of the present disclosure. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3:
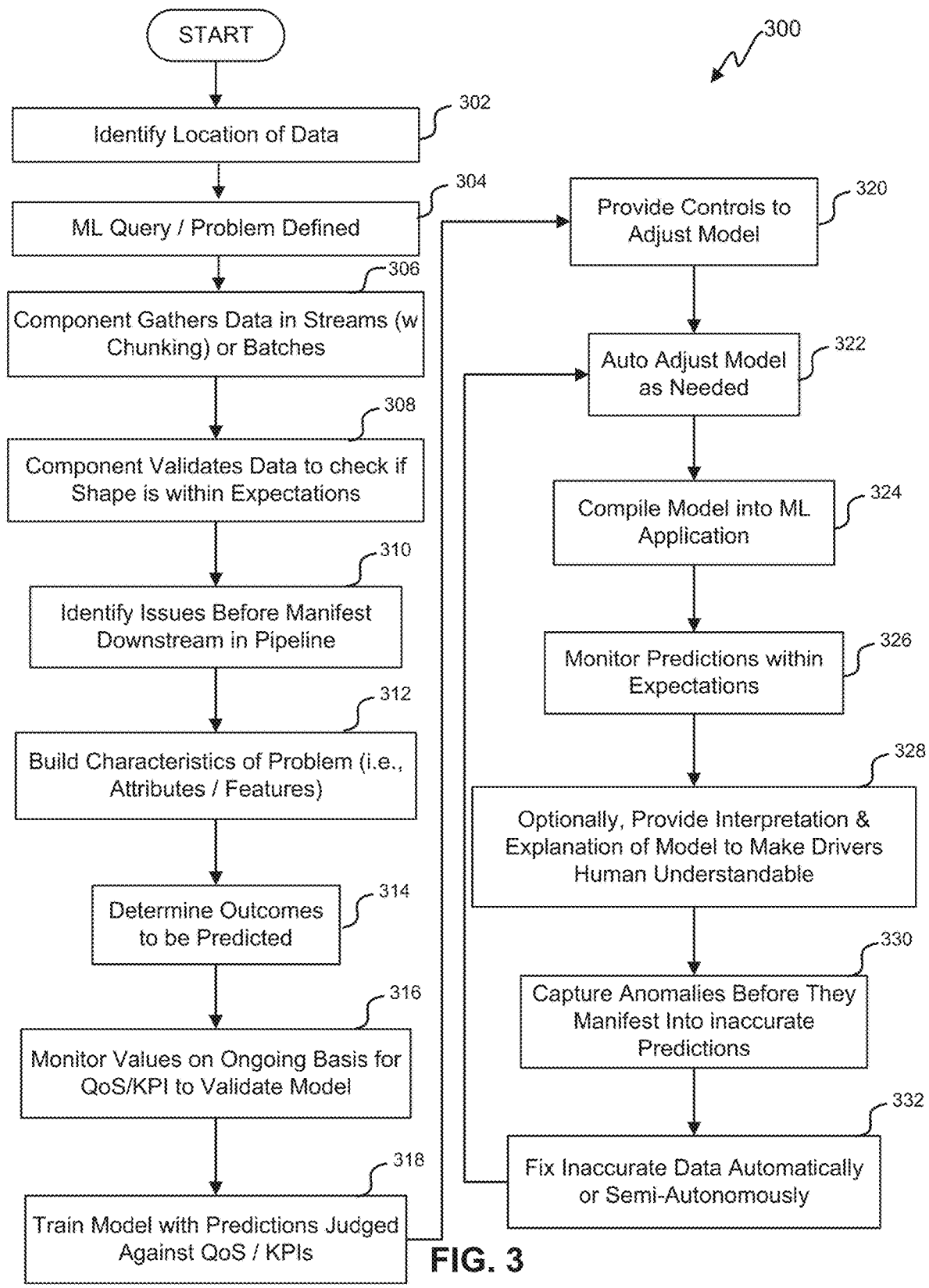
FIG. 3 is a flowchart illustrating another exemplary technique for generating a machine learning application.

FIG. 3 illustrates a process 300 for techniques to generate a machine learning application from a machine learning library infrastructure. Alternative embodiments may vary in function by combining, separating, or otherwise varying the functionality described in the blocks illustrated in FIG. 3. Means for performing the functionality of one or more of the blocks illustrated in FIG. 3 may comprise hardware and/or software components of a distributed system including computing devices, storage devices, network infrastructure, and servers illustrated in FIGS. 20, 21, and 22 and described below.

At 302, the functionality includes receiving a first user input identifying a location of data. In various embodiments, the user can use the interface to identify the location of data that will be used for generating the machine learning model. In various embodiments, the user can enter a network location for the data (e.g., Internet Protocol (IP) address). In various embodiments, the user can select a folder of a plurality of folders on a storage device (e.g., a cloud-storage device). In various embodiments, the user can select a file on portable media e.g., a USB thumb drive, an optical disk, or solid state or magnetic disk drive.

At 304, the functionality includes receiving a second user input regarding a desired prediction for the machine learning (ML) application. In various embodiments the second user input can specify a type of problem that the user would like to implement machine learning to solve. In various embodiments, the problems can be entered as native language speech or text (e.g., through the use of a Chatbot). The technique can decipher the native language to understand the goals of the machine learning model. Some of types of problems that machine learning can solve can include classification, regression, product recommendations, medical diagnosis, financial analysis, predictive maintenance, image and sound recognition, text recognition, and tabular data analysis. The techniques will recognize one or more keywords in the native language speech to recommend or select a particular machine learning algorithm.

At 306, the functionality includes gathering data in streams (with chunking) or in batches. Chunking is a term referring to the process of taking individual pieces of information (chunks) and grouping them into larger units. By grouping each piece into a large whole, you can improve the amount of information you can remember. The model composition engine can access the data storage to gather the data for generating the machine learning model. The data can be stored locally or in cloud-based network.

At 308, the functionality includes validating data to check if the data characteristics (e.g., the data shape is within expectations). The center is the median and/or mean of the data. The spread is the range of the data. And, the shape describes the type of graph. The four ways to describe shape are whether it is symmetric, how many peaks it has, if it is skewed to the left or right, and whether it is uniform. The model composition engine can inform the user if the shape is not within the expectations and prompt the user to locate other/additional data.

At 310, the functionality includes identifying issues before manifest downstream in pipeline. The model composition engine can review the machine learning query and data to ensure that the identified data have the characteristics for the query or problem. The model composition engine can alert the user if issues are identified and possibly recommend changes to settings or data to resolve the identified issues.

At 312, the functionality includes building characteristics of problem (i.e., attributes/features). The model composition engine can interpret the user input to identify the type of problem that the user would like to use machine learning to solve. After the problem has been identified, the problem can be deconstructed into attributed and features that will be required to resolve that problem. For example, if a user desires to determine the most productive workers at a facility, the system will need to understand the features or attributes that define a productive worker. In some embodiments, the productivity can be determined by number of units produced per unit time worked. The attributes can then include data on number of hours worked, number of units produced, and number of defective units produced.

At 314, the functionality includes determining outcomes to be predicted. The technique can leverage the second user identified information, the data, and the library components to determine the one or more output metrics that can be predicted by the machine learning application. In various embodiments, the machine leaning platform can present the output metrics to the user. In various embodiments, the user can select one or more output metrics from a plurality of available output metrics.

At 316, the functionality includes monitoring values on ongoing basis for QoS/KPI to validate model. In various embodiments, the monitoring engine can evaluate one or more QoS or KPI metrics to determine if the model meets the performance specifications. In various embodiments, the machine learning platform can inform the user of the monitored values, and alert the user if the QoS/KPI metrics fall outside prescribed thresholds.

At 318, the functionality includes training the machine learning model with predictions judged against QoS/KPIs. In various embodiments, the data can be used to train the machine learning model. The variables of the model can be adjusted based on the output values based on the QoS/KPI metrics.

At 320, the functionality includes providing controls to adjust model. The controls can be executed through a Chatbot, a graphical user interface, or one or more user selectable menus. Controls allow a user to adjust the outcome of the model by adjusting the variables used for the selected algorithm. In various embodiments, the control display the outcome values as the model is adjusted.

At 322, the functionality includes auto-adjusting the model as needed. In various embodiments, the values of the algorithm can be automatically adjusted to achieve a desired QoS/KPI outcome. In various embodiments, the values can be adjusted within a defined range of values. The adjustments can include selecting different pipelines 136, microservices routines 140, software modules 144, and infrastructure modules 148.

At 324, the functionality includes compiling model into a machine learning application. In various embodiments, the model can be compiled into stand-alone executable code. In various embodiments, the model can be compiled to form part of another program.

At 326, the functionality includes monitoring predictions to evaluate whether the results are within expectations. In various embodiments, the monitoring engine can provide feedback to model execution engine to inform the user if the model is providing results within an expected range.

At 328, the functionality optionally provides interpretation and explanation of model to make the model drivers so they can be understood by the user. In various embodiments, the machine learning platform can provide results of the model to the user. The results can be detailed to explain the effect of various drivers on the results of the model. In this way, the user can make informed decisions on how the model needs to be adjusted to achieve the desired results.

At 330, the functionality includes capturing anomalies before they manifest into inaccurate predictions. In various embodiments, the monitoring engine can receive information regarding output values that fall outside certain thresholds.

At 332, the functionality includes fixing inaccurate data automatically or semi-autonomously. In various embodiments, the monitoring engine can determine that received data may be inaccurate. In various embodiments, the monitoring engine can notify a user that the data may be inaccurate. The monitoring engine can solicit input from the user to verify or correct the suspect data. In various embodiments, the monitoring engine can automatically correct the suspect data.

It should be appreciated that the specific steps illustrated in FIG. 3 provide particular techniques for generating a machine learning application according to various embodiments of the present disclosure. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

II. A Chatbot for Defining a Machine Learning Solution

Machine learning models are trained for generating predictive outcomes for code integration requests. In one aspect, techniques can be used for defining a machine learning solution, including receiving a first input (e.g., aural, textual, or GUI) describing a problem for the machine learning solution. A model composition engine 132, as shown in FIG. 1, can transcribe the first input into one or more text fragments. The model composition engine 132 can determine an intent of a user to create a machine learning architecture based at least in part on the one or more text fragments. The techniques can include correlating the one or more text fragments to one or more machine learning frameworks of a plurality of models. The techniques can include presenting (e.g., interface or audio) the one or more machine learning model to the user. The model composition engine 132 can receive a selection of one or more machine learning model (e.g., classification, recommender, reinforcement learning). The model composition engine 132 can receive several other user inputs including a second input identifying a data source for the machine learning architecture and a third input of one or more constraints (e.g., resources, location, security, or privacy) for the machine learning architecture. The model composition engine 132 can generate a plurality of code for the machine learning architecture based at least in part on the selected model, the second input identifying the data source, and the third input identifying the one or more constraints. The generated code can be stored in a memory.

An intelligent assistant (e.g., a chatbot) can be used to enable a user to generate a machine learning system. Techniques can be used to automatically generate a machine learning system to assist a user. In some cases, the user may not be a software developer and may have little or no experience in either machine learning techniques or software programming. In some embodiments, a user can interact with an intelligent assistant. The interaction can be aural, textual, or through a graphical user interface. The chatbot can translate natural language inputs into a structural representation of a machine learning solution using an ontology. In this way, a user can work with artificial intelligence without being a data scientist.

The techniques can receive multiple inputs from the user. Based on the multiple inputs, the techniques can determine the intentions of the user to establish a machine learning architecture. In the technique, the intelligent assistant can analyze the inputs and recommend various options for a user based on the analysis. The techniques can generate code for the machine learning architecture. The code can be stored and reused for one or more different machine learning processes. The disclosed techniques simplify the process of developing intelligent applications.

An intelligent assistant can employ a chatbot. A chatbot is software module that conducts a conversation via auditory or textual methods as a dialog systems for interacting with a user. The chatbots can use sophisticated natural language processing systems, or can scan for keywords within the input, then pull a reply with the most matching keywords, or the most similar wording pattern, from a database. The chatbot can be used to set up an artificial intelligence system that can answer a question. In this way, the artificial intelligence can be used for translating information provided to a software module and hardware infrastructure in a plain language manner.

A user (e.g., an application developer) can automatically configure a machine learning infrastructure via a conversational interface (e.g., a chatbot). The user can define how the machine learning predictions can be consumed (e.g., "via a REST API" or "saved to file"). The user can further define the location of the data. The user can also identify what additional services can be required (e.g., monitoring, logging, and alerting) for the machine learning infrastructure. Constraints (e.g., resources, location, security, privacy) can be identified by the user.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

A digital assistant is an artificial intelligent driven interface that helps users accomplish a variety of tasks in natural language conversations. For each digital assistant, a customer may assemble one or more skills. Skills (also described herein as chatbots, bots, or skill bots) are individual bots that are focused on specific types of tasks, such as tracking inventory, submitting time cards, generating a machine learning application, and creating expense reports. When an end user engages with the digital assistant, the digital assistant evaluates the end user input and routes the conversation to and from the appropriate chatbot.

Intents allow the chatbot to understand what the user wants the chatbot to do. Intents are comprised of permutations of typical user requests and statements, which are also referred to as utterances (e.g., generate a classifier application, determine most efficient employee from employment records, etc.). As used herein, an utterance or a message may refer to a set of words (e.g., one or more sentences) exchanged during a conversation with a chatbot. Intents may be created by providing a name that illustrates some user action (e.g., generate a classifier) and compiling a set of real-life user statements, or utterances that are commonly associated with triggering the action. Because the chatbot's cognition is derived from these intents, each intent may be created from a data set that is robust (one to two dozen utterances) and varied, so that the chatbot may interpret ambiguous user input. A rich set of utterances enables a chatbot to understand what the user wants when it receives messages like "Use data set A" or "Identify set A as the data"—messages that mean the same thing, but are expressed differently. Collectively, the intents, and the utterances that belong to them, make up a training corpus for the chatbot. By training a model with the corpus, a user can essentially turn that model into a reference tool for resolving end user input to a single intent. A user can improve the acuity of the chatbot's cognition through rounds of intent testing and intent training.

However, building a chatbot that can determine the end users' intents based upon user utterances, is a challenging task in part due to the subtleties and ambiguity of natural languages and the dimension of the input space (e.g., possible user utterances) and the size of the output space (number of intents). As such, the chatbot may need to be trained, monitored, debugged, and retrained in order to improve the performance of the chatbot and user experience with the chatbot. In conventional systems, training models are provided that are essentially default training models hard coded into the design system for training and retraining the digital assistant or chatbot. For example, a first model may be provided that only needs a small training corpus, so it may use matching rules to develop entities, intents, and the training corpus. When the training corpus has matured to the point where tests reveal highly accurate intent resolution, a second model may be used to add a deeper dimension to the chat bot's cognition by training using machine learning based on word vectors and other text-based features. These default training models are typically inflexible in the training methodology employed. Thus, it may be difficult to identify the root causes of lower than desired performance of the chatbot and determine how to improve the chatbot without a more flexible approach to training.

An analytic system may be integrated with a bot system to monitor events that occurred during conversations between end users and the bot system, aggregate and analyze the collected events, and provide information to a user based on the analysis that can be used to improve on performance of the bot system including performance of the intent classification. However, (i) these systems do not typically identify the root cause of the lower than desired performance (instead they provide information such as bot A failed to identify a intent x amount of times over a period n), and it's up to the user to identify the root cause of the problem from the information, and (ii) these types of analytic systems can become ineffective when hundreds or thousands of bots are being employed within a bot system.

Accordingly, a different approach is needed to address these problems. In various embodiments, an analytic system may be integrated with a bot system. The analytic system can gather conversation logs and history, and determine information related to individual and/or aggregated end user conversations with a bot system as paths that include different nodes representing different stages or states of the conversations. For example, end user conversations with the bot system may be represented by paths showing the transitions from state to state, where each state may be represented by a node on the path. Statistics of the user conversation with the bot system may be generated for each node. The paths include (i) a number of conversations flowed through the intent-specific paths of the dialog flow for a given period, (ii) the number of conversations maintained between each state and the different execution paths taken because the conversation branched due to values getting set (or not set), or dead-ended because of some other problem like a malfunctioning custom component, and (iii) a final state that provides insight into the conversation's ultimate success or failure. The analytical tool may then use the information generated for each path and node to retrain the bot system or individual bot responsible for the intent/path.

In some embodiments, an event collector of the analytic system may collect one or more attributes for one or more events associated with a set of conversations with a bot system. The event collector may be reconfigurable to selectively collect desired attributes for desired events. The one or more events may include, for example, at least one of a conversation event, a bot state event, an intent resolution event, an entity resolution event, an error event, a timeout event, or a custom event. Thereafter, the analytic engine of the analytic system may select, using one or more filtering criteria selected by a user, one or more conversations from the set of conversations based upon the one or more attributes for the one or more events collected by the event collector. The one or more filtering criteria may include, for example, conversations ended at a particular state, conversations started from a particular state, completed or incomplete conversations, conversations associated a particular end user intent, conversations from a particular channel or locale, conversations occurred during a certain time period, and the like. For the selected one or more conversations, the analytic engine may calculate statistics of the set of conversations, statistics of the conversations associated with a particular end user intent, statistics of complete conversations, statistics of incomplete conversations, statistics of conversations for which no end user intent is determined, or any combination thereof. The analytic engine may generate options for improving the bot system based on the calculated statistics.

In some embodiments, the analytic engine may generate an aggregated path diagram for the selected one or more conversations. The aggregated path diagram may include a plurality of nodes and a plurality of connections among the plurality of nodes. Each of the plurality of nodes may correspond to a respective state of the bot system. Each of the plurality of connections may represent a transition from one state of the bot system to another state of the bot system. The plurality of nodes may include a start node and an end node. In some embodiments, the aggregated path diagram may include a number associated with each respective connection, where the number may indicate a total number of conversations that include the transition represented by the respective connection.

The analytic engine may incorporate the statistics into the aggregate path diagram to determine additional information such as how many conversations flowed through the intent-specific paths of the dialog flow for a given period, the number of conversations maintained between each state, and the different execution paths taken because the conversation branched due to values getting set (or not set), or dead-ended because of some other problem like a malfunctioning custom component. Optionally, the bot system may be retrained using the statistics and aggregated path diagram to improve the performance of the bot system, such as retraining the intent classification models of the bot system to more accurately determining the user intents.

In some embodiments, a graphical user interface (GUI) may display information related to individual and/or aggregated end user conversations with a bot system as paths that include different nodes representing different stages or states of the conversations. For example, end user conversations with the bot system may be represented by paths showing the transitions from state to state, where each state may be represented by a node on the path. Statistics of the user conversation with the bot system may be generated and displayed graphically through the GUI. The path visualization by the analytic system may allow an administrator or developer to filter or select groups of end user conversations with the bot system based on different criteria. The analytic system may also provide options for the administrator or developer of the bot system to select and review individual conversations of interest. The visualized path information may allow an administrator or developer of the bot system to visually monitor and analyze how end users are interacting with the bot system and how the bot system performs during the conversations to identify underperforming elements of and possible improvements to the bot system.

As described above, the analytic system may provide, through a GUI, information regarding end user conversations with the bot system at different generalization levels, including all conversations, conversations meeting certain criteria, conversations associated with specific intents or end states, and individual conversations. As such, the analytic system may allow the administrator or developer of the bot system to identify specific end user utterances and intents associated with incomplete or unsuccessful conversations, thus identifying and improving underperforming elements of the bot system. By analyzing and improving the performance of the bot system, end user experience with the bot system may be improved.

Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises can use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI can be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction can include the end user saying "Hello" to the bot and the bot responding with a "Hi" and asking the end user how it can help. In some cases, the interaction can also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for generating a machine learning application, so that the user's intent could be represented through the utterance "Build a machine learning application." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for generating a machine learning application can have various permutations of utterances that express a desire to generate a machine learning application to solve a problem. These associated utterances can be used to train an intent classifier of the chatbot to enable the intent classifier to subsequently determine whether an input utterance from a user matches the machine learning application intent. A bot intent may be associated with one or more dialog flows for starting a conversation with the user and in a certain state. For example, the first message for the machine learning application intent could be the question "What is the problem you are trying to solve?" In addition to associated utterances, a bot intent may further comprise named entities that relate to the intent. For example, the machine learning application intent could include variables or parameters used to perform the task of generating a machine learning application, e.g., type of problem, data to be used, performance characteristics, various constraints and the like. The value of an entity is typically obtained through conversing with the user.

Figure 4:
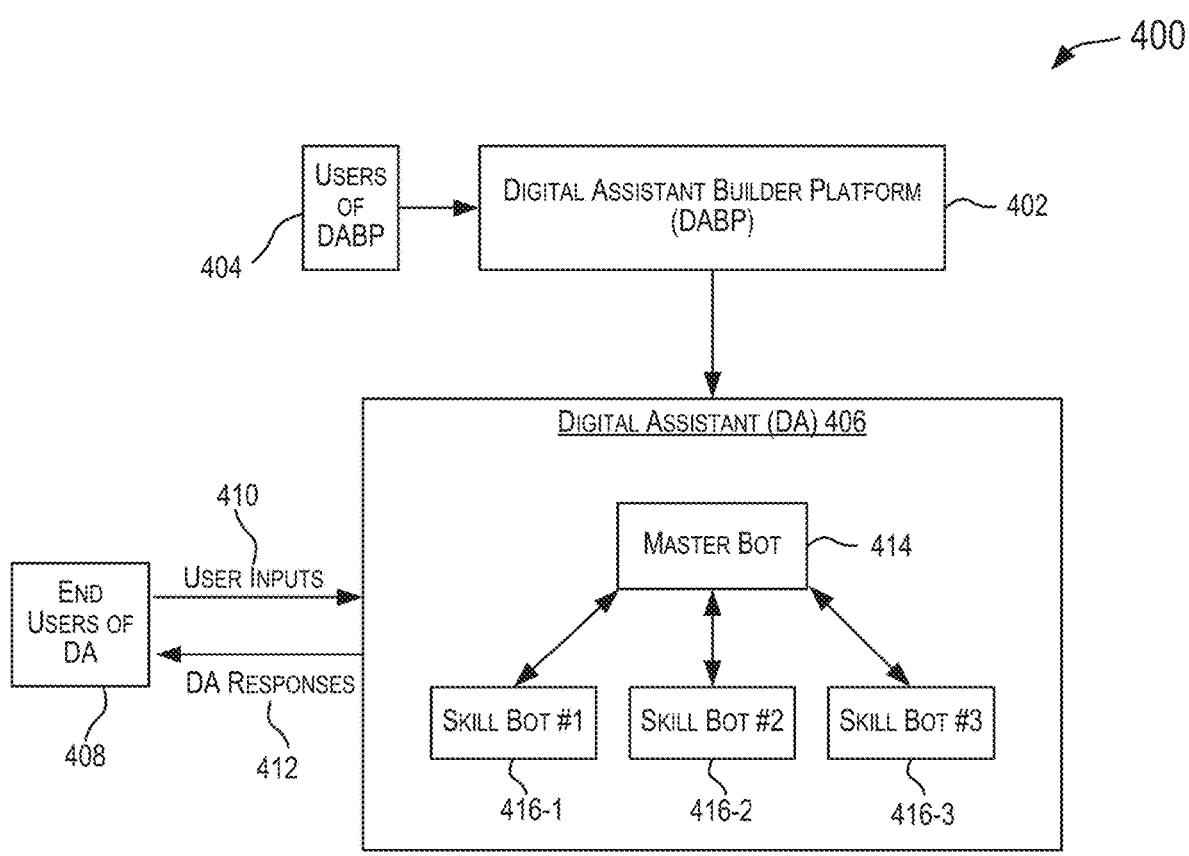
FIG. 4 depicts a distributed system that implements a bot system for communicating with end users using a messaging application in accordance with various embodiments

FIG. 4 is a simplified block diagram of a distributed environment 400 for a chatbot for generating a machine learning application. Distributed environment 400 comprises a digital assistant builder platform (DABP) 402 that enables enterprises to create and deploy digital assistants for their users. For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. DABP 402 can be used to create one or more digital assistants (or DAs) 406. DABP 402 can be used by multiple enterprises to create digital assistants for their users. For example, as shown in FIG. 4, user 404 representing a particular enterprise can use DABP 402 to create and deploy a digital assistant 406 for users of the particular enterprise.

Once a digital assistant 406 is deployed, users 408 may use the digital assistant 406 to perform various tasks via natural language-based conversations with the digital assistant 406. As part of a conversation, a user 408 may provide one or more user inputs 410 and get responses 412 back from the digital assistant 406. Via these conversations, a user can request one or more tasks to be performed by the digital assistant 406 and, in response, the digital assistant 406 is configured to perform the user-requested tasks and respond with appropriate responses to the user.

User inputs 410 are in a natural language and are referred to as utterances. A user utterance can be in text form (e.g., when the user types something as input to digital assistant 406) or in audio input or speech form (e.g., when the user says something as input to digital assistant 406). The utterances are typically in a language spoken by the user 408. When a user input 410 is in speech form, the speech input is converted to text form utterances in that particular language and the text utterances are then processed by digital assistant 406. Various speech-to-text processing techniques may be used to convert a speech or audio input to a text utterance, which is then processed by digital assistant 406.

A text utterance, input by the user 408 or generated from converting speech input to text form, can be a text fragment, a sentence, multiple sentences, and the like. Digital assistant 406 is configured to apply natural language understanding (NLU) techniques to the text utterance to understand the meaning of the user input. As part of the NLU processing for a utterance, digital assistant 406 is configured to perform processing to understand the meaning of the utterance, which involves identifying one or more intents and one or more entities corresponding to the utterance. Upon understanding the meaning of an utterance, digital assistant 406 may perform one or more actions or operations responsive to the understood meaning or intents.

For example, the user input 410 may request generation of a machine learning application, for example, "I want build an image classifier." Digital assistant 406 is configured to understand the meaning of the utterance and take appropriate actions that may involve responding to the user with questions requesting user input on the type of classifier the user wants to build, the source of the data, the various performance metrics, and various constraints. The responses 412 provided by digital assistant 406 may also be in the form of natural language, which may involve natural language generation (NLG) processing performed by digital assistant 406. Once digital assistant 406 has the requisite information from the user, digital assistant 406 may then cause a machine learning application to be generated. Digital assistant 406 may end the conversation with the user by outputting information indicating that the machine learning application has been generated.

In certain embodiments, an utterance received as input by digital assistant 406 goes through a series or pipeline of processing steps. These steps may include, for example, parsing the utterance, understanding the meaning of the utterance, refining and reforming the utterance to develop a better understandable structure for the utterance, determining an action to be performed in response to the utterance, causing the action to be performed, generating a response to be output to the user responsive to the user utterance, outputting the response to the user, and the like.

The NLU processing performed by a digital assistant, such as digital assistant 406, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). A digital assistant 406 may use an NLP engine and/or a machine learning model (e.g., an intent classifier) to map end user utterances to specific intents (e.g., specific task/action or category of task/action that the chatbot can perform). For example, a machine learning based NLP engine may learn to understand and categorize the natural language conversations from the end users and to extract necessary information from the conversations to be able to take precise actions, such as performing a transaction or looking up data from a backend system of record. In certain embodiments, the NLU processing or portions thereof is performed by digital assistant 406 itself. In some other embodiments, digital assistant 406 may use other resources to perform portions of the NLU processing. For example, the syntax and structure of a sentence may be identified by processing the sentence using a parser, a part-of-speech tagger, and/or a named entity recognizer. In one implementation, for the English language, a parser, a part-of-speech tagger, and a named entity recognizer provided by the Stanford Natural Language Processing (NLP) Group is used for analyzing the sentence structure and syntax. These can be provided as part of the Stanford CoreNLP toolkit.

While the various examples provided in this disclosure show utterances in the English language, this is meant only as an example. In certain embodiments, digital assistant 406 is also capable of handling utterances in languages other than English. In certain embodiments, digital assistant 406 provides subsystems (e.g., component implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server, and can also take advantage of the generic subsystems provided, if needed.

A digital assistant, such as digital assistant 406, can be made available to its users through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant contains or is associated with one or more skills. In certain embodiments, these skills are individual chatbots (referred to as skill bots) that are designed to interact with users and fulfill specific types of tasks, such as tracking inventory, submitting timecards, creating expense reports, ordering food, checking a bank account, making reservations, buying a widget, and the like. For example, for the embodiment depicted in FIG. 4, digital assistant 406 includes skills 416-1, 416-2, and so on. For purposes of this disclosure, the terms "skill" and "skills" are used synonymously with the terms "skill bot" and "skill bots" respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be added to a digital assistant. In some instances, a skill bot can be developed by an enterprise and then added to a digital assistant using DABP 402. In other instances, a skill bot can be developed and created using DABP 402 and then added to a digital assistant created using DABP 402. In yet other instances, DABP 402 provides an online digital store (referred to as the "skills store") that offers multiple skills directed to a wide range of tasks. The skills offered through the skills store may expose various cloud services. A user 404 of DABP 402 can access the skills store via DABP 402, select a desired skill and add the selected scale to a digital assistant created using DABP 402. A scale from the skills store can be added to a digital assistant as is or in a modified form (for example, a user of DABP 402 may select and clone a particular skill bot provided by the skills store, make customizations or modifications to the selected skill bot, and then add the modified skill bot to a digital assistant created using DABP 402).

In certain embodiments, a digital assistant created and deployed using DABP 402 is implemented using a master bot/child (or sub) bot paradigm or architecture. According to this paradigm, a digital assistant is implemented as a master bot that interacts with one or more child bots that are skill bots. For example, in the embodiment depicted in FIG. 4, digital assistant 406 comprises a master bot 414 and skill bots 416-1, 416-2, etc. that are child bots of master bot 414. In certain embodiments, digital assistant 406 itself acts as the master bot.

A digital assistant implemented according to the master-child bot architecture enables users of the digital assistant to interact with multiple skills through a unified user interface. When a user engages with a digital assistant 406, the user input is received by the master bot 414, which then processes the user input to identify a user request and based upon the processing determines whether the user request task can be handled by the master bot 414 itself, else the master bot 414 selects an appropriate skill bot 416-1, 2, or 3 for handling the user request and routes the conversation to the selected skill bot 416-1,2, or 3. This enables a user 408 to, through a common single interface, converse with and use several skill bots configured to perform specific tasks. For example, for a digital assistant 406 developed for an enterprise, the master bot 414 of the digital assistant 406 may interface with skill bots 416-1, 416-2, etc. with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer 408 of the digital assistant 406 need only know how to access the digital assistant 406.

In a master bot/child bot infrastructure, the master bot is configured to be aware of the list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to identify or predict a specific skill bot, from the multiple available skill bots, that can best serve or handle the user request. The master bot then routes the utterance (or a portion of the utterance) to that specific skill bot for further handling. Control thus flows from the master bot to the skill bots. The master bot can support multiple input and output channels.

While the embodiment in FIG. 4 shows digital assistant 406 comprising a master bot 414 and skill bots 416-1, 416-2, and 416-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 402 provides an infrastructure and various services and features that enable a use of DABP 402 to create a digital assistant including one or more skill bots associated with the digital assistant. For example, a skill bot can be created by cloning an existing skill bot, cloning an existing skill bot and then making modifications to the skill bot, or can be created from scratch using tools and services offered by DABP 402. In certain embodiments, DABP 402 provides a skills store or skills catalog offering multiple skill bots for performing various tasks. A user of DABP 402 can clone a skill bot from the skills store and create a new skill bot.

DABP 402 also enables a user (e.g., a skill bot designer) to create a skill bot from scratch. In certain embodiments, at a high level, creating a skill bot involves the following steps:
(1) Configuring settings for a new skill bot
(2) Configuring one or more intents for the skill bot
(3) Configuring entities for one or more intents
(4) Training the skill bot
(5) Creating a dialog flow for the skill bot
(6) Adding custom components to the skill bot
(7) Testing and deploying the skill bot (1) Configuring settings for a new skill bot—A skill bot designer can specify one or more invocation names for the skill bot being created. These invocation names can be used in utterances to explicitly identify and invoke the skill bot in the digital assistant. The skill bot designer may also specify example utterances for the skill bot. These example utterances are representative of utterances for the skill bot. When user inputs are received, the intent analysis engine of the digital assistant compares the user inputs to these example utterances to determine if the particular skill bot is to be invoked.

(2) Configuring one or more intents for the skill bot—The skill bot designer may configure one or more intents (also referred to as bot intents) for a skill bot being created. These intents identify tasks that the skill bot can perform for users of the digital assistant. Each intent is given a name. For example, for a skill bot can be configured to generate machine learning models, intents may be specified by the skill bot designer for the skill bot. For each intent, the skill bot designer specifies a set of example utterances that are representative of and illustrate the meaning of the intent and are typically associated with the task performed by that intent. Accordingly, permutations of typical user requests and statements may be specified as example utterances for an intent.

(3) Configuring entities for one or more intents of the skill bot—In some instances, additional context may be needed to enable the skill bot to properly respond to a user request. For example, there may be situations where a user input utterance resolves to the same intent in a skill bot. One or more entities can be specified for certain intents configured for the skill bot. Entities are thus used to add context to the intent itself. Entities help describe an intent more fully and enable the skill bot to complete a user request. In certain embodiments, there are two types of entities: (a) built-in entities provided by DABP 402, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications.

(4) Training the skill bot—A skill bot is configured to receive user input, parse or otherwise process the received input, and identify or select an intent that is relevant to the received user input. In order for this to happen, the skill bot has to be trained. In certain embodiments, a skill bot is trained based upon the intents configured for the skill bot and the example utterances associated with the intents (collectively, the training data), so that the skill bot can resolve user input to one of its configured intents. In certain embodiments, a skill bot is represented by a model that is trained using the training data and allows the skill bot to discern what users say (or in some cases, are trying to say). DABP 402 provides various different training techniques that can be used by a skill bot designer to train a skill bot, including various machine-learning based training techniques, rules-based training techniques, and/or combinations thereof, as described in detail herein with respect to DAG based framework. In certain embodiments, a portion (e.g., 80%) of the training data is used to train a skill bot model and another portion (e.g., the remaining 20%) is used to test or verify the model. Once trained, the skill bot can then be used to handle and respond to user utterances. In certain cases, a user's utterance may be a question that requires only a single answer and no further conversation. In order to handle such situations, a Q&A (question-and-answer) intent may be configured for a skill bot. This enables a skill bot to output replies to user requests without having to update the dialog definition. Q&A intents are created in a similar manner as regular intents. The dialog flow for Q&A intents is however different from regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take (e.g., how the skill bot responds to user utterances, how the skill bot prompts users for input, how the skill bot returns data). The dialog flow is like a flowchart followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition contains three sections:

(a) a context section
(b) a default transitions section
(c) a states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot names components that provide the functionality needed corresponding to the states. Components enable a skill bot to perform the functions. In certain embodiments, DABP 402 provides a set of preconfigured components for performing a wide range of functions. A skill bot designer can select one of more of these preconfigured components and associate them with states in the dialog flow for a skill bot. The skill bot designer can also create custom or new components using tools provided by DABP 402 and associate the custom components with one or more states in the dialog flow for a skill bot.

(7) Testing and deploying the skill bot—DABP 402 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant.

At the master bot or digital assistant level, when a user inputs a phrase or utterance to the digital assistant, the digital assistant is configured to perform processing to determine how to route the conversation. The digital assistant determines this using a routing model, which can be rules-based, AI-based, or a combination thereof. The digital assistant uses the routing model to determine whether the conversation corresponding to the user input is to be routed to a particular skill for handling, is to be handled by the digital assistant or master bot itself per a built-in system intent, or is to be handled as a different state in a current conversation flow.

In certain embodiments, as part of this processing, the digital assistant determines if the user input identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific invocation, in certain embodiments, the digital assistant evaluates the received user input and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input. In certain embodiments, after one or more skill bots are identified as candidates, the intents associated with those candidate skills are evaluated (according to the intent model for each skill) and confidence scores are applied to each intent. In general, any intent that has a confidence score exceeding a threshold value is treated as a candidate flow. If a particular skill bot is selected, then the user input is routed to that skill bot for further processing. If a system intent is selected, then one or more actions are performed according to the selected system intent.

Figure 5:
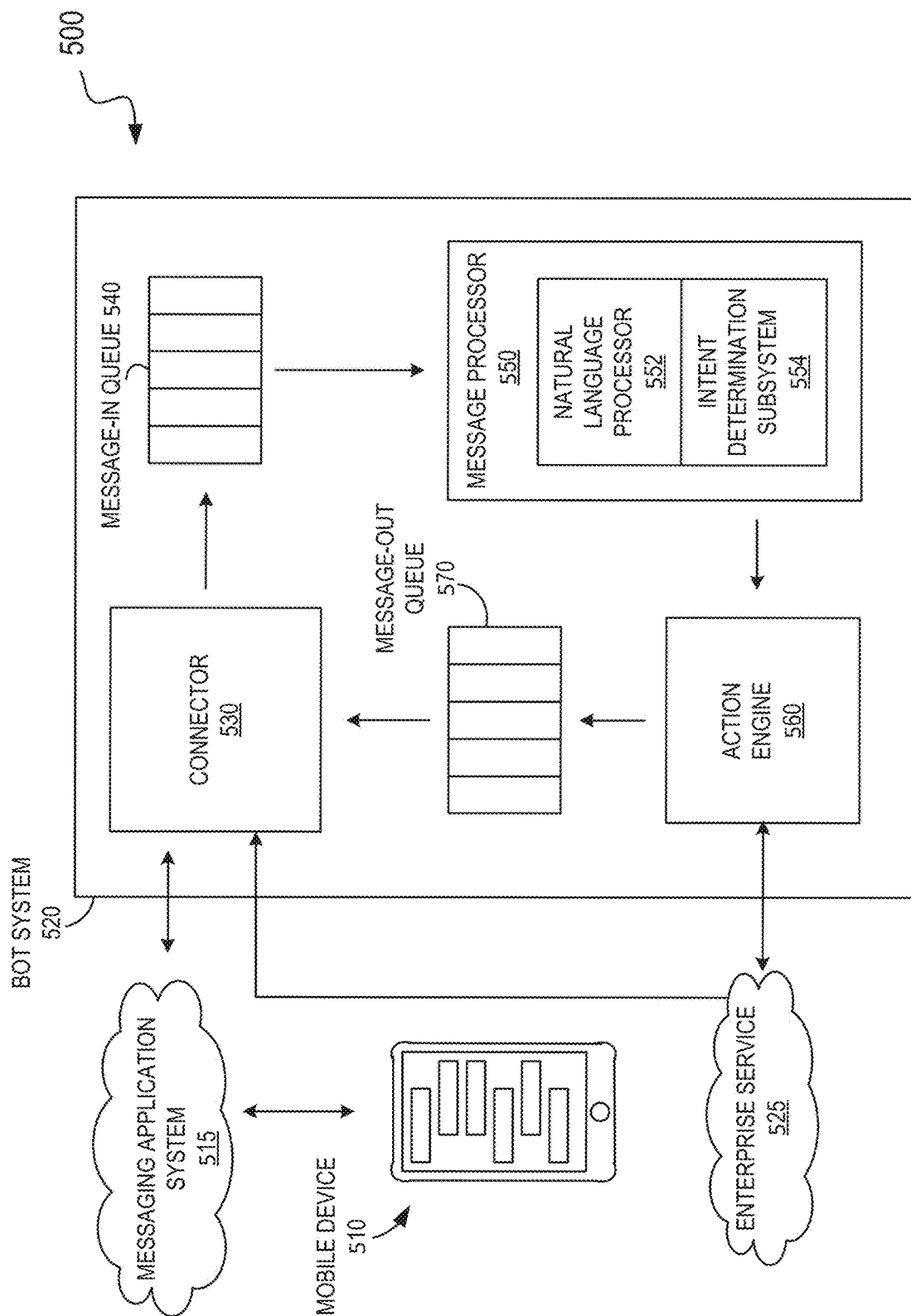
FIG. 5 depicts an integrated system including a bot system and a bot analytic system for monitoring, analyzing, visualizing, and improving the performance of a bot system in accordance with various embodiments.

FIG. 5 depicts a distributed system 500 that implements a bot system for communicating with an end user using a messaging application according to certain embodiments. System 500 may include a bot system 520, one or more messaging application systems 515, and one or more end user devices, such as one or more mobile devices 510. In some examples, the messaging application may be installed on an electronic device (e.g., a desktop computer, a laptop, mobile device 510, or the like).

The messaging application may be facilitated by a messaging platform, such as messaging application system 515. Mobile device 510 may be connected to messaging application system 515 by a first network (e.g., the Internet). Messaging application system 515 may be a messaging platform provided by a third party, such as Facebook, Tencent, Google, Microsoft, etc. Messaging application system 515 may manage content sent and received through the messaging application across multiple mobile devices or other end user devices.

A bot system 520 (e.g., implemented on one or more servers) may also be communicatively connected to messaging application system 515 to send and receive massages. The communication between messaging application system 515 and bot system 520 may be through a second network (e.g., the Internet). The first network and the second network may be the same network, or they may be similar or completely different networks. Messaging application system 515 may route content (e.g., a message or information from a message) from mobile device 510 to bot system 520 using the Internet. In some embodiments, the destination of the content (e.g., an identification of bot system 520) may be included in the content as a nominal addressee. In some embodiments, bot system 520 may also be configured to communicate with two or more messaging application systems 515.

As discussed above, the content being exchanged between end users or between an end user and a bot system may include, for example, text, emojis, audio, media (e.g., a picture, a video, a link), or any other method of conveying a message.

Bot system 520 may receive the content from messaging application system 515 using a connector 530 that acts as an interface between messaging application system 515 and bot system 520. In some embodiments, connector 530 may normalize content from messaging application system 515 such that bot system 520 may analyze content across different messaging application systems. The content normalization processing may include formatting content from each type of messaging application to a common format for processing. In some embodiments, bot system 520 may include one or more connectors for each of the messaging applications (such as FACEBOOK® Messenger, WHATSAPP® instant messaging software, WECHAT® mobile text and voice messaging communication service, KIK® Messenger, TELEGRAM® Messenger, and SKYPE MOBILE® messenger, a Short Message Service (SMS)). In some implementations, connector 530 may route the content to a message-in queue 540. Message-in queue 540 may include a buffer (e.g., a first-in first-out (FIFO) buffer) that stores content in the order received. In some embodiments, each connector 530 may be associated with one or more message-in queues.

Message-in queue 540 may send the content to a message processor 550 when message processor 550 becomes available. In some embodiments, message processor 550 may pull the content from message-in queue 540. Message processor 550 may parse a message and determine an intent of the parsed message as described in detail below. In some embodiments, message processor 550 may include a natural language processor 552 and an intent determination subsystem 554. Natural language processor 552 may parse a message and perform certain semantic analysis, such as identifying a subject, a predicate (e.g., an action), and/or an object. Intent determination subsystem 554 may determine an end user intent based on the parsed message. As described above, the intent may include a purpose of the message. For example, a purpose of the message may be to order generate a machine learning model. In some embodiments, parameters associated with the intent that more specifically define or clarify the action to take, which may be referred to as entities, may also be extracted from the message by natural language processor 552 and/or intent determination subsystem 554.

After the end user intent is determined based on the content by message processor 550, the determined intent (and the parameters associated with the intent) may be sent to an action engine 560. Action engine 560 may be used to determine an action to perform based on the intent (and the parameters associated with the intent) and the current state (or context) of a state machine as described above. For example, action engine 260 may send certain outbound content to message-out queue 570 as the response and/or may send a command to or retrieve information from some enterprise services, such as enterprise service 525. Message-out queue 570 may send the outbound content to connector 530. Connector 530 may then send the outbound content to a messaging application system indicated by action engine 560, which may be the same as or different from messaging application system 515. Messaging application system 515 may then forward the outbound content to the messaging application on mobile device 510.

Bot system 520 may communicate with one or more enterprise services (e.g., enterprise service 525), one or more storage systems for storing and/or analyzing messages received by bot system 520, or a content system for providing content to bot system 520. Enterprise service 525 may communicate with one or more of connector 530, action engine 560, or any combination thereof. Enterprise service 525 may communicate with connector 530 in a manner similar to messaging application system 515. Enterprise service 525 may send content to connector 530 to be associated with one or more end users. Enterprise service 525 may also send content to connector 530 to cause bot system 520 to perform an action associated with an end user. Action engine 560 may communicate with enterprise service 525 to obtain information from enterprise service 525 and/or to instruct enterprise service 525 to take an action identified by action engine 560.

In some embodiments, bot system 520 may include one or more timers. A timer may cause action engine 560 to send content to an end user using connector 530 and messaging application system 515 after an amount of time has lapsed. In some embodiments, a timer may send content to bot system 520 similar to an end user or enterprise service 525. For example, the timer may send a message to bot system 520 to be analyzed as a message from an end user would be analyzed.

As described above, building the bot system, such as the user intent classification engine that can determine the end user's intents based upon end user utterances, is a challenging task in part due to the subtleties and ambiguity of natural languages and the dimension of the input space (e.g., possible end user utterances) and the size of the output space (number of intents). As such, a new bot system may need to be monitored, debugged, and modified in order to improve the performance of the bot system and user experience with the bot system. In many cases, it may be difficult to more specifically identify the root causes of the lower than desired performance of the bot system and determine how to improve the bot system without using an analytics or optimization tools.

In some circumstances, a bot owner, developer, or administrator may want to monitor the operational status of a bot, and understand how the bot is being used and where end users abandoned the bot, in order to improve the bot. For example, the bot owner, developer, or administrator may want to know which bot conversations are successful and which ones are not, in order to identify and diagnose underperforming elements of the bot system.

According to some embodiments, an analytic system may be integrated with a bot system. The analytic system may monitor events occurred during conversations between end users and the bot system, aggregate and analyze the collected events, and provide information regarding the conversations graphically on a graphic user interface at different generalization levels, such as all conversations, different categories of conversation, and individual conversations. For example, the graphic user interface may display options to filter or select certain types of conversations or individual conversations, and display the selected information graphically, for example, by visualizing the paths of the conversations. The analytic system may also provide suggestions, options, or other information for improving the bot system.

Figure 6:
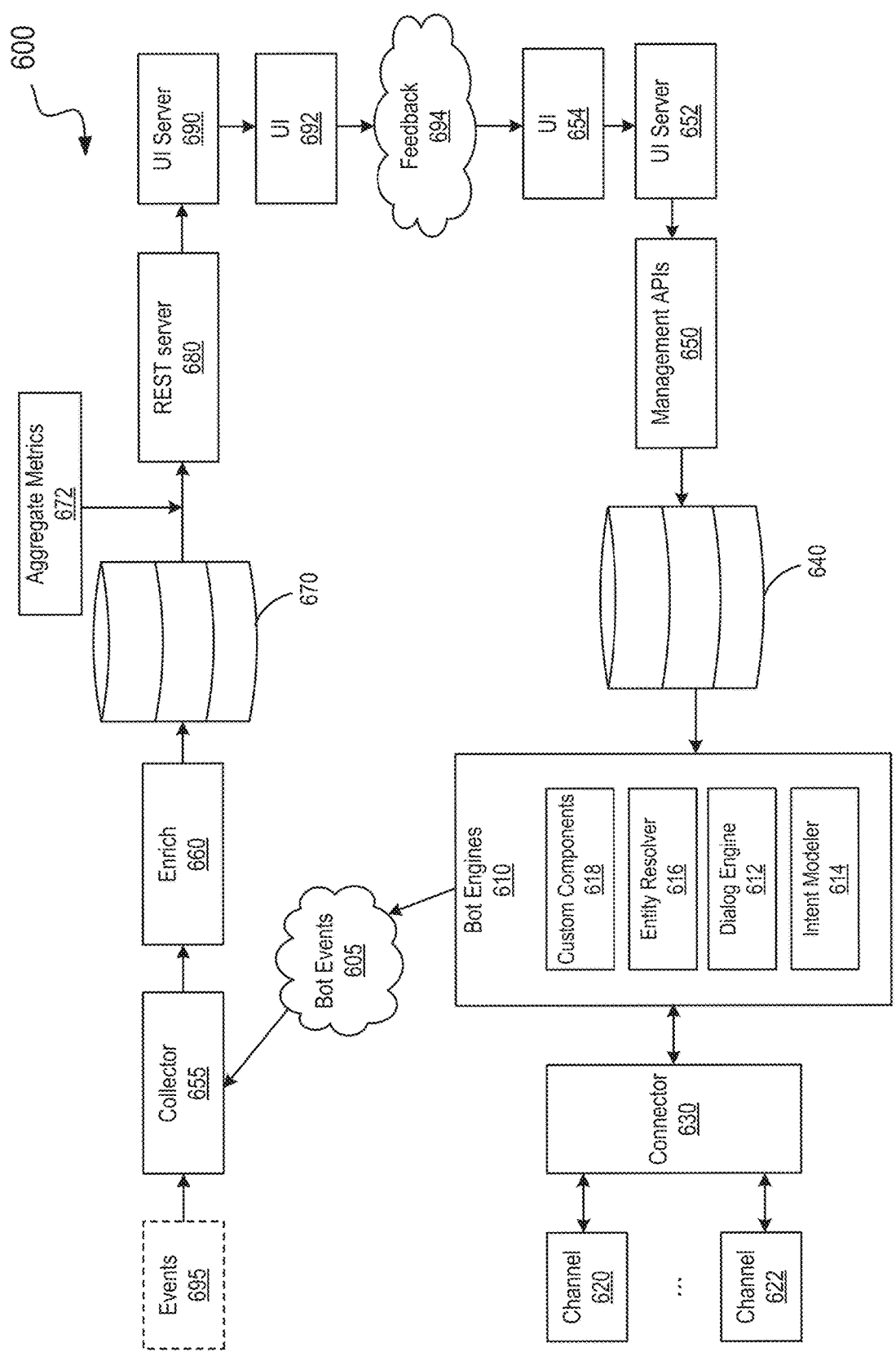
FIG. 6 depicts a distributed system that implements a bot system for communicating with an end user using a messaging application according to certain embodiments.

FIG. 6 depicts an integrated system 600 including a bot system (such as bot system 220) and a bot analytic system for monitoring, analyzing, visualizing, and improving the performance of the bot system according to certain embodiments. As illustrated, the bot system may include a connector 630 and a plurality of bot engines, such as a dialog engine 612, an intent modeler 614, an entity resolver 616, and custom components 618. The bot system may also include a database 640, management application programming interfaces (APIs) 650, a user interface 654, and a UI server 652. The bot analytic system may include a collector 655, an enrichment engine 660, a database 670, and a REST server 680. The bot analytic system may also include a user interface 692 and a UI server 690. Collector 655 of the bot analytic system may collect events 605 occurred at the bot system. Feedback 694 from the bot analytic system may be provided to the bot system through user interface 692 and user interface 654.

Connector 630 may act as an interface between the bot system and one or more end users through one or more channels, such as channels 620 and 622. Each channel may be a messaging application, such as a messaging channel (such as Facebook Messenger, Facebook WhatsApp, WeChat, Line, Kik, Telegram, Talk, Skype, Slack, or SMS), a virtual private assistant (such as Amazon Dot, Echo, or Show, Google Home, Apple HomePod, etc.), a mobile and web app extension that extends native or hybrid/responsive mobile app or web application with chat capabilities, or voice based input (such as devices or apps with interfaces that use Siri, Cortana, Google Voice, or other speech input for interaction). In some embodiments, connector 130 may normalize content from different channels such that the bot system may analyze content across different messaging application systems. The content normalization processing may include formatting content from each type of messaging application to a common format for processing. In some embodiments, the bot system may include one or more connectors for each of the channels.

Intent modeler 614 may be used to determine end user intents associated with end user utterances. In some embodiments, intent modeler 314 for determining an intent of an end user based on one or more messages received by the bot system from the end user may use a natural language processor to tag the parts of speech (verb, noun, adjective), find lemmas/stems (runs/running/ran→run), and tag entities (Texas→LOCATION). In some embodiments, intent modeler 314 may normalize the message. For example, "Mary ran to Texas" may become "PERSON run to LOCATION." Intent modeler may also include logic to detect words which have the same meaning within an end user message.

After normalization, a probability that the occurrence of a word may signify a certain intent may be determined. In some examples, probabilities can be combined using basic probability arithmetic as if they were independent. Some probabilities may be based on presence of words, or based on certain language elements, like presence of negations or personal pronouns.

Another level of rule may be a template rule, which is a combination of words. In some examples, every sentence in a training dataset, once normalized, may automatically become a rule. In such examples, a training dataset may include a very small number of short sentences. The template rule may return a probability of 1. New rules may be generated from rules via a process of induction.

If a particular word or set of words (like the verb) is important to an intent, the probabilities may be manipulated by having more examples using such a word (and its synonyms) and fewer examples with such a word for other intents.

Examples may also be provided to prevent the model from making wrong assertions. For example, particular sub-phrases, or words only appearing for a certain intent, may cause wrong assertions. Similarly, the model may be prevented from synthesizing broad rules using similar sentences belonging to different intents for the training.

Entity resolver 616 may identify entities (e.g., objects) associated with the end user intents. For example, in addition to the end user intent identified by intent modeler 614, such as "order pizza," entity resolver 616 may resolve entities associated with the intent, such as the pizza type, toppings, and the like.

Dialog engine 612 may be used to handle the conversations between the end users and the bot system. For example, dialog engine 612 may respond to end user utterances based on the end user intent identified by intent modeler 614 and entities associated with the end user intent identified by entity resolver 616. In some embodiments, dialog engine 612 may use a state machine that includes user defined states (e.g., end user intents) and actions to take in the states or from state to state to handle the conversations with end users.

Custom components 618 may include customized modules for the specific bot system. For example, a financial bot may include custom components that may be used to, for example, check balance, transfer funds, or pay bills.

Database 640 may be used to store data for the bot system, such as data for the classification models, logs of conversation, and the like. Management APIs 650 may be used by an administrator or developer of the bot system to manage the bot system, such as retraining the classification models, editing intents, or otherwise modifying the bot system. The administrator or developer may use user interface 654 and UI server 652 to manage the bot system.

Various events may be generated while the bot system is running. The events may be generated based upon one or more instructions included in the bot system. For example, an event may be generated when the bot system has entered into a particular state, where the particular state is defined by an administrator or developer of the bot system. As events are generated, the events may be collected, stored, and analyzed by the bot analytic system. When capturing an event, additional information associated with the event may also be collected, where the additional information may indicate a present context in which the event is generated.

For example, conversation events may be generated by dialog engine 612. A conversation event may include a message received by a bot system from an end user device (referred to as msg_received). Msg_received may include one or more of the following parameters or variables: the content of the message, the time when the message is received by the bot system, the language of the message received, a device property (e.g., version or name), an operating system property (e.g., version or name), a geolocation property (e.g., an Internet Protocol address, a latitude, a longitude, or the like), identification information (e.g., a user ID, a session ID, a bot system ID, a tenant ID, or the like), a time stamp (e.g., device created, device sent, collector derived time stamp), the channel, or the like.

A conversation event may also include a message sent by a bot system to an end user device (referred to as msg_sent). Msg_sent may include one or more of the following: the content of the message (e.g., text or HTML of the message), the time when the message is sent by the bot system, the language of the message, a creator of the message (e.g., the bot system or an end user device), a device property, an operating system property, a browser property (e.g., version or name), an app property (e.g., version or name), a geolocation property (e.g., an Internet Protocol address, a latitude, a longitude, or the like), identification information (e.g., a user ID, a session ID, a bot system ID, a tenant ID, or the like), a channel (e.g., Facebook or Webhook), or the like.

Dialog engine 612 may also generate dialog state execution events. As described above, dialog engine 612 may use a state machine to determine the flow of the conversations with end users. The state machine may include a set of states and rules of transition between the states. Dialog engine 612 may execute the state machine for each end user conversation, and a dialog state execution event may be produced for each state that dialog engine 612 steps through to process end user utterances. Attributes of a dialog state execution event may include, for example, a state name, component name, next action, entity match, intent match, variable, user query statement, response statement, time of execution, communication language, device property, operating system property, geolocation property, identification information, a time stamp, a channel, or the like. The state name may be a name of a state currently executed or an "error state." The component name may be a name of a bot component executed for a current state. The next action may be a next action to be executed. The entity match may be an entity resolved in a current message. The intent match may be an intent resolved with a score value. The variable may be a variable value for a current state. The query statement may be a message sent by an end user. A response statement may be a message sent to an end user. The time of execution may be a time stamp of a completed state execution. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

An intent resolution event may occur as a result of the execution of intent modeler 614. Intent modeler 614 may use trained or otherwise defined classification models to identify the end user intents from a set of intents based on the end user utterances. The result of the intent classification may be captured as intent resolution event attributes, which may include, for example, the final intent classification result (e.g., the identified intent) and confidence score associated with each respective intent in the set of intents.

Entity resolver 616 may generate entity resolver events. Entities are objects associated with end user intents. Entity definition rules may be determined when the bot system is created. For example, in addition to resolving end user intents, such as "order pizza," the bot system may also use entity resolver 616 to resolve associated entities, such as pizza type, toppings, and the like. An entity resolver event may be captured at an entity resolution. Examples of attributes associated with an entity resolver event may include an entity name, a rule applied, a search term, a state resolved, a query statement, an entity type, a time of execution, a communication language, a device property, an operating system property, a browser property, an app property, a geolocation property, identification information, a time stamp, a channel, or the like. The entity name may be a name of an entity currently being resolved. The rule applied may be, for example, preceding, following, or aggregate. The search term may be from, to, destination, origin, or the like. The state resolved may be a dialog state resolved for the entity. The query statement may be a message containing entity value. The entity type may be system or derived. The time of execution may be a time stamp of an entity resolution. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

A custom component may also generate events, such as a predefined event or a custom event. The predefined event may be a property captured at an execution of a custom component. Examples of attributes of the predefined event may include: a component name, an event name, a payload, a time of execution, a communication language, a device property, an operating system property, a browser property, an app property, a geolocation property, identification information, a time stamp, a channel, or the like. The component name may be a name of a custom component currently being executed. The event name may be invoked, invocation_ failed, replied, replied_failed, or the like. The payload may be, in case of failure, reason for failure, stack trace, or the like. The time of execution may be a time stamp indicating when an event occurred. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

The custom component may also issue a custom event during execution of a custom component. Examples of attributes of the custom event may include a component name, an event name, a custom payload, a time of execution, a communication language, a device property, an operating system property, a browser property, an app property, a geolocation property, identification information, a time stamp, a channel, or the like. The component name may be a name of a custom component currently being executed. The event name may be a user-defined event name (e.g., Balance_Retrieved). The payload may be, for example, {"amount": "USD 100", "account": "checking"}. The time of execution may be a time stamp indicating when an event occurred. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

Error events and timeout events may also be generated by the bot system during execution. An error event may be generated when an error occurs. A timeout event may be generated when the end user conversation has been inactive for a period of time, which may be configured at the channel.

The bot analytic system may collect the events and additional information as the bot system conducts conversations with end users and generates the corresponding events. For example, collector 655 may collect the events and the additional information and send the collected information to a queue. In some embodiments, collector 655 may be configurable and can be programmed to collect different events and/or event attributes described above as desired. For example, collector 655 may be configured to capture dialog state attributes, intent resolution attributes, entity resolution attributes, and error and timeout attributes. In some embodiments, collector 655 may also be configured to collect information regarding events 695 generated by a system other than the bot system.

Enrichment engine 660 may perform validation and enrichment on the collected events and other information and write them to database 670. For example, based on a collected IP address, enrichment engine 660 may determine the location of the end user associated with the IP address. As another example, enrichment engine 660 may extract certain features from the collected information, such as determining a web browser or channel used by the end user. REST server 680 may analyze the enriched events and other information and generate various reports based on certain aggregate metrics 672. The reports may be displayed to an owner, administrator, or developer of the bot system on user interface 692 through UI server 690. The owner, administrator, or developer of the bot system may provide feedback 694 to the bot system for improving the bot system.

Figure 7:
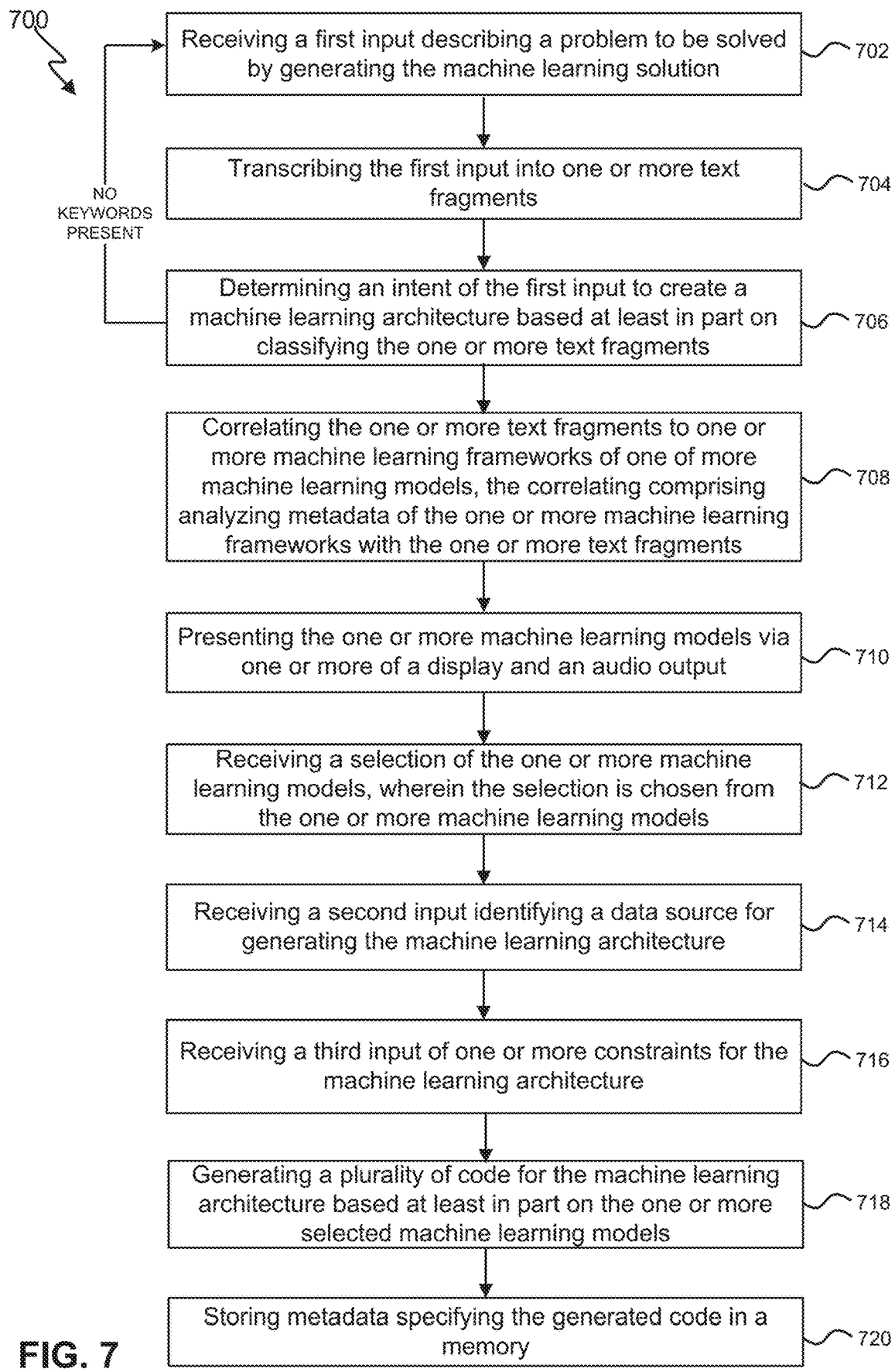
FIG. 7 illustrates a flowchart for a technique for generating a machine learning application using a chatbot.

FIG. 7 illustrates a process 700 for techniques for an intelligent assistant to generate a machine learning solution. Alternative embodiments may vary in function by combining, separating, or otherwise varying the functionality described in the blocks illustrated in FIG. 7. Means for performing the functionality of one or more of the blocks illustrated in FIG. 7 may comprise hardware and/or software components of a distributed system including computing devices, storage devices, network infrastructure, and servers illustrated in FIGS. 20, 21, and 22 and described below.

A bot (also referred to as a chatbot, chatterbot, or talkbot) is a computer program that can simulate a conversation with human users. The bot can generally respond to natural-language messages (e.g., questions or comments) through a messaging application that uses natural-language messages. Enterprises may use one or more bot systems to communicate with end users. The messaging application, which may be referred to as a channel, may be user preferred messaging applications that the end users have already installed and familiar with. Thus, the end users do not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, a person of ordinary skill in the art will recognize that the message may be an HTTP post call message, a SMS message, or any other type of communication between two systems.

End users may interact with the bot system through a conversational interaction (sometimes referred to as a conversational user interface (UI)), just as interactions between persons. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may handle user interactions without interaction with an administrator of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a REST call against enterprise services with the proper parameters) and generate a natural language response. The bot system may also prompt the end user for additional input parameters or request other additional information. In some embodiments, the bot system may also initiate communication with the end user.

A conversation with a bot may go through a specific flow including multiple states. The flow may define what would happen next based on an input. In some embodiments, a state machine that includes user defined states (e.g., end user intents) and actions to take in the states or from state to state may be used to implement the bot. A conversation may take different paths based on the user input, which may impact the decision the bot makes for the flow. For example, at each state, based on the user input, the bot may determine the end user's intent in order to determine the appropriate next action to take.

An intent may include a goal that the end user would like to accomplish. An intent maps an end user input to actions that a backend system should perform for the end user. Therefore, based on the phrases uttered by the end user in natural language, the bot would map the user utterance to a specific use case or job, such as ordering pizza, getting account balance, transferring money, making a purchase, making a return, etc. Human conversations are often non-linear in nature. End users may often branch into different states during a conversation. For example, if an end user wants to transfer funds from account A to a recipient, the end user may start a conversation with the bot system by, for example, asking the bot to pay the recipient for dinner. The bot may respond with, for example, "from which account?". The end user may pick a checking account but may then realize that he or she is not sure about the balance in the account. Thus, the end user may switch context to ask for balance and recent transactions, and so on. In other words, the end user may trigger changes in the flow and states, for example, from transferring money to checking balance, and then to recent transactions. At some time point, the end user may decide to return to the original intent—paying the recipient. Thus, one task of the bot system is to determining user intents from natural language utterances.

A bot may use a natural language processing (NLP) engine and/or a machine learning model (e.g., an intent classifier) to map user utterances to specific intents. For example, a machine learning based NLP engine may learn to understand and categorize the natural language conversation from the end user and to extract necessary information from the conversation to be able to take precise actions, such as performing a transaction or looking up data from a backend system of record.

FIG. 7 illustrates a flowchart for a process 700 for generating a machine learning application using a chatbot.

At 702, the technique can include receiving a first input describing a problem to be solved by generating a machine learning solution via interface 104, shown in FIG. 1. The first input can be received via aural (e.g., spoken by a user and received by a microphone of the system), text (e.g., entry through a keyboard), or interaction with a graphical user interface (GUI). For example, a human resource manager may desire to identify employees showing demonstrated improvement over the last several review cycles. Here, the user could be the human resource manager may have experience using software tools but no experience programming machine learning tools or software development. The problem could be defined as determining employee trends. A machine learning algorithm could be used to analyze the employee records, identify information regarding the performance of each employee, and conduct comparative analysis of historical reviews to determine performance trend of each of the employees. The machine learning algorithm can compare the performance trend of each employee against the performance trend from the other employees.

At 704, the technique can include transcribing the input into one or more text fragments. In embodiments in which the first input is received aurally, the technique can use natural language processing to transcribe a captured audio clip containing the input into one or more text fragments. If the first input was received as one or more words of text, a linguistics module can determine if the one or more words of text are compatible with the automatic machine learning system. A translation algorithm can be used to translate the one or more text fragments into a compatible langue. The one of more text fragments can be stored in the memory of the system.

At 706, the technique can include determining an intent of a first input to create a machine learning architecture based at least in part on classifying the one or more text fragments. The technique can compare the one or more text fragments with keywords associated with creating a machine learning model. If the model composition engine 132 determines that the one or more keywords are present in the one or more text fragments the model composition engine 132, shown in FIG. 1, can begin the process. If the one or more keywords are not present in the one or more text fragments, the technique can return to the beginning and continue to receive inputs.

At 708, the technique can include correlating the one or more text fragments to one or more machine learning models of the plurality of machine learning models stored in the library components 168, shown in FIG. 1. Each of the one or more machine learning models can have associated metadata. The associated metadata can be compared with the one more text fragments. In this way, model composition engine 132 maps the first input or query of a user 116 to certain phrases to determine the intent of the user 116. If the correlation of the one or more text fragments with the associated metadata exceeds a predetermined percentage, the model composition engine 132, shown in FIG. 1, identifies the machine learning model as being correlated to the one or more text fragments. The model composition engine 132 can recommend the correlated machine learning model to the user. The model composition engine 132 can present the correlated model via a user interface, chatbot, or display.

At 710, the technique can present the correlated model to the user. The type of machine learning solution can be selected via the intelligent assistant (e.g., chatbot). The possible machine learning solutions can include but are not limited to a classification model, a recommender model, or a reinforcement learning model. The model composition engine 132 can display the correlated model on an interface 104. The model composition engine 132 can present the correlated model to the user via the intelligent assistant (e.g., the chatbot). In various embodiments, the model composition engine 132 can present multiple models to the user to select from.

At 712, the technique can include receiving a selection of the machine learning model where the selection is chosen from the one or more machine learning models. The user 116 can select the model through the interface 104. The interface 116 can be a graphical user interface including but not limited to checkboxes, drop-down menus, or graphical symbols that can be selected by a user 116. The interface 116 can also receive audio information from a user 116 that would indicate selection of the machine learning model. The interface 116 can receive the selection of the model and transfer the selection information to the model composition engine 132. For example, a user 116 can select between a binary or a multi-class model. The user 116 can also select a tree based model or vector based machine type model.

At 714, the technique can include receiving a second input for location of data. The second input can include the location of the data source for generating the machine learning model. The data can be stored locally in a memory. The data can also be stored on one or more remote servers (e.g., a cloud server). The model composition engine 132 can identify potential locations for the data and present them to the user 116 through the interface 104.

At 716, the technique can include receiving a third input for one or more constraints. The constraints can include but are not limited to system resources, locations, security requirements, and privacy. The model composition engine 132 can identify one or more application constraints based at least in part on the selected model. The model composition engine 132 can present the potential constraints to the user 116 through the interface 104.

In various embodiments, the technique can include a fourth input. The fourth input can include additional services required for the machine learning model. The additional services can include monitoring, logging and alerting services. The model composition engine 132 can identify one or more additional services based at least in part on the selected model. The model composition engine 132 can present the potential services to the user 116 through the interface 104.

At 718, the technique can include generating a plurality of code for a machine learning architecture. The model composition engine 132 can use the selected model and the selected data to generate a trained model.

Techniques disclosed herein use a hierarchical classification model for creating and/or querying a hierarchical classification model for identifying classifications (e.g., determining user intents) based on user input data. In certain embodiments, a computer-implemented method for querying a hierarchical classification model to associate an input with a class in a plurality of classes is disclosed. The computer-implemented method may include receiving the input by the hierarchical classification model that includes a plurality of classification models and has a tree structure that includes a plurality of nodes on multiple layers, and classifying, sequentially by a set of classification models associated with a set of nodes in the tree structure, the input as associated with the class in the plurality of classes. The plurality of nodes may include leaf-nodes and non-leaf nodes, where the non-leaf nodes may include a root node on a first layer of the multiple layers. Each of the leaf nodes and the non-leaf nodes may be associated with a respective classification model in the plurality of classification models of the hierarchical classification model. Each leaf node may be associated with at least two but less than a threshold number of classes. Each non-leaf node may have two child nodes, where each child node may be associated with a respective set of classes in the plurality of classes. A difference between numbers of classes in the two sets of classes may be zero or one, and the classification model associated with the non-leaf node may be configured to classify inputs into the two sets of classes. The set of nodes may include one node on each layer of the tree structure and may form a path from the root node to a leaf node. Each node in the set of nodes other than the root node may be a child node of a node on an immediate upper layer of the tree structure.

In some embodiments, classifying the input as associated with the class in the plurality of classes may include classifying, by a binary classification model associated with the root node, the input as belonging to classes associated with a first child node of the root node, where the first child node may be on a second layer of the tree structure. In some embodiments, classifying the input as belonging to the classes associated with the first child node of the root node may include: determining, by the binary classification model, a first value indicating a likelihood that the input belongs to the classes associated with the first child node of the root node; determining, by the binary classification model, a second value indicating a likelihood that the input belongs to classes associated with a second child node of the root node; and classifying the input as belonging to the classes associated with the first child node of the root node based on determining that the first value is greater than the second value or based on determining that the first value is greater than a threshold value. In some embodiments, classifying the input as associated with the class in the plurality of classes may further include classifying, by a second binary classification model associated with the first child node on the second layer, the input as belonging to classes associated with a child node of the first child node, where the child node of the first child node may be on a third layer of the tree structure. In some embodiments, the second binary classification model may include a support vector machine (SVM) classifier, a logistic regression classifier, a naive Bayes classifier, a decision tree classifier, a nearest neighbor classifier, or a neural network classifier.

In some embodiments, classifying the input as associated with the class in the plurality of classes may include classifying, by a multiclass classification model associated with the leaf node in the set of nodes, the input as associated with the class, where the multiclass classification model may be configured to distinguish inputs associated with two or more individual classes. In some embodiments, the multiclass classification model may include a multiclass support vector machine (SVM) classifier, a K-nearest neighbor's classifier, or a neural network classifier.

In some embodiments, every path of the tree structure from the root node to a respective leaf node may include a same number of nodes. In some embodiments, the threshold number may be 6 or fewer. The plurality of classes may include 20 or more classes. In some embodiments, the input may correspond to a user utterance to a chatbot, and the plurality of classes may correspond to user intents associated with user utterances.

In certain embodiments, a non-transitory computer readable medium may store a plurality of instructions executable by one or more processors. The plurality of instructions, when executed by the one or more processors, may cause the one or more processors to receive an input by a hierarchical classification model that is configured to associate the input with a class in a plurality of classes and includes a plurality of classification models. The hierarchical classification model may have a tree structure that includes a plurality of nodes on multiple layers. The plurality of nodes may include leaf-nodes and non-leaf nodes, where the non-leaf nodes may include a root node on a first layer of the multiple layers. Each of the leaf nodes and the non-leaf nodes may be associated with a respective classification model in the plurality of classification models of the hierarchical classification model. Each leaf node may be associated with at least two but less than a threshold number of classes. Each non-leaf node may have two child nodes, where each child node may be associated with a respective set of classes in the plurality of classes. A difference between numbers of classes in the two sets of classes may be zero or one, and the classification model associated with the non-leaf node may be configured to classify inputs into the two sets of classes. The plurality of instructions may also cause the one or more processors to classify, sequentially by a set of classification models associated with a set of nodes in the tree structure, the input as associated with the class in the plurality of classes. The set of nodes may include one node on each layer of the tree structure and may form a path from the root node to a leaf node. Each node in the set of nodes other than the root node may be a child node of a node on an immediate upper layer of the tree structure.

In certain embodiments, a system may include one or more processors and a memory coupled to the one or more processors and storing instructions. The instructions, when executed by the one or more processors, may cause the system to receive an input by a hierarchical classification model that is configured to associate the input with a class in a plurality of classes and includes a plurality of classification models. The hierarchical classification model may have a tree structure that includes a plurality of nodes on multiple layers. The plurality of nodes may include leaf-nodes and non-leaf nodes, where the non-leaf nodes may include a root node on a first layer of the multiple layers. Each of the leaf nodes and non-leaf nodes may be associated with a respective classification model in the plurality of classification models of the hierarchical classification model. Each leaf node may be associated with at least two but less than a threshold number of classes. Each non-leaf node may have two child nodes, where each child node may be associated with a respective set of classes in the plurality of classes. A difference between numbers of classes in the two sets of classes may be zero or one, and the classification model associated with the non-leaf node may be configured to classify inputs into the two sets of classes. The instructions may also cause the one or more processors to classify, sequentially by a set of classification models associated with a set of nodes in the tree structure, the input as associated with the class in the plurality of classes. The set of nodes may include one node on each layer of the tree structure and may form a path from the root node to a leaf node. Each node in the set of nodes other than the root node may be a child node of a node on an immediate upper layer of the tree structure.

At 720, the technique can include saving the plurality of code to a memory. The plurality of code can be saved in the memory of the computing system or in memory of a remote server (e.g., cloud server). The plurality of code can be executable code. The plurality of code can be configured to be incorporated into one or more applications.

In various embodiments, the user 116 can select how the solution is received. The solution can be received via the interface 104. The solution can be received via the intelligent assistant (e.g., chatbot). The solution can be communicated through a speaker. The intelligent assistant can also suggest multiple pre-defined environments to present the information in. Additional environments can also be provided to the chatbot.

In various embodiments, the intelligent assistant can analyze the one or more selected constraints to generate a second plurality of code for the machine learning architecture based optimizing the one or more selected constraints. The model execution engine 108 can display an optimized solution generated by the second plurality of code to the user. In various embodiments, a user can identify test data to determine the output of the machine learning model. Prior to deployment, the intelligent assistant can display optimal solutions that meet the constraints to the user.

The model composition engine 132 can be tested during development of the machine learning framework. For example, if we are creating a model to test worker productivity, the model composition engine 132 can review the employee record data, build a machine learning model to optimize productivity, apply a sample data set, and provide an answer to the user 116. This answer can be compared with user's perceptions of the most productive user to help validate the model. The chatbot further can query the user 116 if she desires a quarterly report on the most productive workers.

In some embodiments, end users can be controlling the development. If a simple interface, e.g., a drop-down menu is used, a user could interact with the chatbot to change default views of the drop-down list. The chatbot could ask what is desired in the drop-down list. The chatbot can modify the drop-down list based on user preferences. In certain embodiments, an end user can interact with the model composition engine 132. In that way, an end-user can have a bespoke interaction with the artificial intelligence system.

In some embodiments, the chatbot would get the initial intent of the user to create a new machine learning solution or modify an existing machine learning solution.

The model composition engine 132 can employ a number of default settings. The default settings help the artificial assist establish the machine learning architecture even if all the settings are not specified by a user 116. For example, a user 116 may not specify where the trained model should be stored or the source of the data used for training the model. In various embodiments, these default settings could be used by the model composition engine 132 in creating the trained model. In various embodiments, the intelligent assistant can detect that the user 116 did not specify a setting during the process of generating the model. The intelligent assistant can query the user 116 regarding the setting or make a recommendation to the user 116 for the setting.

In various embodiments, the model composition engine 132 and keep track of a user's explicit inputs over assumptions and default settings. The model composition engine 132 can use these explicit inputs for creating new machine learning models or processes.

In various embodiment, the computer-implemented method can include one or more services including monitoring, logging, and alerting for the machine learning architecture.

In various embodiments, the computer-implemented method can include receiving a fourth input identifying how the machine learning solution is presented.

In various embodiments, the computer-implemented method can include analyzing the one or more constraints to generate a second plurality of code for the machine learning architecture based at least in part on optimizing the one or more constraints. The method can further include generating an optimized solution. The method can include displaying the optimized solution.

In various embodiments, the computer-implemented method can include deploying the machine learning architecture via an intelligent assistant interface.

In various embodiments, the first input can include at least one of an aural input, a textual input, and a graphical user interface input.

In various embodiments, the one or more machine learning models can include at least one of a classifier model, a recommender model, and a reinforcement-learning model.

In various embodiments, the one or more constraints can include at least one of resources, location, security, and privacy.

It should be appreciated that the specific steps illustrated in FIG. 7 provide particular techniques for generating a machine learning application according to various embodiments of the present disclosure. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

III. Automated Customization and Deployment of a Given Product to any New Client Once a core machine learning product is specified that solves a core problem for a particular instantiation, it is matched to a machine learning model. That machine learning model is specified from library components 168 that include a pipeline 136 that specifies various microservices routines 140, software modules 144, and/or infrastructure modules 148. Functional areas of the library components 168 are customized on a per-instantiation basis that adapts to a unique client's data, QoS, KPIs, and other requirements, e.g., automated adaption of features for library components 168, automated bias elimination in a machine learning model, automated model training to achieve QoS and KPIs, and Automated microservices routine deployment configuration.

Various disclosed techniques allow for automation of much of the traditional development process. The automation can be done at scale with framework to instantiate an instance of the machine learning model for a particular situation. Even after the machine learning model is compiled into a machine learning application, the monitored to capture anomalies before they manifest into bad predictions. This can be various QoS or KPI values for the entire machine learning application or intermediate results for various library components.

IV. Safe Serialization of the Predicted Pipeline (Including the Model)

Persisted machine learning models can be typically implemented with executable code (e.g., Pickle). Such executable code can be susceptible to security vulnerabilities such as malicious code injection. One problem can exist if the storage is compromised and bad agents can tamper the serialized machine learning models through modification of various library components 168.

In various embodiments, the library components 168 can each be cryptographically signed when stored and/or for each instantiation of the pipeline 136 for the serialized machine learning model. Each library component 168 could have a unique key for each component instance or shared for an instance of the machine learning model. The private key can be stored in key storage 172 at a secure location separate from the library components 168. Access to the secure location can be authenticated and has authorization checks. Encryption and/or one-way hash functions can be used to detect tamper with the code. The decryption/encryption with the remotely stored key can be done for each library component 168 and optionally the machine learning model itself. In this way, malicious code does not get into the library components 168, any integration of the library component 168 into a machine learning model or complied machine learning application. Any kind of Python models (or the like) and steps in the pipeline or workflow could be signed or encrypted. Once a library component 168 or machine learning model is customized for a given instantiation that can be encrypted or signed. The uncustomized library components can also be signed or encrypted so hacks do not infect multiple instantiations.

Figure 8:
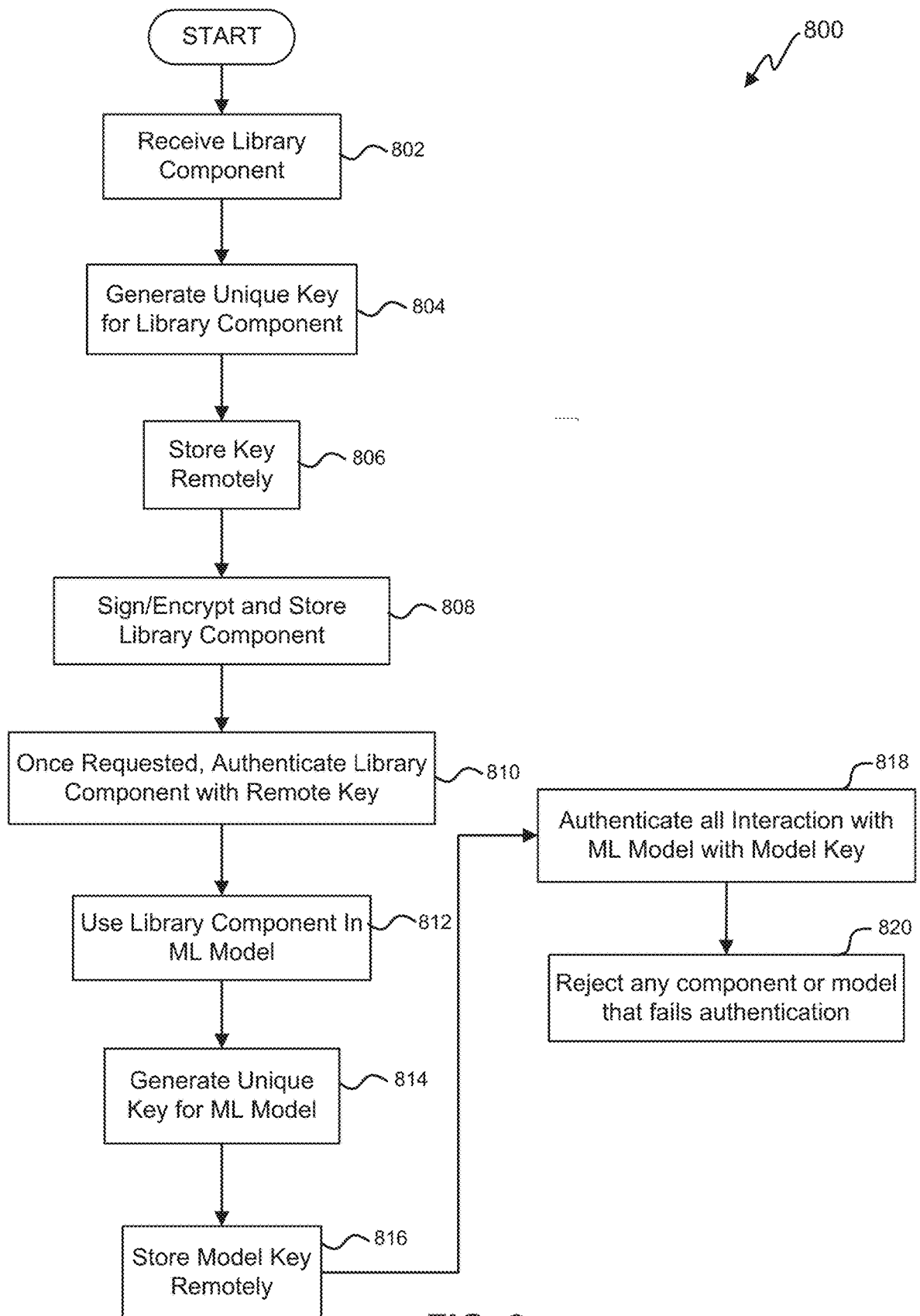
FIG. 8 illustrates a flowchart for protecting a serialized model and the storing private keys in a secure location.

FIG. 8 illustrates a process 800 for techniques for safe serialization of the predicted pipeline (including the model). Alternative embodiments may vary in function by combining, separating, or otherwise varying the functionality described in the blocks illustrated in FIG. 8. Means for performing the functionality of one or more of the blocks illustrated in FIG. 8 may comprise hardware and/or software components of a distributed system including computing devices, storage devices, network infrastructure, and servers illustrated in FIGS. 20, 21, and 22 and described below.

At 802, the functionality can include receiving a library component.

At 804, the functionality can include generating a unique key pair for one or more library components.

At 806, the functionality can include storing key remotely. The key storage can be separate from the one or more library components.

At 808, the functionality can include signing/encrypting and storing the library components.

At 810, the functionality can include authenticating the library component with a remote key once requested.

At 812, the functionality can include using the library component in a machine learning model.

At 814, the functionality can include generating a unique key for a machine learning model.

At 816, the functionality can include storing the model key remotely.

At 818, the functionality can include authenticating all interaction with the machine learning model with model key.

At 820, the functionality can include rejecting any component or model that fails authenticating.

It should be appreciated that the specific steps illustrated in FIG. 8 provide particular techniques for generating a machine learning application according to various embodiments of the present disclosure. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

V. Automated on-Demand Library-Check (Java/Python/go, with all Dependencies)

Various embodiments described herein relate to automated and/or on-demand analysis and predictions for code integration requests. For example, during the development, maintenance, or modification of the source code for a software project or component, a software developer may integrate various external code bases into the source code. For example, such external code bases may include open source software developed and distributed by a third-party open source provider. Certain open source libraries and other external code bases may have associated licenses that must be agreed to and complied with by software developers that wish to integrate any code from the external code bases into their own proprietary software projects. Software licenses (e.g., Free and Open Source Software (FOSS) licenses) associated certain libraries may be consistent and compatible, or inconsistent and/or incompatible with the corresponding licenses for other software libraries. Additionally, certain libraries and other external code bases may have known security vulnerabilities and/or cost considerations that may make those libraries more or less desirable to be integrated within a software project. Furthermore, open source libraries and other external code bases may themselves include dependencies to other libraries or code bases, which may have separate licenses, costs, security issues, and still other dependencies.

Due to the potential risks, issues, and implications of integrating external libraries and code bases into software projects, an organizations may include software architecture authorization system to analyze code integration requests, and to approve or deny such code integration requests based on one or more potential code integration issues, including license compliance or compatibility, security vulnerabilities, costs, further software dependencies, the recency and priority of the software project, the availability of security patches, and the existence of safer alternative libraries. Such software architecture authorization systems may perform the analyses and approval of requests to integrate software libraries or any external code bases using entirely automated processes, entirely manual processes, or semi-automated and semi-manual processes. Many such authorization systems many involve a substantial time delay for processing requests from clients developing software projects to integrate software libraries or external code, and such systems might not provide any explanation or suggestions of alternative software libraries.

Accordingly, various techniques (e.g., methods, computing devices and systems, non-transitory computer-readable storage media storing programs, code, or instructions executable by one or more processors, and the like) are described herein for performing automated and/or on-demand analyses and predictions of code integration requests. In certain embodiments, a code integration request prediction system may be implemented and used to analyze source code and predict outcomes of requests to integrate external code bases (e.g., open source libraries) into a software project. In some implementations, a code integration request prediction system may be implemented as a real-time static source code analysis plug-in within a software development environment. As described below in more detail, such systems may provide predictions of outcomes for potential code integration requests, including specific outcomes (e.g., approval or denial of software library use and integration), corresponding confidence levels, causes of the predictive outcomes, and suggestions for alternative libraries. Additionally or alternatively, a code integration request prediction system may be implemented as a separate standalone system which may review and analyze source code, either in real-time during code development or maintenance, or via a source code crawling and analysis process. For example, a source code crawler may be used to detect the presence of integrated external code bases (e.g., via references to or code comments from known software libraries) in previously written source code, and may perform analyses and predictions on whether or not the external code bases would or should be permitted for integration into the software project, by the software architecture authorization system.

As noted above, certain techniques described herein may be implemented to predict outcomes of software code integration requests. In some embodiments, a model execution engine (e.g., within a code integration request prediction server or plug-in within a software development environment) may receive input data corresponding to a request to integrate an external code base into a source code project or component. Such input data may identify one or more external code bases (e.g., open source software functions, libraries, etc.) associated with the source code project and component, including the external code base to be integrated and/or additional external code bases that have been previous integrated within the same project or component. Additionally, the input data for code integration request may include one or more characteristics of the source code project or component, such as the associated product or project of the source code component, the associated developer or organization, the purpose for integrating the external code base or functionality to be leveraged within the external code base, etc. The model execution engine then may access one or more machine-learning (e.g., artificial intelligence-based) models trained using historical software code integration requests. Using the trained machine-learning model(s), the model execution engine may determine a predicted outcome (e.g., by a software architecture authorization system) of a request to integrate the external code into the source code project/component. After determining the predicted output of the code integration request, the predicted output may be provided via an interface, for example, to a developer within a software development environment. In some embodiments, if the predicted output of a code integration request is that the software architecture authorization system of the organization would likely deny the code integration request, then additional information may be generated and provided to the developer/user, such as causes for the denial of the code integration request and/or suggestions of alternative code bases that may support similar functionality.

Thus, the various techniques described herein may provide significant technical advantages within the contexts of real-time software development, software maintenance, and software source code analysis and review. Specific technical advantages may include support for real-time scanning of source code to detect code integration from external sources, improvements in code scanning to identify potential security vulnerabilities and licensing issues, either for in-development code or for previously deployed legacy code.

Aspects of the present disclosure provide various techniques (e.g., methods, systems, devices, computer-readable media storing computer-executable instructions used to perform computing functions, etc.) for generating and using machine learning models to predict outcomes of code integration requests. As discussed in more detail below, machine learning models may be generated and trained based on previous code integration requests submitted to and processed by a software architecture authorization system. Based on the machine learning and artificial intelligence-based techniques used, one or more models may be trained which may be developer-specific, project-specific, and organization-specific, meaning that trained models may output different outcome predictions, confidence levels, causes, and suggestions depending on the current developer, project, and organization. The machine learning models also may be trained based on specific inputs received in connection with previous code integration requests (e.g., the software library to be integrated, the target source code module, the reason for the code integration requests and/or functionality to be used within the library, etc.). Then, following the generation and training of one or more machine learning models, such models may be used to predict outcomes (e.g., approval or denial for authorization) for a potential code integration request. Such models may also be used to autonomously and independent identify the reasons associated with the predictions (e.g., security vulnerabilities, license incompatibility, etc.), and/or to suggest alternative software libraries that may be integrated instead to provide the desired functionality.

Figure 9A:
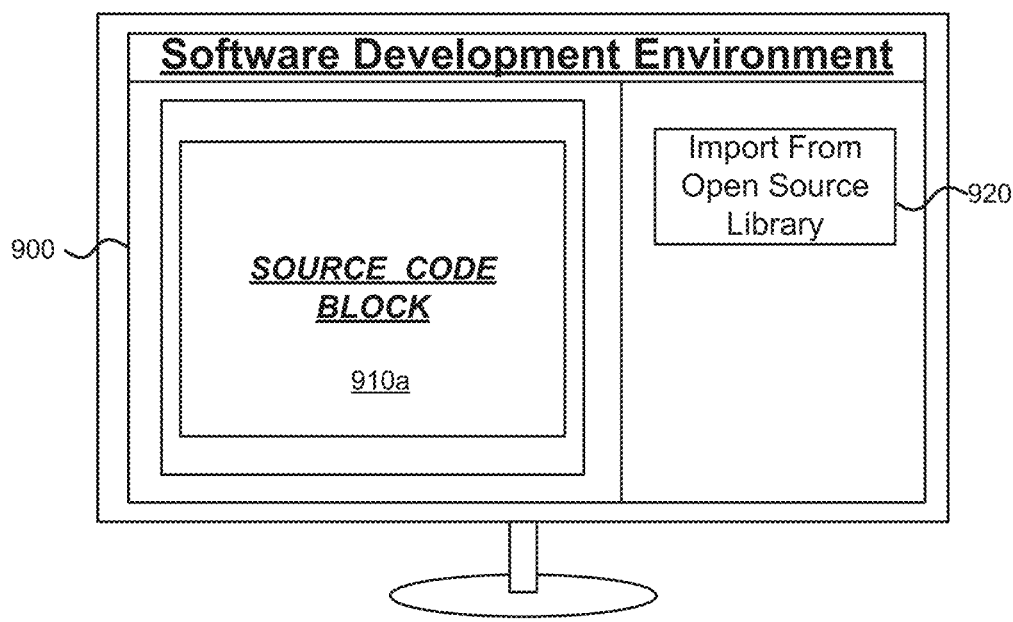
FIGS. 9A and 9B illustrate exemplary user interface screens generated by a software development environment.
Figure 9B:
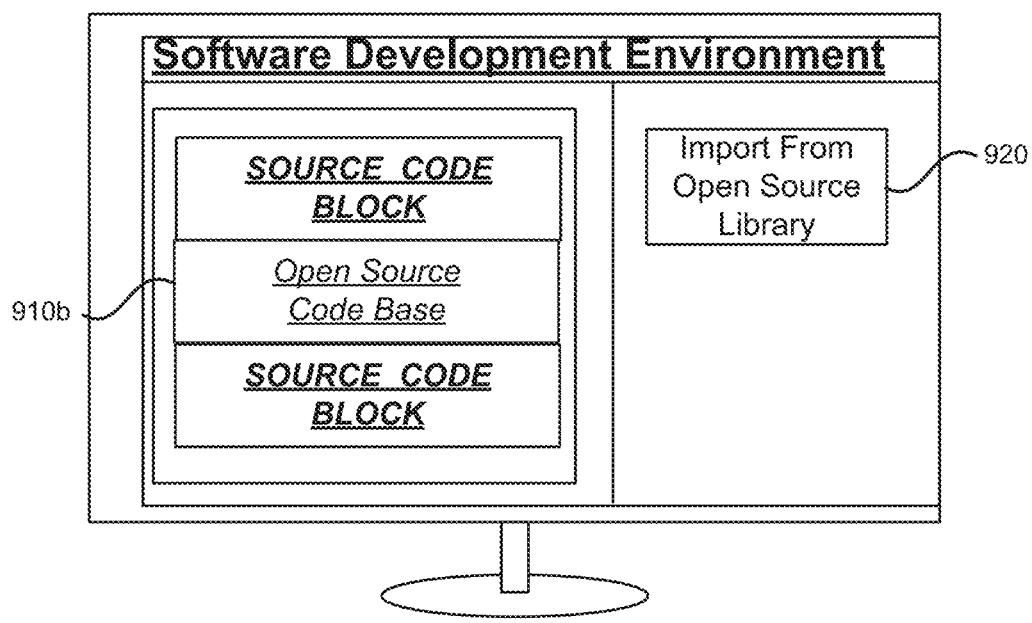

Referring now to FIGS. 9A and 9B, two examples are shown of user interface screens generated by a software development environment. Referring to FIG. 9A, the user interface 900 of the software development environment includes a first window containing a source code block 910a currently being viewed, written, or updated by a software developer user. During the development process, the user may desire to integrate an open source software library or other external code base. An external code base may refer to any piece of software developed and/or distributed by a third-party provider, in contrast to the proprietary software developed internally to an organization. Thus, external code bases may include software functions or modules within open source software libraries, as well as other non-open source software provided by other third-party software distributers.

In this example, the software developer may select a software library importation component 920 to browse and select one or more open source libraries to be integrated within the current software project 900. For instance, a user interface button 920 may invoke a listing of available open source libraries from which the developer may select to incorporate into the current software project. In such examples, the user may select a library, view and import (e.g., copy in, link to, or reference, etc.) one or more code blocks or functions within the external software library, thereby integrating the external code bases into the current software project. Thus, as shown in FIG. 9B, the updated source code project 900 includes an open source code base 910b integrated into the software project. It should be noted that the insertion of the open source code base 910b into FIG. 9B is illustrative only. In other examples, the integration of an external code base (e.g., open source library) may take many different forms, including directly copying in (e.g., cutting and pasting) commented portions of source code from an open source library, or linking to an open source library and invoking one or more functions, etc. Additionally, although a user interface component 920 is shown in this example to allow developers to browse and select from an available list of open source libraries, it should be understand that component 920 need not be included in other embodiments, and developers may use any other available technique for integrating an external code based into the software project 900.

Further, the examples shown in FIGS. 9A and 9B depicts the development of a software source code project in real-time by a developer. As discussed below, the use of trained models to predict the outcomes of code integration requests may have particular technical advantages when used during real-time software development by a developer. Such technical advantages may include real-time scanning and analysis for potential security vulnerabilities, licensing conflicts, and real-time code optimization, etc. Thus, in such embodiments, some or all of the components of the code integration prediction server 910 described below may be implemented via a plugin component within the software development environment 920. Alternatively, the components of the code integration prediction server 910 may be implemented as an independent service that may be accessed by the development environment 920 in real-time in response to user actions during the software development process. However, in other embodiments, trained models used to predict the outcomes of code integration requests need not be used during real-time software development, but may be used to analyze previously written source code. For instance, one or more of the trained models described herein may be used with a source code crawling tool or other software analysis tool to identify which open source libraries (or other external code bases) are used within a software project or component. A source code crawling tool may, for example, identify one or more comments within the source code as matching designated comments that are associated with known open source libraries. In other examples, a compiled and/or linked software component may be analyzed, and/or the execution of the component may be analyzed to detect which open source libraries are used by the code.

Figure 10:
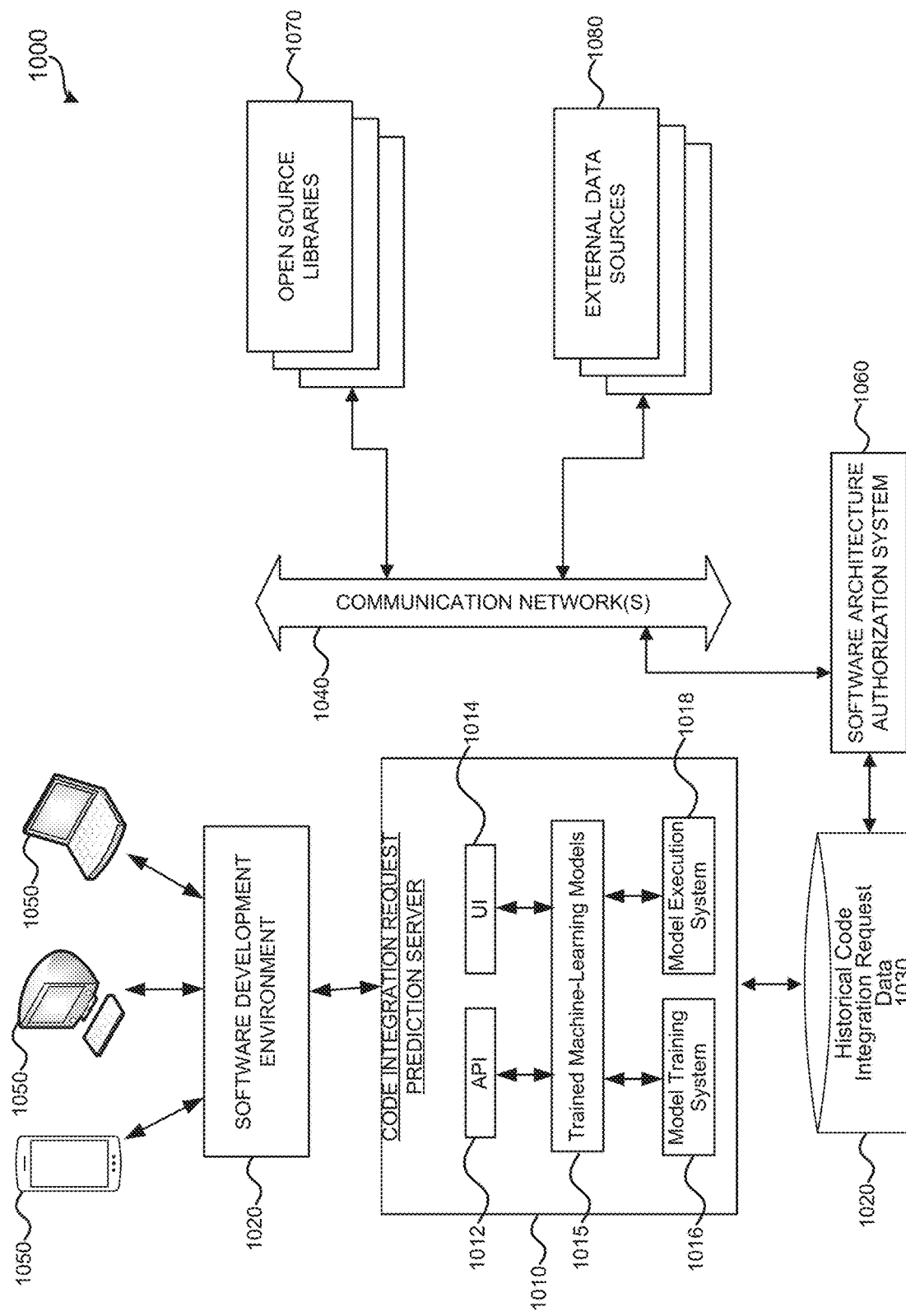
FIG. 10 illustrates an exemplary a distributed computing environment including a code integration request prediction server that may be used for receiving and processing input data, generating and using machine-learning or artificial intelligence models to generate outputs predictive of code integration requests.

Referring now to FIG. 10, an example is shown of a distributed computing environment 1000 including a code integration request prediction server 1010 that may be used for receiving and processing input data, generating and using machine-learning or artificial intelligence models to generate outputs predictive of code integration requests. As shown in this example, a code integration request prediction server (or prediction server) 1010 may communicate with various client devices 1050, software development environments 1020, and other various systems over one or more communication networks 1040, to generate and train machine learning models as well as to use the trained models to predict code integration request outcomes. As shown in this example, the prediction server 1010 may be implemented as one or more independent computer servers, systems, or services configured to receive requests from a software development environment 1020. In other embodiments, the prediction server 1010 may be implemented as a plugin component within a software development environment 1020. Additionally, although this example shows client devices and systems 1050 interacting with the prediction server 1010 indirectly via the development environment 1020, in other cases the client devices 1050 may interact directly with the prediction server 1010 to generate and train models, execute models to make predictions regarding code integration requests, etc. For example, client devices 1050, development environment components 1020, or other components within the environment (e.g., historical data stores 1030, software architecture authorization systems 1060, open source libraries 1070, and external data source 1080) may interface with one or more application programming interfaces (APIs) 1012 and/or user interface components 1014 supported by the prediction server 1010, to train and generate machine learning models for predicting outcomes for specific code integration requests. The prediction server 1010, discussed in more detail below, may include various hardware and/or software systems and sub-components, including trained machine-learning models 1015 as well as model training systems 1016 and model execution systems 1018. Using these systems, as well as data stores 1030 storing historical code integration request data and/or other external data sources 1080, the prediction server 1010 may train one or more machine learning or artificial intelligence models. Execution of the one or more machine learning or artificial intelligence models may generate an output that can be evaluated to predict outcomes for requests to integrated particular external code bases within a software project or component.

As shown in the example computing environment 1000, client systems 1050 may include client computing devices of software developer users, software analysis/auditor users, and the like. As discussed below, the client systems 1050 may initially interact with the software architecture authorization system 1060 during a number of code integration requests, the request and response data of which may be stored and analyzed to be used as the model training data. After the generation of the trained models, client devices may initiate access to the prediction server 1010 (e.g., directly or indirectly via the development environment 3020), to execute the trained models and predict outcomes to code integration requests.

As discussed below in more detail, the prediction server 1010 may generate, train, and execute machine-learning models 1015 configured to provide specific predictions of outcomes for potential code integration requests. The trained models used to predict the outcomes may be based on the previous/historical code integration requests, including user-specific, library-specific, and other context-specific data, such as the particular developer, project, and the developer's reasons for wanting to include the external library, as well as the recency of the project/system, the other external code bases used by the same project/component, and the like. A model training system 1016 may retrieve data from data stores 1030 and/or client systems 1050, in order to train models 115 to generate predictive outcomes for code integration requests, which are calculated for specific users, software projects, and code integration request characteristics. A model execution system 1018 may access the trained machine-learning models 1015, provide and format input data to the trained models 1015 (e.g., code integration request data) and determine the predicted outcomes based on the execution of the models. The outputs of the trained models 1015 may be provided to client devices 1050 or other output systems via the API 1012 and/or user interface components 1014. Further, the outputs of the trained models 1015 may include not only a prediction of the outcome of the code integration request (e.g., approved or denied) but also various related data such as a confidence value associated with the prediction, one or more causal factors upon which the prediction is based (e.g., security issues, license incompatibility, other code dependencies, etc.), and one or more suggestions for alternative open source libraries (or other external code bases) that are determined to have a higher probability of approval.

In the embodiments discussed herein, client computing devices and systems 1050 may include mobile devices (e.g., smartphones, computing tablets, personal digital assistants (PDAs), wearable devices, etc.) running a variety of mobile operating systems, and being Internet, e-mail, short message service (SMS), Blackberry®, or other communication protocol enabled. The client computing devices and systems 1050 also may be general-purpose computers, such as personal computers and/or laptop computers running various operating systems. The client systems 1050 also may be workstation computers running any of a variety of operating systems. Alternatively, or in addition, client systems 1050 may be any other electronic device, such as a thin-client computer, an Internet-enabled gaming console system and/or personal messaging devices or other devices capable of communicating over network(s) 1040. Although the illustrated computing environment 1000 is shown with three client systems 120, it should be understood that any number of client computing devices may be supported. Other devices, such as sensor devices, etc., also may interact with the prediction server 1010.

The communication network(s) 1040 shown in computing environment 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1040 may be a local area network (LAN), such as one based on Ethernet, Token-Ring and/or the like. Network(s) 1040 also may be or may include a wide-area network such as the Internet. Network 1040 may include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

The code integration request prediction server 1010 may be a server system including one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1010 may be adapted to run one or more services or software applications described herein. For example, server 1010 may include web servers and/or application servers configured to perform processing and execute software components described herein to implements to various embodiments and aspects of the present disclosure.

The prediction server 1010 may execute an operating system including any available server operating system. The prediction server 1010 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

Data repositories 1030 may include databases or data store structures storing various data relating to previous (or historical) code integration requests. Such historical data may include data detailing the particular characteristics of each code integration request (e.g., the developer identity and characteristics, the particular client device and characteristics, the network(s) over which the request was made, the characteristics of the particular software component/project, the open source library (or other external code base) requested to be included, other open source libraries already used by the software component/project, the functionality of software project, the planned deployment environment and exposure to security threats (e.g., untrusted networks or computers) anticipated for the software project, the reasons provided (if any) by the developer for requesting integration of the software library, and any other relevant data regarding the code integration request. Additionally, the historical data also may include the corresponding outcome for each of the previous code integration requests. The corresponding outcome data may indicate whether or not each code integration request was approved by the software architecture authorization systems 1060, as well as any reasons or causal factors provided by the software architecture authorization systems 1060 when approving or denying the previous request. Data stores 1030 may reside in a variety of locations. For example, one or more of the data stores 1030 may reside on non-transitory storage media local to (and/or resident in) server 1010. Alternatively, data stores 1030 may be stored separately and externally from the prediction server 1010, and may communicate with server 1010 via a network-based or dedicated connection. In some embodiments, data stores 1030 may reside in a storage-area network (SAN). Similarly, any necessary data or files for performing the functions of the model server 1010 may be stored locally on the prediction server 1010 and/or remotely, as appropriate. In some embodiments, data stores 1030 may include relational databases that are adapted to store, update, and retrieve data in response to formatted queries and commands.

Machine learning models are trained for generating predictive outcomes for code integration requests.

Figure 11:
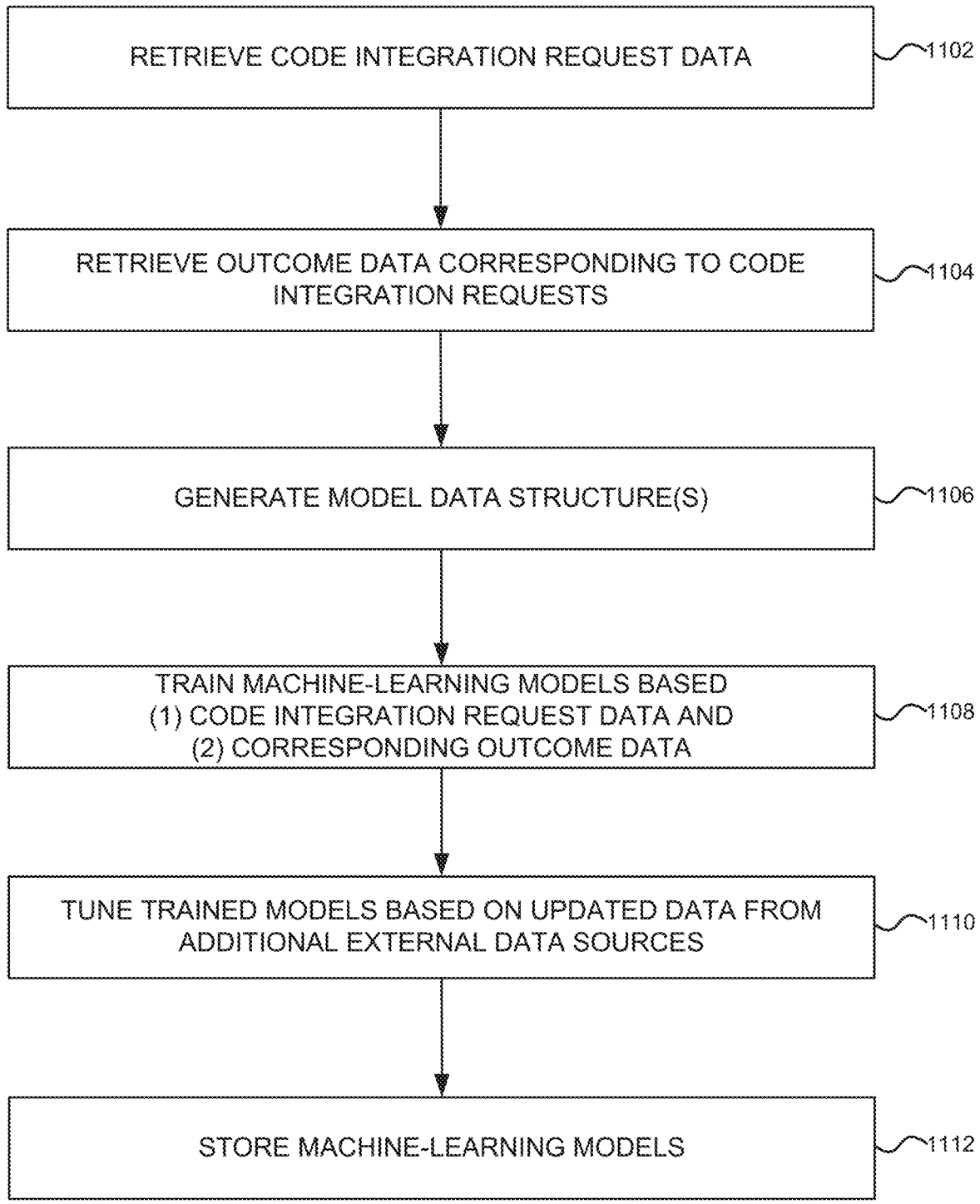

Referring now to FIG. 11, a flowchart is shown illustrating a process of training a machine-learning model to generate predictive outcomes for code integration requests, that is, a prediction of whether or not a potential request to integrate an external code base within a software component/project would be approved by a software architecture authorization system. As described below, the processes of receiving and storing training data, and generating and training model structures may be performed by the various devices operating within the computing environment 1000, including the model training system 1016 of the prediction server 1010. However, it should be understood that the techniques described in reference to FIG. 10 need not be tied to any particular devices or servers within the computing environment 1000, but may be implemented by any computing systems and devices described or supported herein.

At 1102, the model training system 1016 and/or other systems within the prediction server 1010 may retrieve code integration request data, for example, from the historical code integration request data repository. For example, the code integration request data may include one or more data sets corresponding to previous requests made by developers to integrate external code bases into software projects/components. For example, the code integration request data retrieved at 1102 may include the particular characteristics for each of a plurality of code integration requests and the corresponding responses. As noted above, such request characteristics may include, for example, the identity and characteristics of the developer user initiating the request, the particular client device (and the hardware, software, and/or network characteristics thereof) from which the request was initiated, the communication network(s) over which the request was made, the open source library (or other external code base) that was requested by the developer, and one or more characteristics of the particular software component or project into which the developer requested to integrate the open source library. The characteristics of the software component or project may include the functionality of the software component/project, its stage in development, the security requirements associated with the software, other open source libraries used by the software, the recency of the maintenance to the software (e.g., indicating whether the project is still maintained and the dependencies are available or missing), security patches installed on the software, the purpose and organizational priority of the software, and the computing and networking environments into which the software is to be deployed (e.g., accessible by untrusted users, computers, or networks). Additionally, the characteristics of the code integration requests may include any descriptions or reasons provided by the developer at the time of the request to explain or justify the request to include the particular requested library. Such descriptions also may include an indication of whether a code integration request is related to a previous code integration request that was requested and then denied by the software architecture authorization system 960.

At 1104, the model training system 916 and/or other systems within the prediction server 1010 may retrieve the details and characteristics of the corresponding outcomes for each of the previous code integration requests. These previous/historical outcome data correspond to the responses made by the software architecture authorization system 1060 to the code integration requests received from developers, which may be required in order to train a machine learning model to predict outcomes. In some embodiments, the previous/historical outcome data for a code integration request might include only a binary value (e.g., approved or denied) indicating whether or not a previous code integration request was permitted. However, in other embodiments, additional related data may be included within previous/historical outcome data retrieved at 1104, such as one or more reasons or causal factors provided by the software architecture authorization systems 1060 when approving or denying the previous request. Such reasons or causal factors may indicate that a code integration request was denied, for example, because of a security vulnerability associated with the requested open source library, or because the organization does not comply with the license terms of the open source library, or because the license terms of the open source library are incompatible with the software project and/or other the terms of other licenses used by the open source library, etc.

At 1106, the model training system 1016 (or other components with the prediction server 1010) may generate one or more model data structures, and at 1106 the models may be trained using machine-learning algorithms based on training data sets including any, some, or all of the code integration request/outcome data received in steps 1102-1104. In various embodiments, various different types of trained models may be used, including classification systems that execute supervised or semi-supervised learning techniques, such as a Naïve Bayes model, a Decision Tree model, a Logistic Regression model, or a Deep Learning Model, or any other machine learning or artificial intelligence based prediction system that may execute supervised or unsupervised learning techniques. For each machine learning model or model type, the appropriate data structures may be generated in step 1106, and in step 1108 the models may be trained using the corresponding machine-learning algorithms based on the training data received in steps 1102 and 1104.

At 1108, the models can be trained based at least in part on (1) code integration request data, and (2) corresponding outcome data.

At 1110, the models trained using machine learning or artificial intelligence algorithms in step 1108 may be (optionally) revised (or tuned) based on additional relevant data received from one or more external data sources 1080. For example, external data sources 1080 may include updated open source software license terms, one or more software license compatibility matrices, updated security issue data (e.g., known security vulnerabilities, available security patches, etc.), software or computing infrastructure cost data, and the like. For example, the machine learning models 1015 trained in step 1108 may be supplemented with a specific set of rules, which may either override or weight the predictive outcome that would normally be generated by the machine learning models 1015. For instance, the predictive outcome from a trained model to a particular code integration request might normally be to approve the integration of the requested open source library, based on the machine learning algorithms applied and historical training data 1030. However, if a security issue within the requested open source library has been newly discovered and not yet resolved, that information may be retrieved from an external database 1080 of security vulnerabilities and used to temporarily override the trained model 1015 only in instances where that particular open source library is requested. As another example, if an open source library or other external code base was recently updated, the machine learning models 1015 may be tuned to include a temporary weighted preference against using the recently updated library based on concerns for stability and backwards compatibility. In yet another example, if the license terms associated with a requested open source library have recently been changed, then the machine learning models 1015 may be tuned to predict denials for code integration requests for that library until the organization has been able to review the updated license terms.

Finally, in step 1112, the trained machine learning models for predicting outcomes of code integration requests may be stored within the server 1010 or elsewhere within the system. As noted above, the trained models may be stored and executed from within a plugin component of a software development environment 1020 in some embodiments. Additionally or alternatively, trained models may be stored and/or exported to other systems to be used within source code crawling and analyses processes on previously written code blocks.

Figure 12:
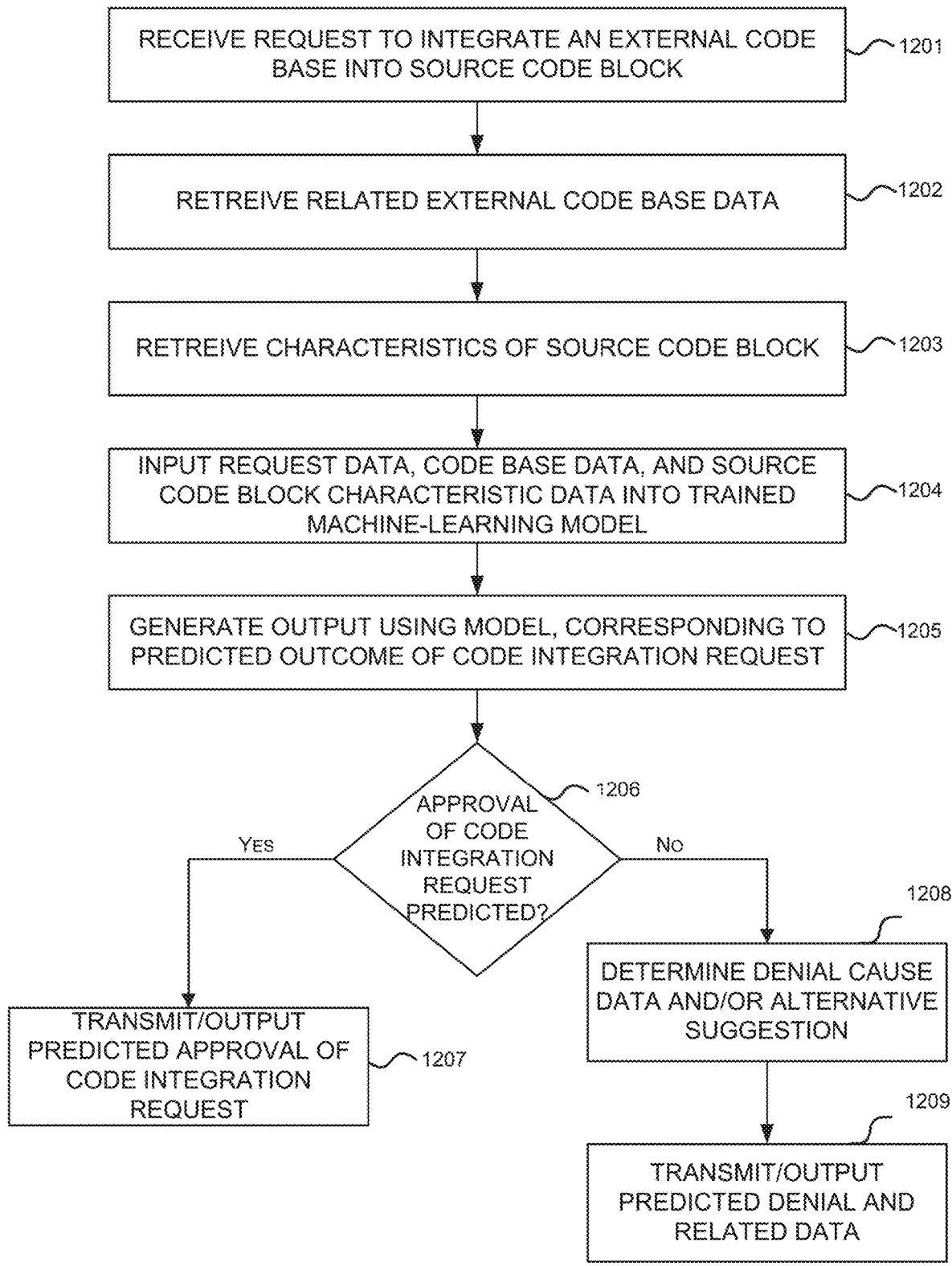
FIG. 12 illustrates an exemplary flow chart for an automated on-demand library check.

Referring now to FIG. 12, a flowchart is shown illustrating a process of executing a machine-learning model to generate predictive outcomes for code integration requests. The features and steps described below, including receiving input data, accessing and using trained models, generating outputs predictive outcomes, determining related cause data and/or suggestions, and the like, may be performed by the various devices operating within the computing environment 1000, including the model execution system 1018 of the code integration request prediction server 910. However, it should be understood that the techniques described in reference to FIG. 12 need not be tied to any particular devices or servers within the computing environment 1000, but may be implemented by any computing systems and devices described or supported herein.

Figure 13A:
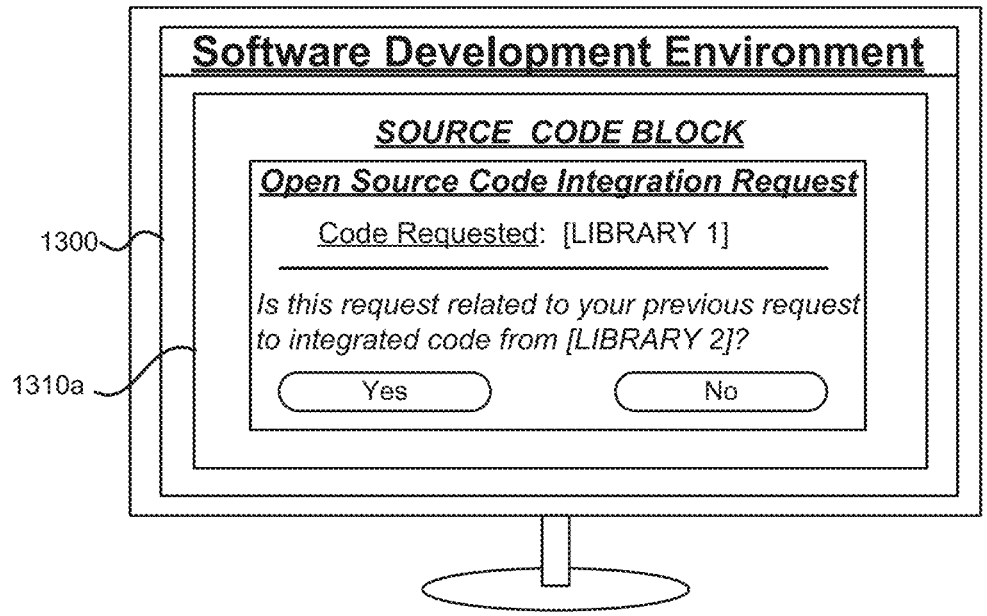
FIGS. 13A and 13B illustrates exemplary user interface screens generated by a software development environment.
Figure 13B:
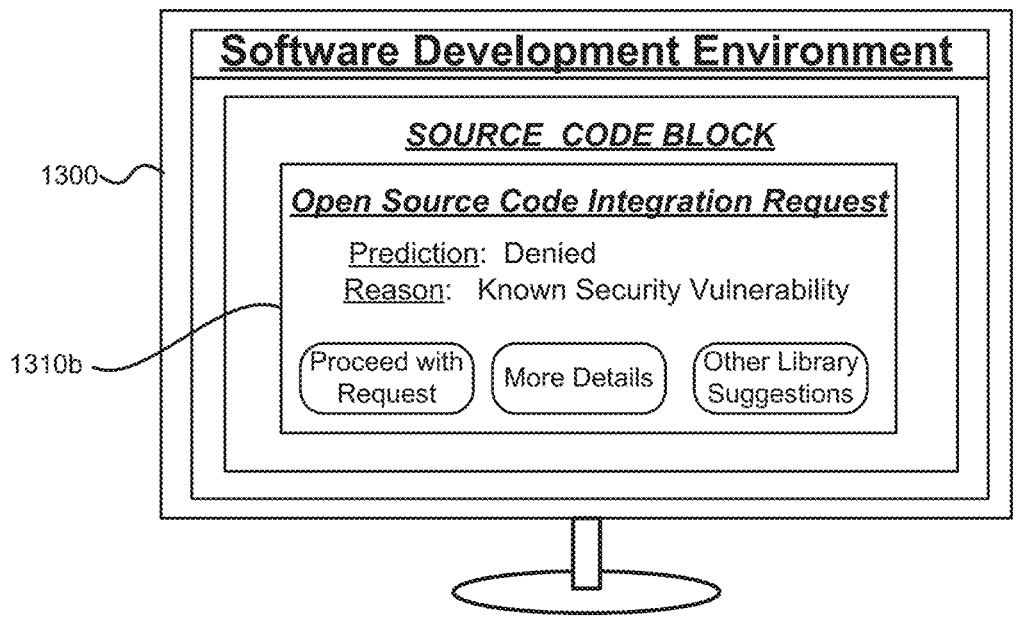

At 1201, the prediction server 1010 may receive data corresponding to a code integration request. Thus, the data received in step 1201 may be initially input by a client device 1050, either into a development environment 1020 or as direct input into the API 1012 or a user interface 1014 of the prediction server 1010. The input data received in step 1201 may identify at least the open source library (or other external code base) to be integrated, and the source code component/project into which the requested open source library may be integrated. As noted above, the prediction server 1010 may include one or more application programming interfaces (APIs) 1012 configured to support communications with various client systems, including authentication and security components to validate and authorize the client devices and/or users, so that the appropriate functionality of the prediction server 1010 is provided only to authorized users. Additionally, in some embodiments, the prediction server 1010 may provide one or more user interfaces 1014 to allow users to directly request predictive outcomes of code integration requests in step 1201. An example screen of a user interface configured to enable users to request predictive outcomes of code integration requests is shown in FIGS. 13A and 13B. As shown in FIG. 13A, a user has initiated a request (e.g., either via user interface 1014 or via a software development environment 1020) to integrate the open source library "LIBRARY 1" into the current software code block.

In step 1202, the prediction server 1010 may retrieve data corresponding to one or more other related external code bases associated with the source code block. For example, if the request in step 1201 is a developer is attempting to integrate the open source library "LIBRARY 1" into a current source code block under development, then the related external code bases retrieved in step 1202 may correspond to the additional open source libraries that are already being used/referenced by the current source code block. As discussed above, the existence of other libraries/ external code bases within the current source code block may potentially cause security vulnerabilities (based on a single external library or combination of external libraries), or license compatibility issues that may be relevant to whether or not a code integration request is approved. Therefore, in some embodiments, in step 1202 the prediction server 1010 may scan through all of the current source code blocks to detect any references to or invocations or external libraries, as well as analyzing the code to detect embedded code comments indicating that a code block was copied from an external library. Additionally or alternatively, the development environment 1020 and/or prediction server 1010 may maintain listing of all of the open source libraries (or other external code blocks) that have been integrated into each different source code component/project.

In step 1203, the prediction server 1010 may receive or retrieve one or more characteristics of the source code block into which external code is to be integrated. The characteristics retrieved in step 1203 may include any relevant data associated with the source code block that potentially may be used by the trained model to determine whether or not to approve the code integration request. For instance, such characteristics may include the identity and characteristics of the developer initiating the request, the particular client device 1050 (and the hardware, software, and/or network characteristics thereof) from which the request was initiated, and the communication network(s) over which the request was made. Additional characteristics of the software component or project may include the description or functionality of the software, its current stage in development, any security requirements associated with the software, the recency of the maintenance to the software (e.g., indicating whether the project is still maintained and the dependencies are available or missing), security patches installed on the software, the purpose and organizational priority of the software, and the computing and networking environments into which the software is to be deployed (e.g., accessible by untrusted users, computers, or networks). Still other examples of the software characteristics that may be received in step 1203 may include any descriptions or reasons provided by the developer at the time of the request to explain or justify the request to include the particular requested library. Thus, in some embodiments, the prediction server 1010 may retrieve the source code block characteristics by generating and outputting a user interface to allow the developer to provide the information (e.g., component product, functionality and purpose, and/or reason for requesting the external library).

In some embodiments, the characteristics retrieved in step 1203 also may include an indication of whether a code integration request is related to a previous code integration request that was requested and then denied by the software architecture authorization system 1060. Referring again to FIG. 12A, in this example, the user interface 1200 includes a dialog box 1210*a* asking the developer whether or not the current code integration request (i.e., requesting "LIBRARY 1") is related a previously denied code integration request (i.e., requesting "LIBRARY 2"). As discussed above, the machine learning models 1015 may be trained in part based on relationships between different external libraries, including learning such relationships based on the sequences of code integration requests in which a developer requests one external code base (e.g., LIBRARY 2), that request is denied, and then the developer requests a different external code base (e.g., LIBRARY 1) which may be capable of performing similar functionality.

At 1204, the prediction server 1010 may access one or more of the trained models 1015 and provide the data received in steps 1201-1203 as input to the trained model. As described in reference to FIG. 12, the trained machine learning or artificial intelligence models 1015 may have been trained to predict an outcome of code integration request (e.g., approval or denial of code integration) based on various factors including the requested library, the characteristics of the source code block, and/or other relevant factors. Thus, the machine learning or artificial intelligence models 1015 may have been trained using a training data set that includes a previously determined code integration requests made by developers and outcomes provided by an authorization system 1060. Further, the trained machine-learning models 1015 may be trained to learn outcome determinations based on the reasons/justifications provided by the developer for the request, and the corresponding reasons/causal factors provided by the authorization system 1060 with an approval or denial outcome.

In step 1205, one or more outputs may be generated by the trained machine-learning model 1015 in response to input data provided to the model in step 1204. As noted above, the model output may correspond to the predicted outcome that the authorization system 1060 would likely provide in response to the particular code integration request. In some embodiments, the trained model 1015 may provide not only a binary predictive outcome (e.g., approval or denial of the request) but also may provide additional related information such as reasons/causal factors for the predictive outcome and/or alternative library suggestions. For example, the model-based determinations to approve or deny a code integration request may be based on issues such as license compliance or compatibility, detected security vulnerabilities, software or computing infrastructure costs, additional software dependencies, the recency and priority of the software project, the availability of security patches, the existence of safer alternative libraries, etc.

In step 1206, the prediction server 1010 evaluates the predictive outcome received from the trained model to the potential code integration request. If the trained model determines that the code integration request would likely be approved (1206: Yes), then in step 1207 the indication of the approval may be output to the developer. In some embodiments, the prediction server 1010 is implemented as a plugin component within a development environment 1020, and in such cases the plugin may provide a user interface to inform the user of the predicted approval. The user interface also may be configured to allow the user to officially submit the code integration request, which has now received a predicted approval, to the software architecture authorization system 1060. Additionally, in some embodiments, the development environment 1020 may be configured to provisionally allow the developer to use/include the requested external code based on the predicted approval of the trained model.

In contrast, if the trained model determines that the code integration request would likely not be approved (1206: No), then in step 1208 the prediction server 1010 may determine one or more pieces of additional relevant data that may be provided to the user along with the predictive outcome of the denial. In some embodiments, in the event of a predicted denial of the code integration request, the trained model 1015 may provide a list of the likely reasons/causal factors for the predicted denial. For example, referring briefly to FIG. 12B, in this example the model execution system 1018 has indicated that the predicted outcome of the code indication request is that the request would be denied. Accordingly, in this example, a dialog box 1210b has been provided to allow the developer several additional options, including an option to proceed with the request to the software architecture authorization system 1060 regardless of the predicted outcome, or to review/analyze the details and causal factors for the predicted denial, or to receive other suggestions of open source libraries (or other external code bases) that may be acceptable alternatives to the requested library and which may have a higher likelihood of receiving an approval to be integrated into the software component/project.

For instance, in some embodiments the model execution system 118, as shown in FIG. 1, may be configured to invoke the model multiple different times, where particular pieces of the input data may be modified and the corresponding predictive outcomes may be analyzed to determine which pieces of input data may be the key (e.g., outcome determinative) factors. As a brief example to illustrate this functionality, if the developer provides a reason for requesting the open source library in step 1202, and the request is denied in step 1205, then the model execution system 118 might automatically re-invoke the trained model using a different reason (e.g., retrieved from historical code integration request data 1030), where all other input data are held constant. If the re-invoked trained model predicts an approval, then the reason provided by the developer for requesting the open source library may be identified in step 1208 as one of the causal factors for the predicted denial. Similar processes may be performed by re-invoking the trained model with minor modifications to the other individual input data received in steps 1201-1203 while holding the other input data constant.

Additionally, in some embodiments, the trained model 1015 may be used to determine one or more alternative open source libraries (or other external code bases) that may perform similar functionality to the requested code that received a predicted denial. For example, if a developer initiates a code integration request for a first open source library and the request denied in step 1205, then the model execution system 1018 may automatically re-invoke the trained model 1015 one or more times requesting different but functionally similar open source libraries (e.g., bases on software provider, library type, library/function descriptions, user feedback, etc.). For any of the different but functionally similar open source libraries where the trained model 1015 predicts an outcome of approval, those open source libraries may be determined to be potential alternatives that may be provided as suggestions to the developer.

Further, as discussed above, the trained models 1015 may be trained learn relationships between different open source libraries (or other external code bases) based on sequences of code integration requests. For instance, if a developer requests a first external code base (e.g., LIBRARY 2), that request is denied, and then the developer requests a different external code base (e.g., LIBRARY 1) and indicates that the request is related to the first request (see 1210a), then the trained models 1015 or other components within the prediction serve may learn that LIBRARY 1 and LIBRARY 2 may be acceptable alternatives for performing at least some of their respective functionality.

Finally, in step 1209, an indication of the predicted denial may be output to the developer. In embodiments when the prediction server 1010 may be implemented as a plugin within a development environment 1020, the plugin may provide a user interface to inform the user of the predicted denial, such as the interface shown in FIG. 12B. The determined reasons and/or causal factors, as well as one or more suggestions of the alternative open source libraries determined in step 1208 also may be provided to the developer via the development environment 1020 and/or via a separate user interface 1014.

A number of variations and modifications of the disclosed embodiments can also be used. For example, application software could be used instead of an activity guide to provide the activity guide composer. Some embodiments may dynamically suggest the category based upon the position or title of the administrator

VI. Automated Self-Adjusting Feature Discovery and Integration

Some organizations store data from multiple clients, suppliers, and/or domains with customizable schemas. When developing a machine learning solution that works across these different data schemas, a reconciliation step typically is done, either manually or through a tedious extract, transform, and load (ETL) process. For a given a machine learning problem (e.g., "I would like to predict sales" or "who are the most productive employees?"), this service will crawl the entire data store across clients/suppliers/domains and automatically detect equivalent entities (e.g., adding a column for "location" or for "address" in a data structure). The service will also automatically select the features that are predictive for each individual use case (i.e., one client/supplier/domain), effectively making the machine learning solution client-agnostic for the application developer of the organization.

Feature discovery is not limited to analyzing the feature name, but also the feature content. For example, this feature can detect dates, or a particular distribution of the data that fits a previous known feature with a very typical distribution. Combination of more than one of these factors can lead the system to match and discover even more features.

In this embodiment, a weighted list, with regards of the impact of the feature on the model predictions, of the common representations of each feature for this particular machine learning problem is stored. The features can be gathered initially to catch-up with past data storage. When new data from a new client/supplier/domain is added to the data store, a matching service will automatically detect which features should be fed to the machine learning solution, based on the weighted list previously computed. The pre-processing of features allows the machine learning problem to be executed far more quickly. Based on the features found for the new client/supplier/domain, the weighted list gets updated to improve the machine learning model. This weighted list is regularly updated based on new data intake and used to improve feature selection of existing clients.

Figure 14:
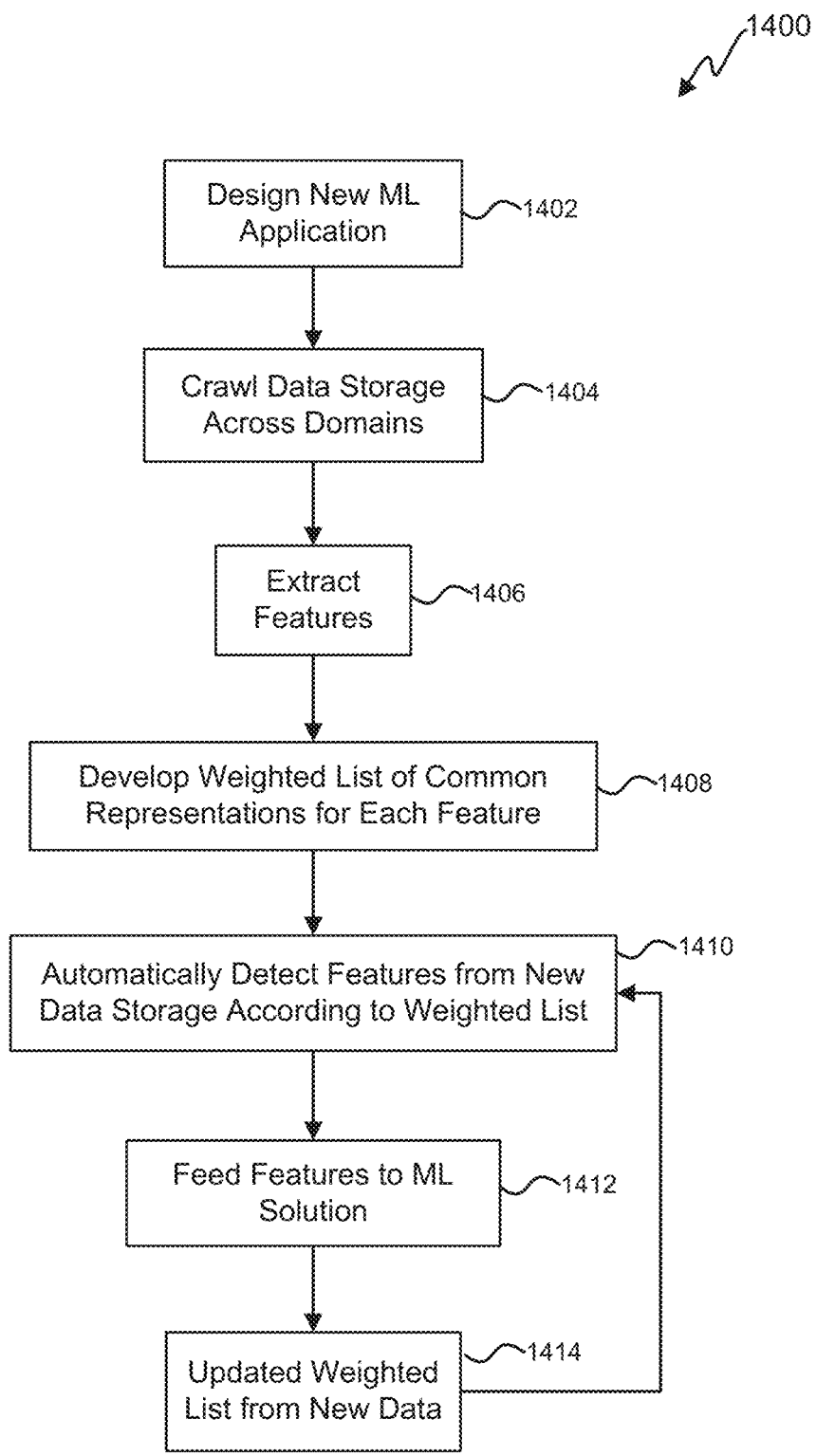
FIG. 14 illustrates a flow chart for an exemplary technique for self-adjusting corporation-wide feature discovery and integration.

FIG. 14 illustrates a process 1400 for techniques for automatically self-adjusting corporation-wide feature discovery and integration. Alternative embodiments may vary in function by combining, separating, or otherwise varying the functionality described in the blocks illustrated in FIG. 14. Means for performing the functionality of one or more of the blocks illustrated in FIG. 14 may comprise hardware and/or software components of a distributed system including computing devices, storage devices, network infrastructure, and servers illustrated in FIGS. 20, 21, and 22 and described below.

At 1402, the functionality includes receiving an instruction to design new machine learning application. In various embodiments, the instruction can be through a user interface. In various embodiments, the instruction can be received via a chatbot. The technique can employ natural language processing to determine the machine learning model, metrics that can be used to design the new machine application.

At 1404, the functionality includes electronically "crawling" across data storage domains. The system can receive access to one or more data storage locations. The data storage locations can be local or remote. In various embodiments, the data storage can be in one or more cloud storage facilities. A client can provide access for the machine learning system to access the data storage including the labels and data architecture of the data.

At 1406, the functionality includes extracting one or more features from the data storage. The data storage can include one or more labels that characterize the data. The techniques can automatically detect equivalent entities for the one or more labels. For example, a feature labelled "location" can also recognize data labels for "address." In various embodiments, the techniques can review the one or more labels that characterize the data to determine the one or more features from the data. The techniques can extract the one or more features, store the features and the associated data locations (e.g., data addresses) in a memory. The techniques can also identify and select the features that are predictive for each individual use case (i.e., one client), effectively making the machine learning solution client-agnostic for the application developer. In some embodiments, the features are can be extracted by the metadata contained within each of the categories of stored data.

At 1408, the functionality includes developing a weighted list of common representations for each feature. The technique can determine a ranking of each the one or more features extracted from the data storage based at least in part on an influence of the one or more features to the solution using the machine learning application.

For example, the determining the ranking can include determining a machine learning algorithm from a plurality of algorithms stored in a library wherein the algorithm incorporates the one or more features to calculate a result. The machine learning algorithm can be modified by removing a first feature of the one or more features. The technique can include calculating a first result of the modified machine learning algorithm. The first result can be compared with ground truth data. The technique can include calculating a ranking for the first feature based at least in part on the comparing the first result with the ground truth data. The first feature can be ranked higher in importance for a decreased difference between the first result and the ground truth data as compared with one or more other results. The technique can include assigning weights to the one or more features in the second list based at least in part on the ranking of the features to the solution of the machine learning application.

At 1410, the functionality includes automatically detecting features from new data storage according to a weighted list. In various embodiments, the technique can identify metadata for the identification of features in the data. The technique can use the weighted list to determine which features to incorporate into the machine learning solution. Those features with a higher rankings, where results are closer to ground truth data, can better predict the desired machine learning solution. Therefore it would be advantageous for the machine learning application to incorporate these features.

At 1412, the functionality includes feeding features to a machine learning solution. The monitoring engine 156, shown in FIG. 1, can provide feedback to the model composition engine regarding the features to incorporate into the machine learning solution.

At 1414, the functionality includes updating weighted list from new data. When new data is added to the data storage, a matching service can automatically detect which features should be fed into the machine learning solution based at least in part on the weighted list previously computed. Based on the features found for the new data, the weighted list can be updated. This list can be regularly be updated based on the new data and used to improve feature selection of existing models.

It should be appreciated that the specific steps illustrated in FIG. 14 provide particular techniques for generating a machine learning application according to various embodiments of the present disclosure. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 15:
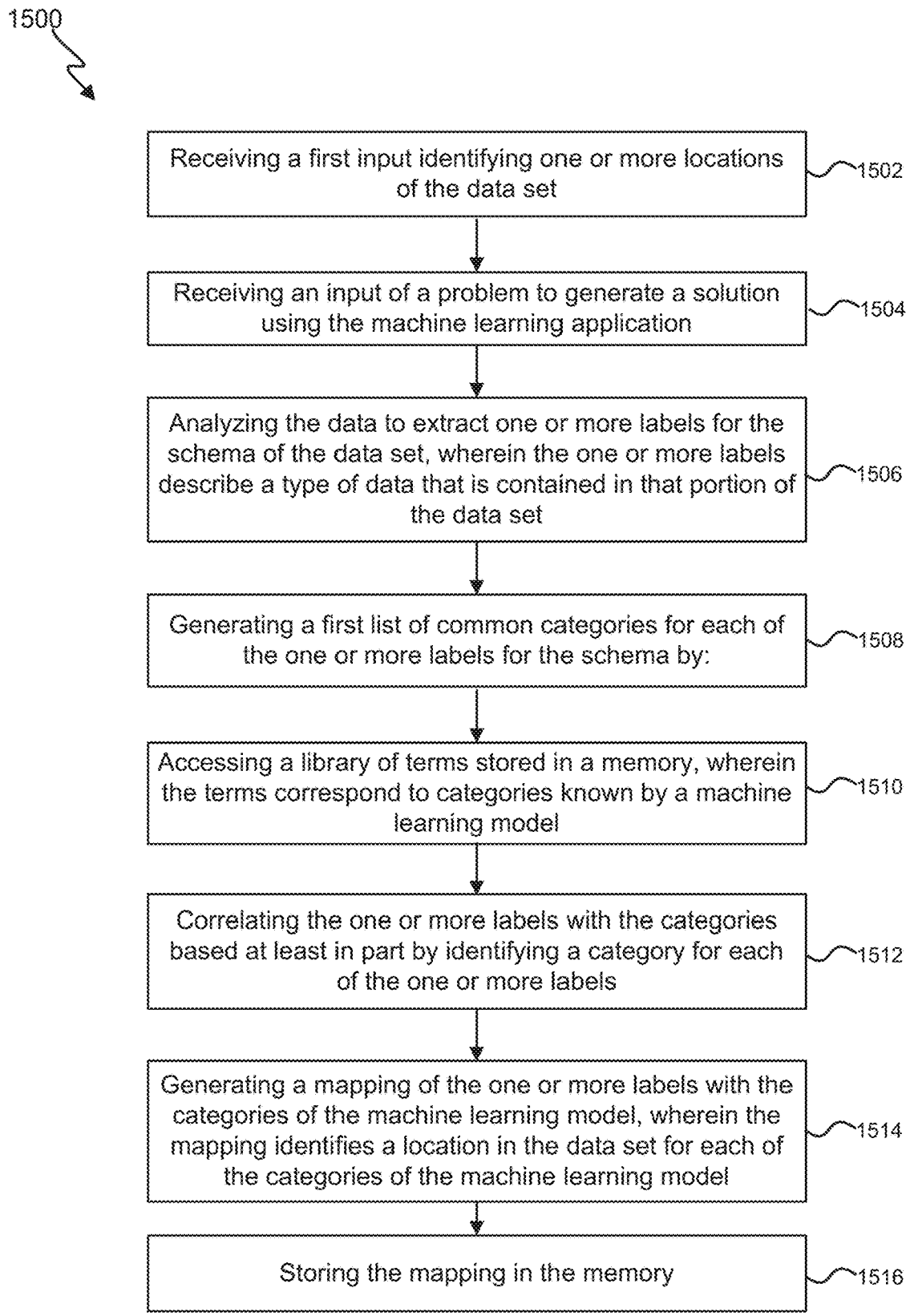
FIG. 15 illustrates a flow chart for a second exemplary technique for self-adjusting corporation-wide feature discovery and integration.

FIG. 15 illustrates a process 1500 for techniques for an intelligent assistant to generate a machine learning solution. Alternative embodiments may vary in function by combining, separating, or otherwise varying the functionality described in the blocks illustrated in FIG. 15. Means for performing the functionality of one or more of the blocks illustrated in FIG. 15 may comprise hardware and/or software components of a distributed system including computing devices, storage devices, network infrastructure, and servers illustrated in FIGS. 20, 21, and 22 and described below.

At 1502, the functionality can include receiving a first input identifying one or more locations of the data set. In various embodiments, the user can use the interface to identify the one or more locations of data that will be used for generating the machine learning model. As described above, the data can be stored locally or remotely. In various embodiments, the user can enter a network location for the data (e.g., Internet Protocol (IP) address). In various embodiments, the user can select a folder from a plurality of folders on a storage device (e.g., a cloud-storage device). In various embodiments, the user can select a file on portable media device (e.g., a USB thumb drive, an optical disk, or solid state or magnetic disk drive). In various embodiments, the technique can suggest a location of data based at least upon a user's previous interactions with the machine learning interface.

At 1504, the functionality can include receiving a second input. The second input can identify a problem to generate a solution using the machine learning application. In various embodiments the second user input can specify a type of problem that the user would like to implement machine learning for. In various embodiments, the problem can be identified through input of text via a user interface. In various embodiments, the problems can be entered as native language speech or text (e.g., through the use of a chatbot). The technique can decipher the native language to understand the goals of the machine learning model. Some of types of problems that machine learning can solve can include classification, regression, product recommendations, medical diagnosis, financial analysis, predictive maintenance, image and sound recognition, text recognition, and tabular data analysis. The techniques can recognize one or more keywords in the native language to recommend or select a particular machine learning algorithm.

In various embodiments, a user can select the type of problem through a graphical user interface. The technique can display several generic models available to the user through a graphical user interface. The user can select one of the models by selecting, using a pointing device or touch screen display, one of the model descriptions. In addition to the generic models, additional custom models can be selected and modified to solve the problem received as the second input.

At 1506, the functionality can include analyzing the data to extract one or more labels for the schema of the data set. The one or more labels can describe a type of data that is contained in that portion of the data set. For example, a data label such as "address" can include information regarding address entries. The one or more labels can be extracted along with a location for the corresponding data and stored in a memory. The labels can be part of the stored data. For example, the customer may have provided the labels for the data set. The technique can also include generating labels for the features discovered in the data set. These labels can be generated by analyzing the metadata for the stored data set and determining a category that best describes that portion of the data set. In this way, the technique is not limited to a customer's naming convention for describing the data. For example, the technique can determine feature content, e.g., dates, and determine of particular distribution of the data that fits a previously known or discovered feature with a very typical distribution.

At 1508, the functionality can include generating a first list of common categories for each of the one or more labels for the schema. For each of the extracted terms, the techniques can reference a dictionary for equivalents of the label. For example, for "address" equivalent terms can include residence, home, house, abode, location, domicile, place of residence, mailing address, etc.

At 1510, the functionality can include accessing a library of terms stored in a memory, wherein the terms correspond to categories known by a machine learning model. The machine learning model can include a list of one or more terms (and their equivalents) that are currently used by the existing model. For example, the machine learning model may refer to the term "location" instead of the term "address."

At 1512, the functionality can include correlating the one or more labels with the categories based at least in part by identifying a category for each of the one or more labels. The list of common categories can be compared with the library of terms stored in the memory. The labels can be part of the stored data. For example, the customer may have provided the labels. The technique can include generating labels for the features discovered in the data set. Data labels can also be generated by analyzing the content of the data set and/or the metadata for the data set. In this way the correlation is not limited to customer provided labels.

At 1514, the functionality can include generating a mapping of the one or more labels with the categories of the machine learning model. The mapping can identify a location in the data set for each of the categories of the machine learning model.

At 1516, the functionality can include storing the mapping in the memory. The mapping can be updated as the data in the storage location is changed (added/removed) or if the labels are changed.

In various embodiments, the functionality can include analyzing the data to extract one or more features described by the data set. The method can include generating a second list, wherein the second list identifies the one or more features of the data set. The technique can determine a ranking of each the one or more features in the second list based at least in part on an influence of the one or more features to the solution using the machine learning application. The technique can assign weights to the one or more features in the second list based at least in part on the ranking of the features to the solution of the machine learning application.

In various embodiments, the determining the ranking can include determining a machine learning algorithm from a plurality of algorithms stored in a library wherein the algorithm incorporates the one or more features to calculate a result, modifying the machine learning algorithm by removing a first feature of the one or more features, calculating a first result of the modified machine learning algorithm, comparing the first result of the modified machine learning algorithm with ground truth data and calculating a ranking for the first feature based at least in part on the comparing the first result with the ground truth data, wherein the first feature is ranked higher in importance for a decreased difference between the first result and the ground truth data as compared with one or more other results.

In various embodiment, the method can include identifying a new location of additional data. For example, the method can include analyzing the additional data to identify one or more new features. The new features are not identified on the first list of the one or more features in the memory. The method can include generating a revised list of the one or more features in a memory that includes the one or more new features. The method can include determining a revised ranking of each the one or more features and the one or more new features in the revised list based at least in part on an influence of the one or more new features to the solution using the machine learning application. The method can include assigning weights to each of the ranked features in the revised list based at least in part on the revised ranking of the new feature for the solution generated by the machine learning application.

In various embodiments, the method can include presenting the mapping of the one or more labels with the categories of the machine learning model. The technique can include receiving a second input. The second input can correlate to a label of the one or more labels for the schema of the data with a category of the one or more categories known by the machine learning model.

In various embodiments, the method can further include extracting the data set stored at the one or more locations. The method can include storing the extracted data set in the memory. The method can include renaming the one or more labels of the data set to match the mapping of the one or more labels.

In various embodiments, the method can include identifying a new label of the one or more labels, wherein the new label does not correlate to the categories of the machine learning data; and adding the new label and associated metadata to the library of terms stored in the memory.

It should be appreciated that the specific steps illustrated in FIG. 15 provide particular techniques for generating a machine learning application according to various embodiments of the present disclosure. Other sequences of steps may also be performed according to alternative embodiments. For example, alternative embodiments of the present invention may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

VII. Efficient and Accurate Assignment of Confidence to Machine Learning Predictions for Enterprise Software Systems Various embodiments can increase trust in machine learning model predictions or at least quantify the level of trust warranted by assigning confidence levels to machine learning predictions. These point predictions can carry uncertainty. This uncertainty is normally not taken into account or properly calibrated before a machine learning model's point prediction is used by a software system. In various embodiments, a technique can provide a user of a software system that leverages machine learning with an assessment of the quality of a machine learning model's point prediction. The quality may be exposed with interim results or overall performance with a number of QoS or KPI factors.

The point prediction technique can be accomplished by searching an instance as query against a set of training data to obtain suitable candidate machine learning models or pipelines 136 instances to compute an estimate of the confidence for the candidate machine learning models for the point prediction. The technique can produce an estimation of the uncertainty of a particular machine learning system for a point prediction. The search system can use a method to efficiently compute the estimator taking the machine learning software and underlying system requirements into account. For example, the measure of confidence would be low for data that provides a poor fit for the point prediction.

The confidence score can reflect how likely this type of machine learning model will perform beyond a confidence for a particular result being correct. For example, the machine learning model might predict the most likely winner of a sporting event with 90% accuracy in general, but the prediction for the game tomorrow might have a 60% confidence because one team has too many new players. The color of the point prediction could be displayed on the screen according to the confidence level in the estimate.

VIII. Adaptive and Context-Aware Automated Service Composition for Machine Learning An ontology is the specification of a conceptualization or formal naming and definition of the types, properties, and interrelationships of the entities that really or fundamentally exist for a particular domain of discourse. An ontology model provides much the same information, except a data model is specifically related to data only. The data model provides entities that will become tables in a Relational Database Management System (RDBMS), and the attributes will become columns with specific data types and constraints, and the relationships will be identifying and non-identifying foreign key constraints. What a data model does not provide is a machine-interpretable definition of the vocabulary in a specific domain. Data Models will not contain vocabulary that defines the entire domain, but rather the data dictionary will contain information on the entities and attributes associated with a specific data element. An ontology consists of classes hierarchically arranged in a taxonomy of subclass-superclass, slots with descriptions defining value constraints, and values for these slots. A knowledge base is defined when the ontology is complete, and when individual instances of these elements (classes and slots) are defined and any restrictions added or refined.

For example, the class person includes all people, and a specific person is an instance of this Class. Most ontologies are focused on Classes of things, and these Classes can be broken up into Subclasses of things. For example, Person can be subclassed into Gender, Ethnicity, Race, or Country of Citizenship. Defining domains in terms of machine-readable ontologies will allow the free exchange information and knowledge. Ontologies enable the sharing of information between disparate systems within the same domain. There are numerous freely available ontologies from various industries. Ontologies are a way of standardizing the vocabulary across a domain. For example, the word "practitioner" will have the same meaning in one healthcare system as it has in another. Likewise, a practitioner specialty will be the same attribute and have the same meaning on both sites. This standardization allows for more flexibility, and will enable more rapid development of applications, and sharing of information.

The ontology can be applied to a data set (e.g., images, medical data) to solve a problem (e.g., product recommendation or outlier detection) or to determine the metrics to be applied to the problem. The ontology can provide a hierarchical organization of the data set to provide a level of expandability. The output of the process is a product graph which is a composition of the model, the pipelines, the features, and the metrics for to generate a machine learning solution. For example, for certain medical applications (e.g., radiology) it may be important to use higher resolution of images to detect abnormalities in the images. The KPIs may focus on accuracy in detecting these abnormalities. However, latency of the process needs to be considered. If the images take too long to process to be useful the machine learning process may not be effective. Therefore, the process may recommend using slightly lower resolution images to process the images effectively. The product graph would assist a data scientist shape the model taking into account these types of tradeoffs between latency and accuracy.

Figure 16:
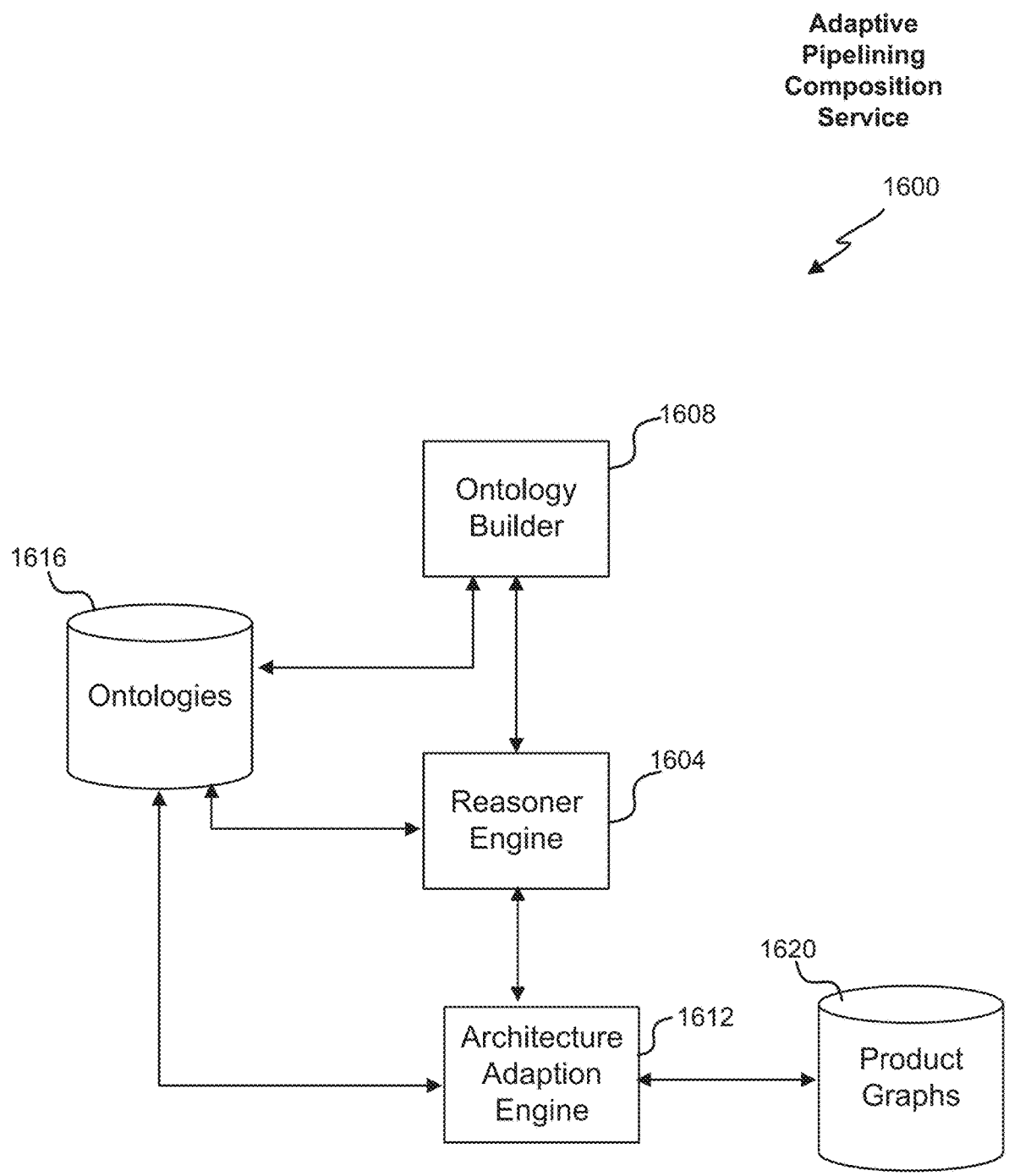
FIG. 16 illustrates a block diagram illustrating an exemplary system for generating product graphs using ontologies.

With reference to FIG. 16, an embodiment of a block diagram that uses ontologies to produce machine learning product graphs used in designing a machine learning model or application. In various embodiments, context aware semantic Machine Learning (ML) services can enables a user to perform a high-precision search of services and automated composition of machine learning deployment services based on formal ontology-based representations of service semantics that can include QoS and product KPIs. This forms a scalable means for a high-precision search of relevant services to compose pipelines 136, shown in FIG. 1, with minimal human intervention to define self-adaptive machine learning architecture. An appropriate combination of non-logic-based and logic-based semantic services selection that significantly outperforms both kinds of selection in terms of precision. QoS and KPIs constraints are also used as part of architecture selection (e.g., given that latency cannot exceed X, compose services infrastructure which handle a quantity of input data at a specified time in the pipeline that makes up the machine learning model).

For example, a medical application can be used to detect diabetes through an eye exam due to a condition called diabetic retinopathy. Many people with early diabetic retinopathy have no symptoms. As diabetic retinopathy progresses, symptoms include blurred vision, blindness, floaters or shadows and missing areas of vision. There are two kinds of diabetic retinopathy. The early stage is non-proliferative diabetic retinopathy, where blood vessels in the retina begin to leak. If the leakage results in accumulation of fluid in the retina, blurring of the vision can occur.

A comprehensive eye exam is the only way to detect diabetic retinopathy in its early stages, before symptoms develop. An image classifier can be used to detect diabetic retinopathy through higher resolution analysis of images of the eye. An ontology for eye images can be developed with various categories such as no retinopathy, minor retinopathy, and various different levels of retinopathy. The reasoner 1616 can use the ontology for eye images and understand that there have been other neural networks applied for precise image classification. An entry layer can be constructed to adapt the image classifier with the eye imagery ontology to detect various levels of retinopathy in images of patient eyes. The product graph would be the entire process of reading the images, transforming the images, rescaling the images to a particular resolution, loading the images to a prebuilt neural network, analyzing the images to output a classification of the image (e.g., a numerical value) that may indicate the level of diabetic retinopathy.

A. Ontology Modeling and Building Mechanism 1608

The semantic profile for machine learning platform 100 can include: functional semantics of each microservices routine 140 (feature selection, outlier detection, explainability) in terms of semantic annotations of its input and output parameters; logic-based description of preconditions (and effects which are supposed to hold before or after executing the service); non-functional service parameters which are concerned with service provenance (like feature engineering is composed also by the service of feature selection—provenance of services that are composed as it can affect the performance at run time of the machine learning application 112); quality of service (QoS) requirements covering latency, response time, computational resources, throughput, reliability, availability, success rate (mean time of failure of the service), availability, privacy policy, etc.; and, product Key Performance Indicators (KPIs), such as "increase the purchases by 40% in the first month" which can be used for product recommenders.

B. Reasoner Engine 1604 to Process the Ontology 1616

Using the created ontology 1616 (description on how the service internally works in terms of the interplay between data and control flow, and QoS benchmarks) for annotating services with concepts which are defined in formal logic-based ontologies such that, from a machine learning perspective, intelligent agents and a reasoner engine 1604 can determine formal service semantics and compose them based-on optimal run-time expectation by the product. In various embodiments, the ontology requires a "cold start" because the ontology is not already created. The ontology builder 1608 can be used to create the ontology of create new branches in existing ontologies. The reasoner engine 1604 guides the search for the best combination of components (e.g., model, metrics) to solve a problem. The reasoner engine 1604 determines the software functions and hardware to combine into the product graph 1620.

C. Search-Based Architecture Adaption Engine 1612

The architecture adoption engine 1612 uses meta-learning to connect various blocks for generation of the product graph 1620. An interpolation process selects the best software functions and hardware for a particular machine learning problem query. The technique can convert a product graph comparability problem into a computational search problem which involves defining a search space (i.e., services available), or the set of possible solutions based on the defined ontology descriptors of previous services that became successful. The outcome is the best possible subset of requirements that matches user requests considering requirements constraints such as limited resources and interdependencies between requirements. Before deployment of production graph, the user can be provided with a proposed product graph 1620 with metrics of model performance and a set of compromises between QoS and other user requirements and constraints (requirements risk). The search space for is typically very large and impractical to be explored exhaustively. This embodiment uses metaheuristic approach (search techniques can be used to find near optimal or "good-enough" solutions) at the option of the user.

For example, a user might produce a semantic query with QoS requirements and a particular question being answered. Selecting the best product graph 1620 for the needed answer with the QoS requirements considered can be suggested. There are various library components 168, shown in FIG. 1, that define software functions and hardware that might comply with that request. The ontologies 1616 store parameters for the software functions and hardware so that selection can be automatically made for the product graph 1620. The product graph 1620 can have the library components 168, shown in FIG. 1, and hardware components to build a machine learning product to comply with the semantic query. The architecture adaption engine 1612 can determine the best options for the product graph 1620.

Product graphs 1620 are visual representations of data that represent mathematical structures used to study pairwise relationships between objects and entities. In computing, a graph database (GDB) is a database that uses graph structures for semantic queries with nodes, edges, and properties to represent and store data. A key concept of the system is the graph (or edge or relationship). The graph relates the data items in the store to a collection of nodes and edges, the edges representing the relationships between the nodes. The relationships allow data in the store to be linked together directly and, in many cases, retrieved with one operation. Graph databases hold the relationships between data as a priority. Querying relationships within a graph database is fast because they are perpetually stored within the database itself. Relationships can be intuitively visualized using graph databases, making them useful for heavily interconnected data. Graph databases are part of the NoSQL databases created to address the limitations of the existing relational databases. While the graph model explicitly lays out the dependencies between nodes of data, the relational model and other NoSQL database models link the data by implicit connections. Graph databases, by design, allow simple and fast retrieval of complex hierarchical structures that can be difficult to model in relational systems.

The adaptive and context-aware automated service composition results in a holistic approach of combining different KPIs, QoS, types of problems, types of data to build a product graph 1620. This adds awareness to the model.

Figure 17:
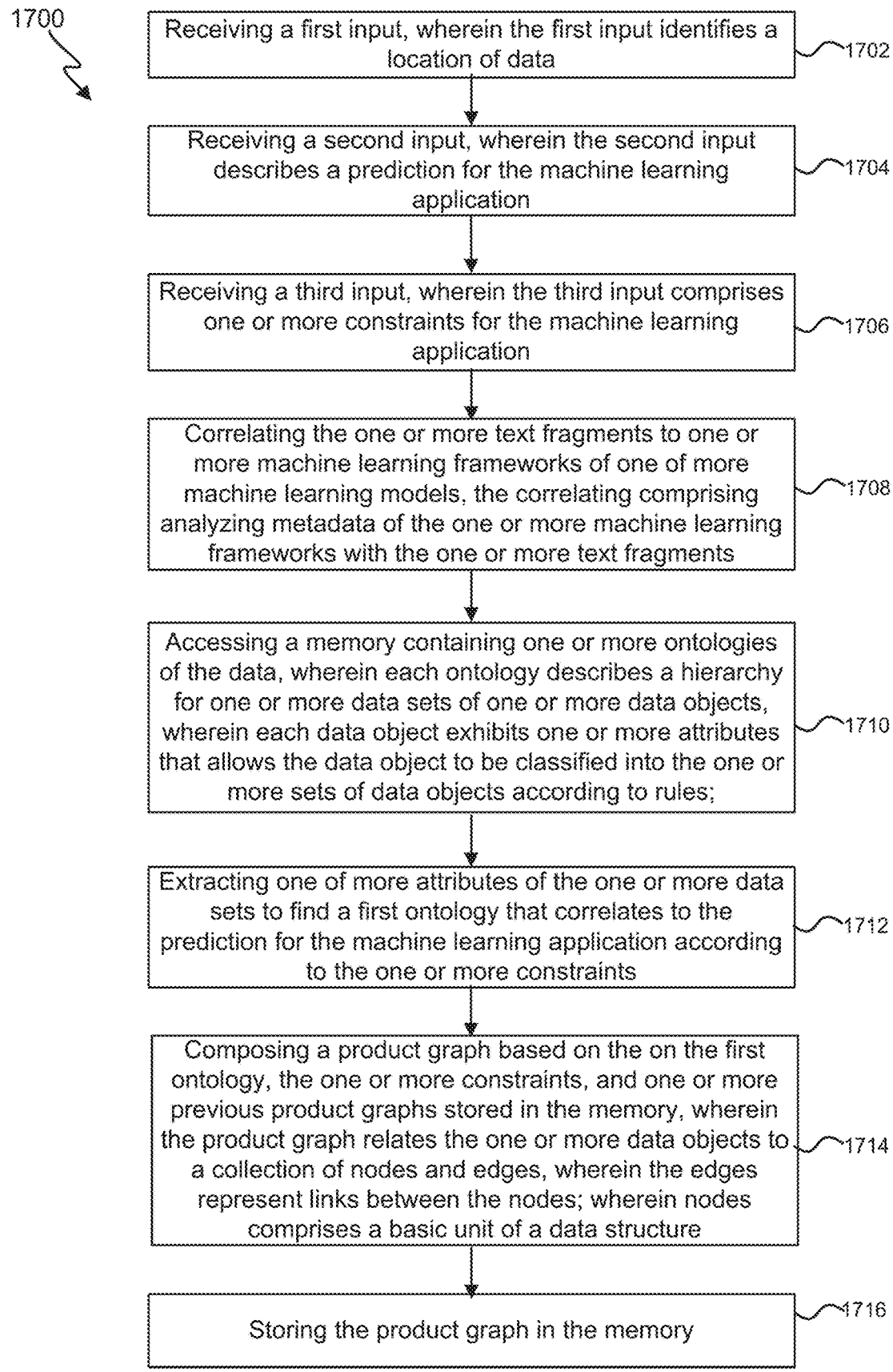
FIG. 17 illustrates an exemplary flow chart for an adaptive and context-aware automated service composition for machine learning.

FIG. 17 illustrates a process 1700 for techniques for generating an adaptive and context-aware automated service composition for machine learning. Alternative embodiments may vary in function by combining, separating, or otherwise varying the functionality described in the blocks illustrated in FIG. 17. Means for performing the functionality of one or more of the blocks illustrated in FIG. 17 may comprise hardware and/or software components of a distributed system including computing devices, storage devices, network infrastructure, and servers illustrated in FIGS. 20, 21, and 22 and described below.

At 1702, the functionality can include receiving a first user input identifying a location of data. In various embodiments, the user can use the interface to identify the location of data that will be used for generating the machine learning model. In various embodiments, the user can enter a network location for the data (e.g., Internet Protocol (IP) address). In various embodiments, the user can select a folder of a plurality of folders on a storage device (e.g., a cloud-storage device). In various embodiments, the user can select a file on portable media e.g., a USB thumb drive, an optical disk, or solid state or magnetic disk drive.

At 1704, the functionality can include receiving a second user input identifies a problem for which a solution can be generated by the machine learning application. In various embodiments the second user input can specify a type of problem that the user would like to implement machine learning for. In various embodiments, the problem can be identified through input of text via a user interface. In various embodiments, the problems can be entered as native language speech or text (e.g., through the use of a chatbot). The technique can decipher the native language to understand the goals of the machine learning model. Some of types of problems that machine learning can solve can include classification, regression, product recommendations, medical diagnosis, financial analysis, predictive maintenance, image and sound recognition, text recognition, and tabular data analysis. The techniques can recognize one or more keywords in the native language to recommend or select a particular machine learning algorithm.

For example, for the diabetic retinopathy example, a user can specify that the problem is a medical problem, specifically a classifier for images.

In various embodiments, a user can select the type of problem through a graphical user interface. The technique can display several generic models available to the user through a graphical user interface. The user can select one of the models by selecting, using a pointing device or touch screen display, one of the model descriptions. In addition to the generic models, additional custom models can be selected and modified to solve the problem received as the second input.

At 1706, the functionality can include receiving a third input of one or more constraints for the machine learning application. The third input can be entered as native language speech or text (e.g., through the use of a chatbot) or selected via an interface (e.g., a graphical user interface). One example of a constraint is latency of a system in executing the machine learning application. Another constraint can be accuracy of the classification.

At 1708, the functionality can include accessing a memory containing one or more ontologies of the data. Each ontology can describe a hierarchy for one or more data sets of one or more data objects. Each data object can exhibit one or more attributes that allows the data object to be classified into the one or more sets of data objects according to rules.

At 1710, the functionality can include extracting one of more attributes of the one or more data sets to find a first ontology that correlates to the prediction for the machine learning application according to the one or more constraints. For example, the technique can learn from previous ontologies that certain KPIs and metrics are effective for solving certain solutions. Therefore the technique can recommend incorporating various KPIs or metrics into the product graph.

At 1712, the functionality can include composing a product graph based on the on the first ontology, the one or more constraints, and one or more previous product graphs stored in the memory. The product graph relates the one or more data objects to a collection of nodes and edges for the data. The edges represent links between the nodes. The nodes comprise a basic unit of a data structure.

For example, the search-based adaptive engine 1612 can search the metadata of various machine learning models would be effective in solving the given problem. For example, an image classifier used for detecting potential skin cancer may provide the accuracy needed for detecting diabetic retinopathy. The technique can select the model, the required transformations, with particular pipelines at the end.

At 1714, the functionality can include storing the product graph in the memory.

In various embodiments, the method can include generating an ontology based at least in part on analyzing the attributes of the one or more data objects. The one or more attributes can include one or more functional semantics of each service. The functional semantics can include at least one of a feature selection, an outlier detection, and an explainability metric.

The one or more attributes can include one or more preconditions and one or more effects. The preconditions can be conditions that exist before executing a service and the one or more effects are conditions that exist after executing the service.

The one or more attributes can also include one or more parameters. The one or more parameters concerned with a provenance of the service.

The one or more attributes can include one or more metrics. The one or more metrics can include quality of service metrics. The quality of service metrics comprises at least one of latency metrics, response time metrics, throughput metrics, reliability metrics, availability metrics, success rate metrics, and privacy metrics The one or more attributes can include one or more indicators. The one or more indicators can include key performance indicators.

The technique can include storing the ontology in the memory.

The techniques can include generating metadata from the one or more ontologies, wherein the metadata describes one or more concepts of the one or more ontologies from a machine learning perspective based at least in part on run-time expectations. The technique can include saving the service metadata to a memory.

The techniques can include searching one or more services based at least in part on one or more descriptors from the one or more previous product graphs. In various embodiments the searching uses a metaheuristics approach for determining a solution. The techniques can include correlating the one or more descriptors with the prediction of the machine learning application. The technique can include generating a list of available services based at least in part on said correlating. The technique can include saving the list of available services in a memory.

The technique can include presenting the product graph on a display. The product graph can include one or more metrics of a performance of the product graph. The product graph can include determining a set of compromises, wherein the set of compromises comprises a selection of the one or more constraints in view of the prediction of the machine learning application. The technique can include presenting the set of compromises on a display.

It should be appreciated that the specific steps illustrated in FIG. 17 provide particular techniques for generating a machine learning application according to various embodiments of the present disclosure. Other sequences of steps may also be performed according to alternative embodiments. For example, alternative embodiments of the present invention may perform the steps outlined above in a different order. Moreover, the individual steps illustrated in FIG. 17 may include multiple sub-steps that may be performed in various sequences as appropriate to the individual step. Furthermore, additional steps may be added or removed depending on the particular applications. One of ordinary skill in the art would recognize many variations, modifications, and alternatives.

IX. Adaptive Pipelining Composition Service

Existing machine learning systems do not incorporate features to continuously improve the model via a background process. In this way, a model can be initially selected from available models and the machine learning application can be constructed. While the machine learning application is deployed, a background process can be used to identify other potential models that can improve various aspects of the machine learning application. For example, a model can be made available after the machine learning application is generated. The adaptive pipelining composition system can identify the new model, test the model off-line, validate the model, and if the model improves the performance of the machine learning application, the technique can change the existing model in the deployed system with the new model. In this way the machine learning application is continuously improving its results. In addition, the model can be changed as new data is discovered or different data is identified as being predictive.

Figure 18:
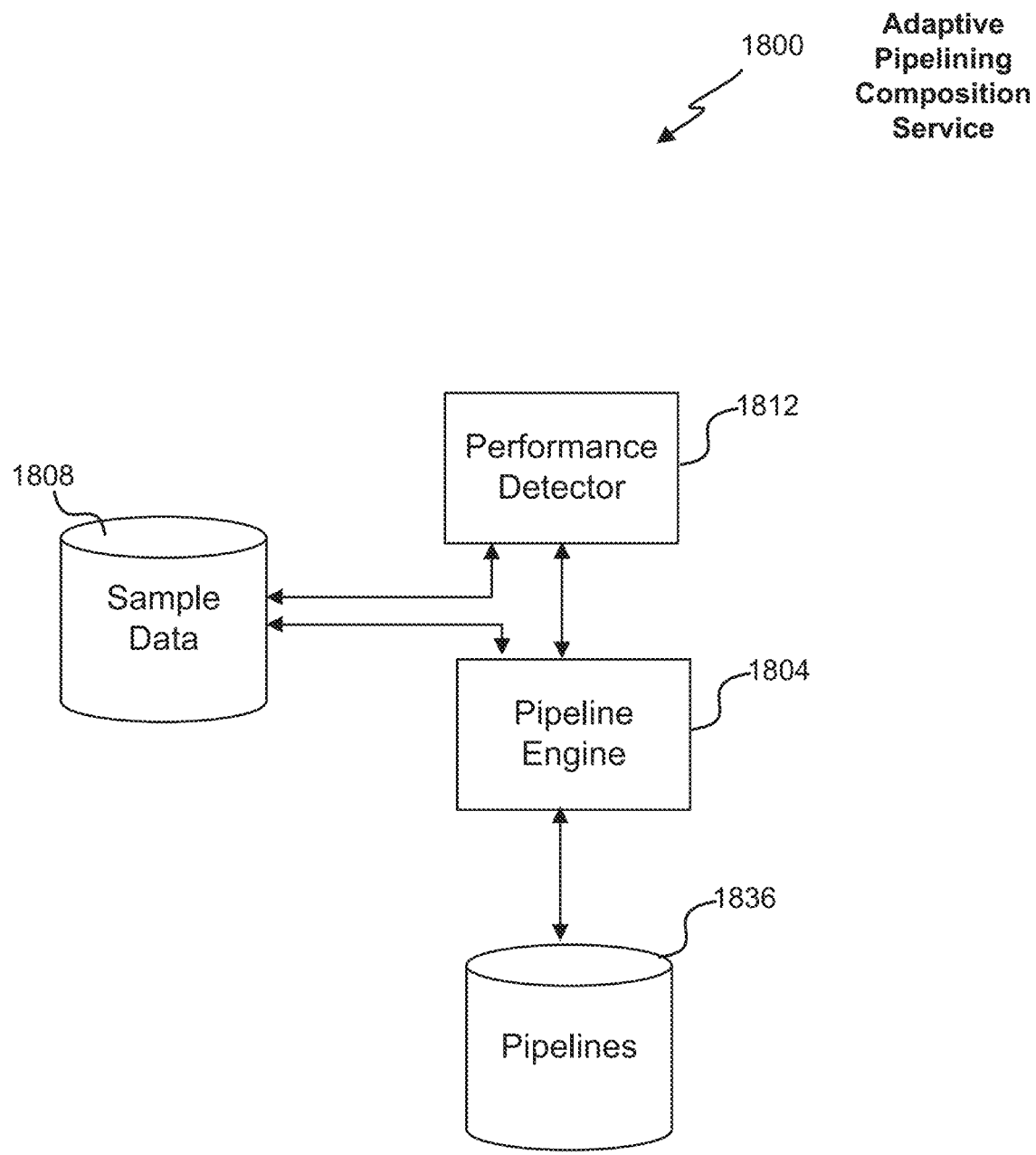
FIG. 18 illustrates a block diagram for generating one or more pipelines.

With reference to FIG. 18, a block diagram for composing machine learning services is shown that uses sample data. Given some sample data 1808, the adaptive pipelining composition service 1800 can compose a machine learning pipeline 1836 (consisting of machine learning services) that maximizes performance attributes over new data from the same source. The performance detector 1812 can evaluate various performance characteristics that can include classification accuracy, various model metrics, generic QoS metrics, or other non-machine learning model related KPIs. Other frameworks use auto-learn attempts to automatically compose the best pipeline based on model performance. However, model performance on its own does not cover the cases where the pipeline must be adapted at run-time given to some changes in online data metrics or QoS compliance. The adaptive pipelining composition service 1800 optimizes operation both offline and at run-time.

In the offline case, a user can use the adaptive pipeline composition service 1800 to define what are the library components 168, shown in FIG. 1, of a pipeline to solve a specified problem. Previous learnings/patterns of similar use cases are used to determine a pipeline 1836 for new specified problem.

In the online situation, the pipeline engine 1804 continuously explores and evaluates alternative pipelines and/or sub-blocks of the pipeline at run time based on previous learnings/patterns of similar use cases. Other pipeline candidates can be run in shadow mode by the pipeline engine 1804 to compare performance in real time. If an alternative machine learning pipeline composition outperforms the existing pipeline, the adaptive pipelining composition service 1800 composes the new pipeline and takes care of upgrading it on shadow mode until it satisfies the condition for auto-promoting to production. The redesigned pipeline will replace the old pipeline once performing better while online.

Some embodiments have a threshold of improvement specified before replacement occurs. Other machine learning models may have different thresholds before replacement. New versions of the pipeline 1836 may be tested by machine learning models before replacement occurs. For example, the new pipeline may run in shadow mode for a period of time before replacement. Further tweaks to the shadow pipeline may be performed to customize for a particular instance of a machine learning model.

Figure 19:
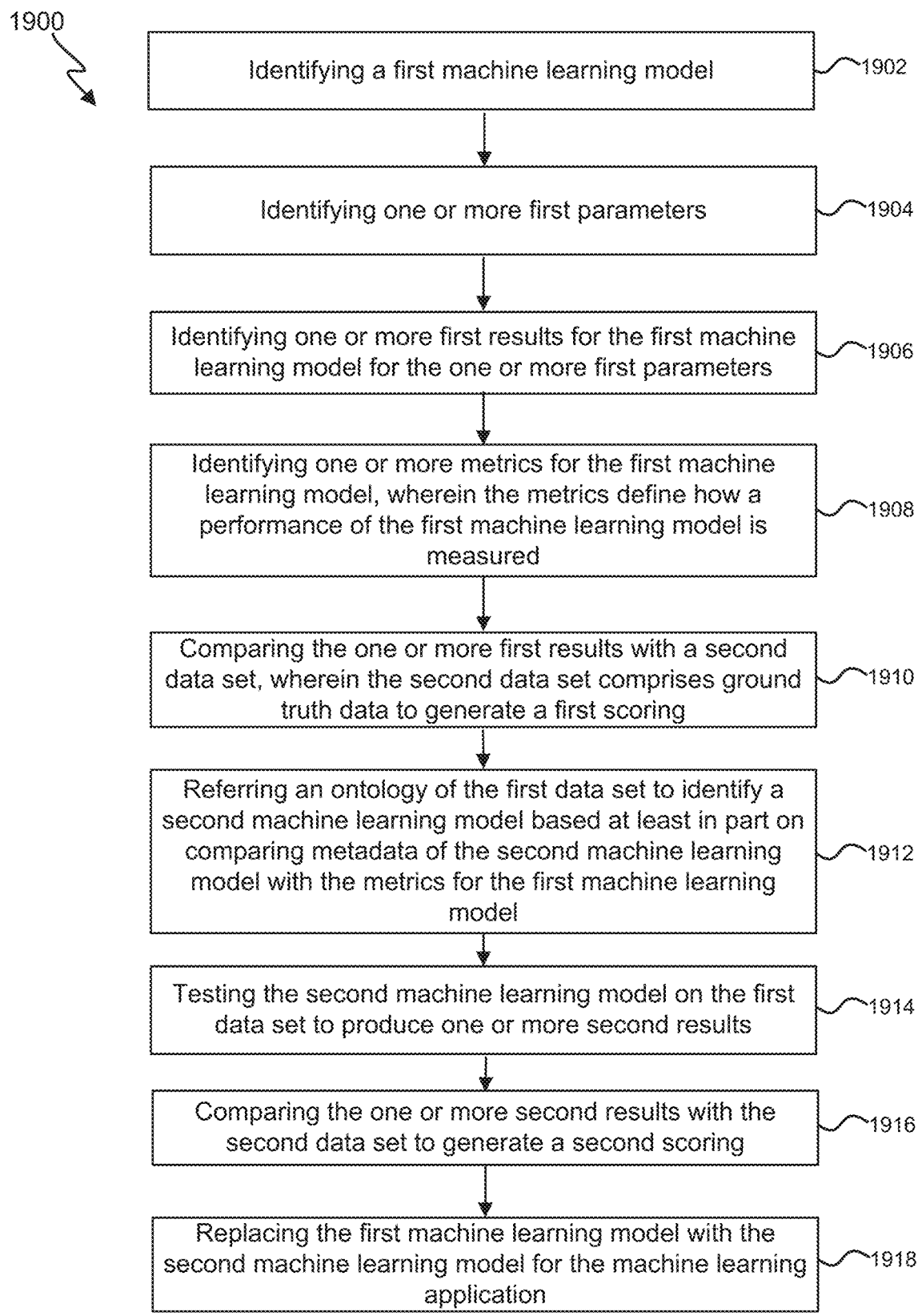
FIG. 19 illustrates an exemplary flow chart for an adaptive pipeline composition service.

FIG. 19 illustrates a process 1900 for techniques automatically composing a machine learning pipeline for use in a production environment executed as a background process of a machine learning application. Alternative embodiments may vary in function by combining, separating, or otherwise varying the functionality described in the blocks illustrated in FIG. 19. Means for performing the functionality of one or more of the blocks illustrated in FIG. 19 may comprise hardware and/or software components of a distributed system including computing devices, storage devices, network infrastructure, and servers illustrated in FIGS. 20, 21, and 22 and described below.

This technique can include both a foreground process and a background process. The foreground process can involve using the selected machine learning application to generate results. A background process can also be employed to analyze various aspects of the machine learning model and parameters to determine if the process can be improved resulting in a better prediction for the machine learning application. In addition, the background process can determine if the selected parameters and model slows down the machine learning application to the extent that the output is not meeting the performance requirements as outlined in the service level agreements (SLA). In such cases, the model can be optimized to meet the service level agreement requirements.

At 1902, the functionality can include identifying a first machine learning model. The first machine learning model utilizes one or more first parameters. The one or more first parameters identify and define higher level properties of a first data set prior to a machine learning process.

In machine learning, the term hyperparameter can be used to distinguish from standard model parameters. A machine learning model is the definition of a mathematical formula with a number of parameters that need to be learned from the data. That is the crux of machine learning: fitting a model to the data. This is done through a process known as model training. In other words, by training a model with existing data, we are able to fit the model parameters. However, there is another kind of parameters that cannot be directly learned from the regular training process. These parameters express "higher-level" properties of the model such as its complexity or how fast it should learn. These are called hyperparameters. Hyperparameters are usually fixed before the actual training process begins. A hyperparameter is a configuration that is external to the model and whose value cannot be estimated from data. Hyperparameters are often used in processes to help estimate model parameters.

At 1904, the functionality can include identifying the one or more first parameters that the first machine learning model uses. The one or more first parameters can be specified by the practitioner. The one or more first parameters can often be set using heuristics. The one or more first parameters are often tuned for a given predictive modeling problem. The data scientist may not know the best value for a model hyperparameter on a given problem. Instead the data scientist may use rules of thumb, copy values used on other problems, or search for the best value by trial and error. When a machine learning algorithm is tuned for a specific problem, such as when using a grid search or a random search, then the technique is tuning the hyperparameters of the model or order to discover the parameters of the model that result in the most skillful predictions. Some examples of model hyperparameters include: the learning rate for training a neural network, a number of leaves or depth of a tree, a number of latent factors in a matrix factorization, a number of hidden layers in a deep neural network, and a number of clusters in a k-means clustering At 1906, the functionality can include identifying one or more first results for the first machine learning model. The one for more first results is a solution for the model using the production values for the one or more parameters and the production model. The one or more first results forms a basis for comparing various results as the model and/or parameters are varied in the machine learning application.

At 1908, the functionality can include identifying one or more metrics for the first machine learning model. The metrics define how a performance of the first machine learning model can be measured. The metrics can include KPIs or QoS as described above.

At 1912, the functionality can include comparing the one or more first results with a second data set. The second data set comprises ground truth data. By comparing the first results with ground truth data, the technique can determine how accurate the model is using the selection one or more parameters and the selected model. The comparing the one or more first results with the second data set can calculate a first scoring. The first scoring can be a measurement of the difference between the first results output by the model and ground truth data for the model. The first scoring provides a measurement of the quality of the model under some given metrics, using the one or more first parameters and the first model.

At 1914, the functionality can include referring an ontology of the first data set to identify a second machine learning model based at least in part on comparing metadata of the second machine learning model with the metrics for the first machine learning model. The second machine learning model can be identified to test with the current machine learning model using a background process.

At 1916, the functionality can include testing the second machine learning model on the first data set to produce one or more second results. In a background process, the technique can test the second machine learning model. In this way, the production model is not affected by the testing and evaluation process.

At 1918, the functionality can include comparing the one or more second results with the second data set to generate a second scoring. The second data set comprises ground truth data representing the desired output of the machine learning application. The second scoring provides a measurement of the quality of the model under some given metrics, such as accuracy, of the model using the one or more first parameters and the second machine learning model.

At 1920, the functionality can include based on the second scoring being less than the first scoring, replacing the first machine learning model with the second machine learning model for the machine learning application. If the technique determines that the second machine learning model provides results closer to the ground truth data, the technique can replace the machine learning model used by the machine learning application. In various embodiments, the first machine learning model can be replaced with the second machine learning model in a shadow mode until it the second machine learning model satisfies one or more conditions for auto-promoting the second machine learning model to production.

In various embodiments, the technique can include analyzing the ontology of the first data set to identify one or more second parameters based at least in part on comparing metadata of the first parameters with the metrics for the first machine learning model. The technique can include testing the second machine learning model using the one or more second parameters to produce one or more third results. The technique can include comparing the one or more third results with the second data set to generate a third threshold. The technique can include based on the third threshold being less than the second threshold, replacing the one or more first parameters with the one or more second parameters for the machine learning application.

In various embodiments, the techniques can include generating a log comprising the one or more first parameters, the first machine learning model, the second machine learning model, the one or more first results, and the one or more second results. The technique can include storing the log in a memory.

In various embodiments, the techniques can include analyzing the log to determine one or more patterns.

In various embodiments the techniques can include saving supplemental metadata concerning the second machine learning model based at least in part on the one or more first parameters the one or more second results. In various embodiments, the metadata includes at least one of a number of levels for a decision tree and a number of parameters of an algorithm for the second machine learning model.

It should be appreciated that the specific steps illustrated in FIG. 19 provide particular techniques for generating a machine learning application according to various embodiments of the present disclosure. Other sequences of steps may also be performed according to alternative embodiments. For example, alternative embodiments of the present invention may perform the steps outlined above in a different order. Moreover, the individual steps illustrated in FIG. 19 may include multiple sub-steps that may be performed in various sequences as appropriate to the individual step. Furthermore, additional steps may be added or removed depending on the particular applications. One of ordinary skill in the art would recognize many variations, modifications, and alternatives.

X. Service Execution and Monitoring for Run-Time Service Composition

During the execution of a machine learning service or pipeline, the environment is in constant change and can therefore invalidate the desired state defined by the user. The invalid state could include changes in the environment, data corruption, model performance degradation, and/or the availability of new features. One purpose of the monitoring engine 156 is to provide the model composition engine 132 and the model execution engine 108 with an up-to-date view of the state of the execution environment for the machine learning platform 100 and complying with the QoS specifications defined when the machine learning service was composed.

Machine learning services and their ontologies are defined in deployable service descriptions, which are used by the model composition engine 132 to assemble a composite service to trigger search for the best architectural model for run-time. The architectural model includes a pipeline 136 specifying any microservices routines 140, software modules 144, and infrastructure modules 148 along with any customizations and interdependencies. Multiple QoS parameters (e.g., response time, latency, throughput, reliability, availability, success rate) as associated with a service execution based also on the type of data inputted in the pipeline (volume, velocity), class of pipelines (classifier, recommender system), thereby, service composition with a large number of candidate services is a multi-objective optimization problem that we could solve to automate the run-time adaption. During service composition, multiple services can be combined in a specific order based on their input-output dependencies to produce a desired product graph that besides providing a solution required by a pipeline X with Data Input Y, it is also necessary to ensure fulfillment of end-to-end QoS requirements specified by the product team (KPIs) and the environment we are running. An Execution Engine schedules and invokes machine learning service instances to be composed and served at run-time.

A number of variations and modifications of the disclosed embodiments can also be used. For example, various functions, blocks, and/or software can be distributed over a network, WAN and/or cloud encapsulated. The machine learning software can be run in a distributed fashion also across a network, WAN and/or cloud infrastructure.

XI. Exemplary Hardware and Software Configurations

Figure 20:
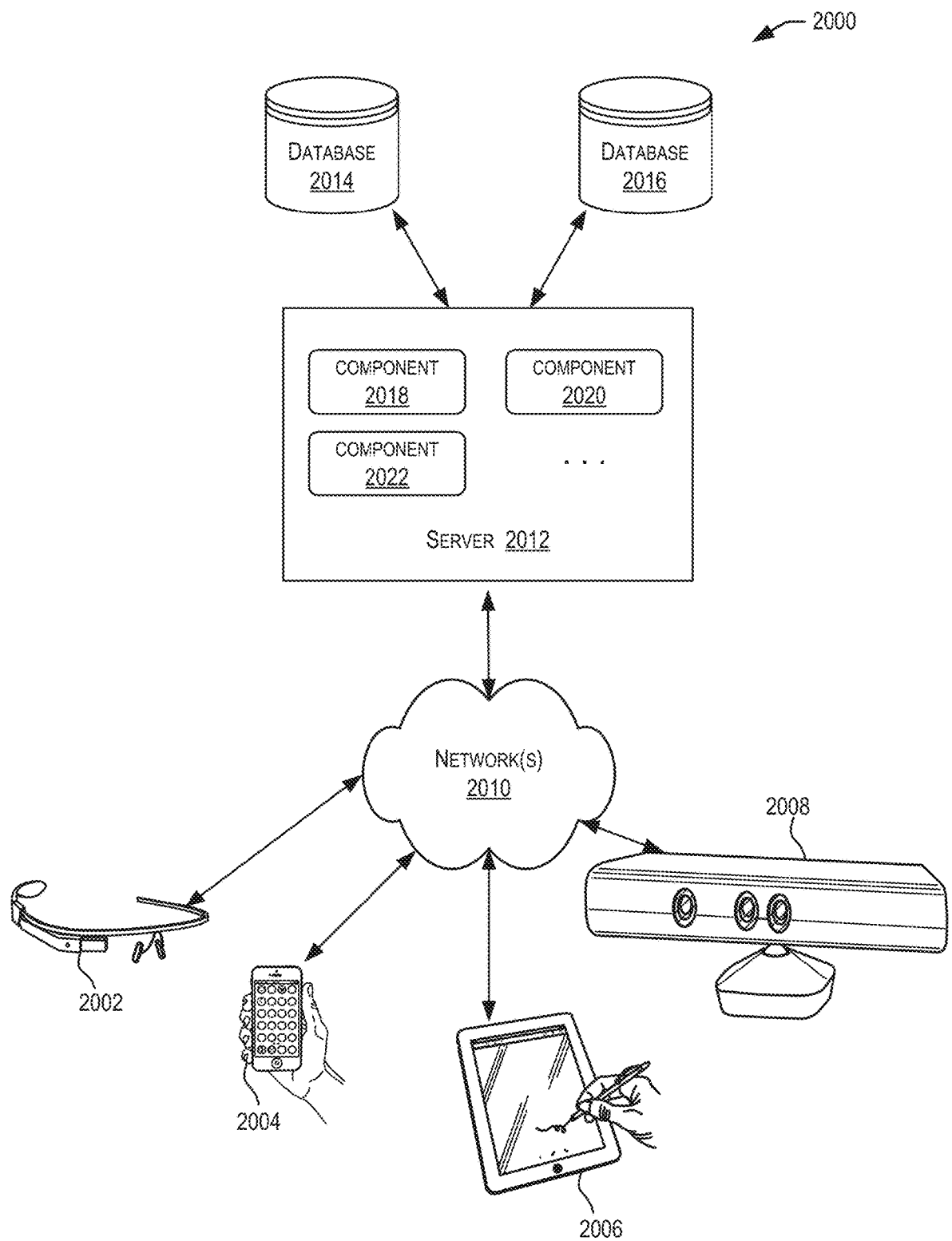
FIG. 20 is a simplified diagram illustrating a distributed system for implementing one of the embodiments.

FIG. 20 depicts a simplified diagram of a distributed system 2000 for implementing one of the embodiments. In the illustrated embodiment, distributed system 2000 includes one or more client computing devices 2002, 2004, 2006, and 2008, which are configured to execute and operate a client application such as a web browser, proprietary client (e.g., Oracle Forms), or the like over one or more network(s) 2010. Server 2012 may be communicatively coupled with remote client computing devices 2002, 2004, 2006, and 2008 via network 2010.

In various embodiments, server 2012 may be adapted to run one or more services or software applications provided by one or more of the components of the system. In some embodiments, these services may be offered as web-based or cloud services or under a Software as a Service (SaaS) model to the users of client computing devices 2002, 2004, 2006, and/or 2008. Users operating client computing devices 2002, 2004, 2006, and/or 2008 may in turn utilize one or more client applications to interact with server 2012 to utilize the services provided by these components.

In the configuration depicted in the figure, the software components 2018, 2020 and 2022 of system 2000 are shown as being implemented on server 2012. In other embodiments, one or more of the components of system 2000 and/or the services provided by these components may also be implemented by one or more of the client computing devices 2002, 2004, 2006, and/or 2008. Users operating the client computing devices may then utilize one or more client applications to use the services provided by these components. These components may be implemented in hardware, firmware, software, or combinations thereof. It should be appreciated that various different system configurations are possible, which may be different from distributed system 2000. The embodiment shown in the figure is thus one example of a distributed system for implementing an embodiment system and is not intended to be limiting.

Client computing devices 2002, 2004, 2006, and/or 2008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 2002, 2004, 2006, and 2008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2010.

Although exemplary distributed system 2000 is shown with four client computing devices, any number of client computing devices may be supported. Other devices, such as devices with sensors, etc., may interact with server 2012.

Network(s) 2010 in distributed system 2000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2010 can be a local area network (LAN), such as one based on Ethernet, Token-Ring and/or the like. Network(s) 2010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 2012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 2012 may be adapted to run one or more services or software applications described in the foregoing disclosure. For example, server 2012 may correspond to a server for performing processing described above according to an embodiment of the present disclosure.

Server 2012 may run an operating system including any of those discussed above, as well as any commercially available server operating system. Server 2012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2012 may include one or more applications to analyze and consolidate data feeds and/or event updates received from users of client computing devices 2002, 2004, 2006, and 2008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2012 may also include one or more applications to display the data feeds and/or real-time events via one or more display devices of client computing devices 2002, 2004, 2006, and 2008.

Distributed system 2000 may also include one or more databases 2014 and 2016. Databases 2014 and 2016 may reside in a variety of locations. By way of example, one or more of databases 2014 and 2016 may reside on a non-transitory storage medium local to (and/or resident in) server 2012. Alternatively, databases 2014 and 2016 may be remote from server 2012 and in communication with server 2012 via a network-based or dedicated connection. In one set of embodiments, databases 2014 and 2016 may reside in a storage-area network (SAN). Similarly, any necessary files for performing the functions attributed to server 2012 may be stored locally on server 2012 and/or remotely, as appropriate. In one set of embodiments, databases 2014 and 2016 may include relational databases, such as databases provided by Oracle, that are adapted to store, update, and retrieve data in response to SQL-formatted commands.

Figure 21:
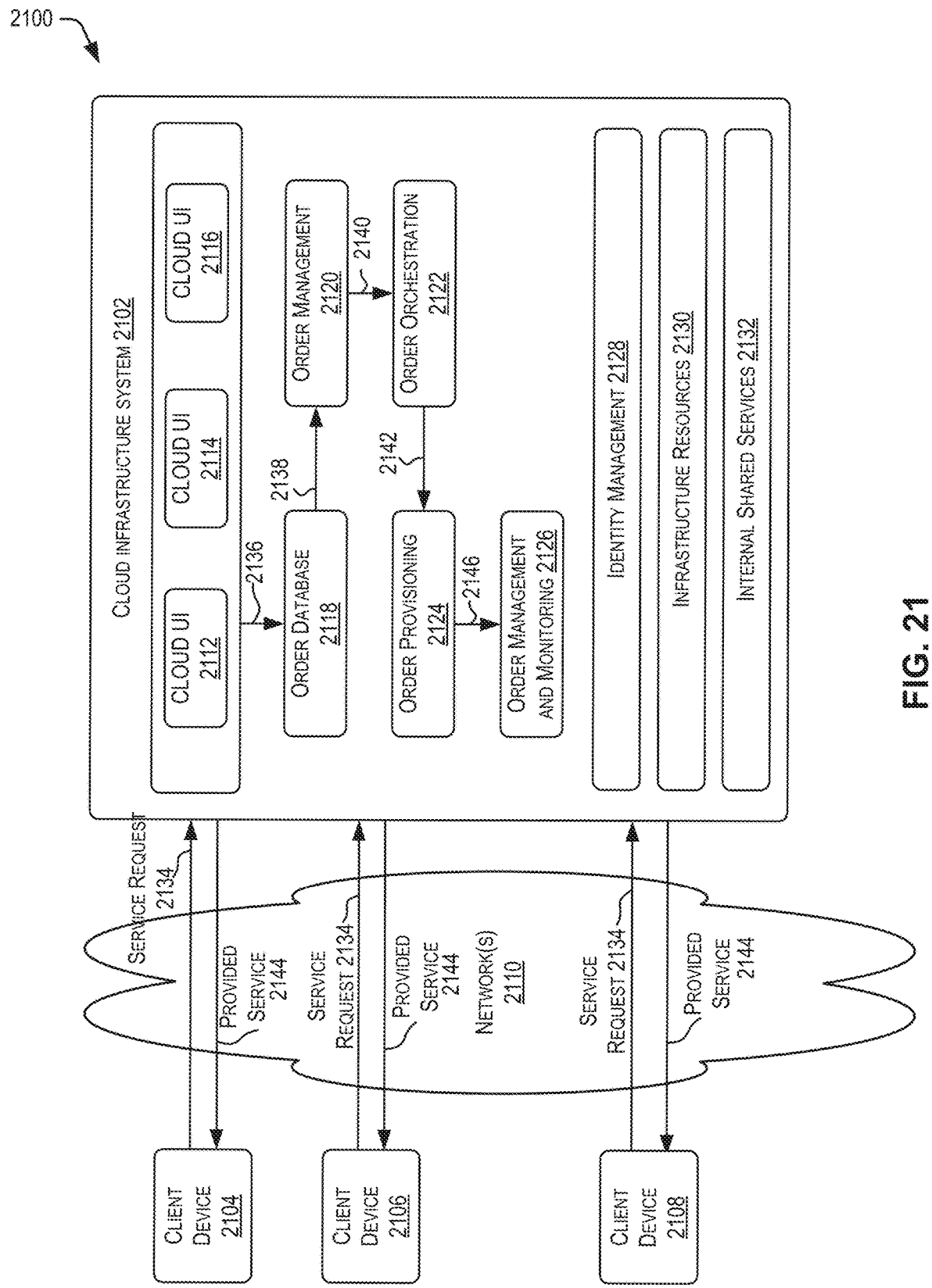
FIG. 21 is a simplified block diagram illustrating one or more components of a system environment.

FIG. 21 is a simplified block diagram of one or more components of a system environment 2100 by which services provided by one or more components of an embodiment system may be offered as cloud services, in accordance with an embodiment of the present disclosure. In the illustrated embodiment, system environment 2100 includes one or more client computing devices 2104, 2106, and 2108 that may be used by users to interact with a cloud infrastructure system 2102 that provides cloud services. The client computing devices may be configured to operate a client application such as a web browser, a proprietary client application (e.g., Oracle Forms), or some other application, which may be used by a user of the client computing device to interact with cloud infrastructure system 2102 to use services provided by cloud infrastructure system 2102.

It should be appreciated that cloud infrastructure system 2102 depicted in the figure may have other components than those depicted. Further, the embodiment shown in the figure is only one example of a cloud infrastructure system that may incorporate an embodiment of the invention. In some other embodiments, cloud infrastructure system 2102 may have more or fewer components than shown in the figure, may combine two or more components, or may have a different configuration or arrangement of components.

Client computing devices 2104, 2106, and 2108 may be devices similar to those described above for 2002, 2004, 2006, and 2008.

Although exemplary system environment 2100 is shown with three client computing devices, any number of client computing devices may be supported. Other devices such as devices with sensors, etc. may interact with cloud infrastructure system 2102.

Network(s) 2110 may facilitate communications and exchange of data between clients 2104, 2106, and 2108 and cloud infrastructure system 2102. Each network may be any type of network familiar to those skilled in the art that can support data communications using any of a variety of commercially-available protocols, including those described above for network(s) 410.

Cloud infrastructure system 2102 may comprise one or more computers and/or servers that may include those described above for server 412.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 2102 may be adapted to automatically provision, manage and track a customer's subscription to services offered by cloud infrastructure system 2102. Cloud infrastructure system 2102 may provide the cloud services via different deployment models. For example, services may be provided under a public cloud model in which cloud infrastructure system 2102 is owned by an organization selling cloud services (e.g., owned by Oracle) and the services are made available to the general public or different industry enterprises. As another example, services may be provided under a private cloud model in which cloud infrastructure system 2102 is operated solely for a single organization and may provide services for one or more entities within the organization. The cloud services may also be provided under a community cloud model in which cloud infrastructure system 2102 and the services provided by cloud infrastructure system 2102 are shared by several organizations in a related community. The cloud services may also be provided under a hybrid cloud model, which is a combination of two or more different models.

In some embodiments, the services provided by cloud infrastructure system 2130 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2102. Cloud infrastructure system 2102 then performs processing to provide the services in the customer's subscription order.

In some embodiments, the services provided by cloud infrastructure system 2102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2102 may also include infrastructure resources 2130 for providing the resources used to provide various services to customers of the cloud infrastructure system. In one embodiment, infrastructure resources 2130 may include pre-integrated and optimized combinations of hardware, such as servers, storage, and networking resources to execute the services provided by the PaaS platform and the SaaS platform.

In some embodiments, resources in cloud infrastructure system 2102 may be shared by multiple users and dynamically re-allocated per demand. Additionally, resources may be allocated to users in different time zones. For example, cloud infrastructure system 2130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2132 may be provided that are shared by different components or modules of cloud infrastructure system 2102 and by the services provided by cloud infrastructure system 2102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2102, and the like.

In one embodiment, as depicted in the figure, cloud management functionality may be provided by one or more modules, such as an order management module 2120, an order orchestration module 2122, an order provisioning module 2124, an order management and monitoring module 2126, and an identity management module 2128. These modules may include or be provided using one or more computers and/or servers, which may be general purpose computers, specialized server computers, server farms, server clusters, or any other appropriate arrangement and/or combination.

In exemplary operation 2134, a customer using a client device, such as client device 2104, 2106 or 2108, may interact with cloud infrastructure system 2102 by requesting one or more services provided by cloud infrastructure system 2102 and placing an order for a subscription for one or more services offered by cloud infrastructure system 2102. In certain embodiments, the customer may access a cloud User Interface (UI), cloud UI 2112, cloud UI 2114 and/or cloud UI 2116 and place a subscription order via these UIs. The order information received by cloud infrastructure system 2102 in response to the customer placing an order may include information identifying the customer and one or more services offered by the cloud infrastructure system 2102 that the customer intends to subscribe to.

After an order has been placed by the customer, the order information is received via the cloud UIs, 2112, 2114 and/or 2116.

At operation 2136, the order is stored in order database 2118. Order database 2118 can be one of several databases operated by cloud infrastructure system and operated in conjunction with other system elements.

At operation 2138, the order information is forwarded to an order management module 2120. In some instances, order management module 2120 may be configured to perform billing and accounting functions related to the order, such as verifying the order, and upon verification, booking the order.

At operation 2140, information regarding the order is communicated to an order orchestration module 2122. Order orchestration module 2122 may utilize the order information to orchestrate the provisioning of services and resources for the order placed by the customer. In some instances, order orchestration module 2122 may orchestrate the provisioning of resources to support the subscribed services using the services of order provisioning module 2124.

In certain embodiments, order orchestration module 2122 enables the management of processes associated with each order and applies logic to determine whether an order should proceed to provisioning. At operation 2142, upon receiving an order for a new subscription, order orchestration module 2122 sends a request to order provisioning module 2124 to allocate resources and configure those resources needed to fulfill the subscription order. Order provisioning module 2124 enables the allocation of resources for the services ordered by the customer. Order provisioning module 2124 provides a level of abstraction between the cloud services provided by cloud infrastructure system 2100 and the physical implementation layer that is used to provision the resources for providing the requested services. Order orchestration module 2122 may thus be isolated from implementation details, such as whether or not services and resources are actually provisioned on the fly or pre-provisioned and only allocated/assigned upon request.

At operation 2144, once the services and resources are provisioned, a notification of the provided service may be sent to customers on client devices 2104, 2106 and/or 2108 by order provisioning module 2124 of cloud infrastructure system 2102.

At operation 2146, the customer's subscription order may be managed and tracked by an order management and monitoring module 2126. In some instances, order management and monitoring module 2126 may be configured to collect usage statistics for the services in the subscription order, such as the amount of storage used, the amount data transferred, the number of users, and the amount of system up time and system down time.

In certain embodiments, cloud infrastructure system 2100 may include an identity management module 2128. Identity management module 2128 may be configured to provide identity services, such as access management and authorization services in cloud infrastructure system 2100. In some embodiments, identity management module 2128 may control information about customers who wish to utilize the services provided by cloud infrastructure system 2102. Such information can include information that authenticates the identities of such customers and information that describes which actions those customers are authorized to perform relative to various system resources (e.g., files, directories, applications, communication ports, memory segments, etc.) Identity management module 2128 may also include the management of descriptive information about each customer and about how and by whom that descriptive information can be accessed and modified.

Figure 22:
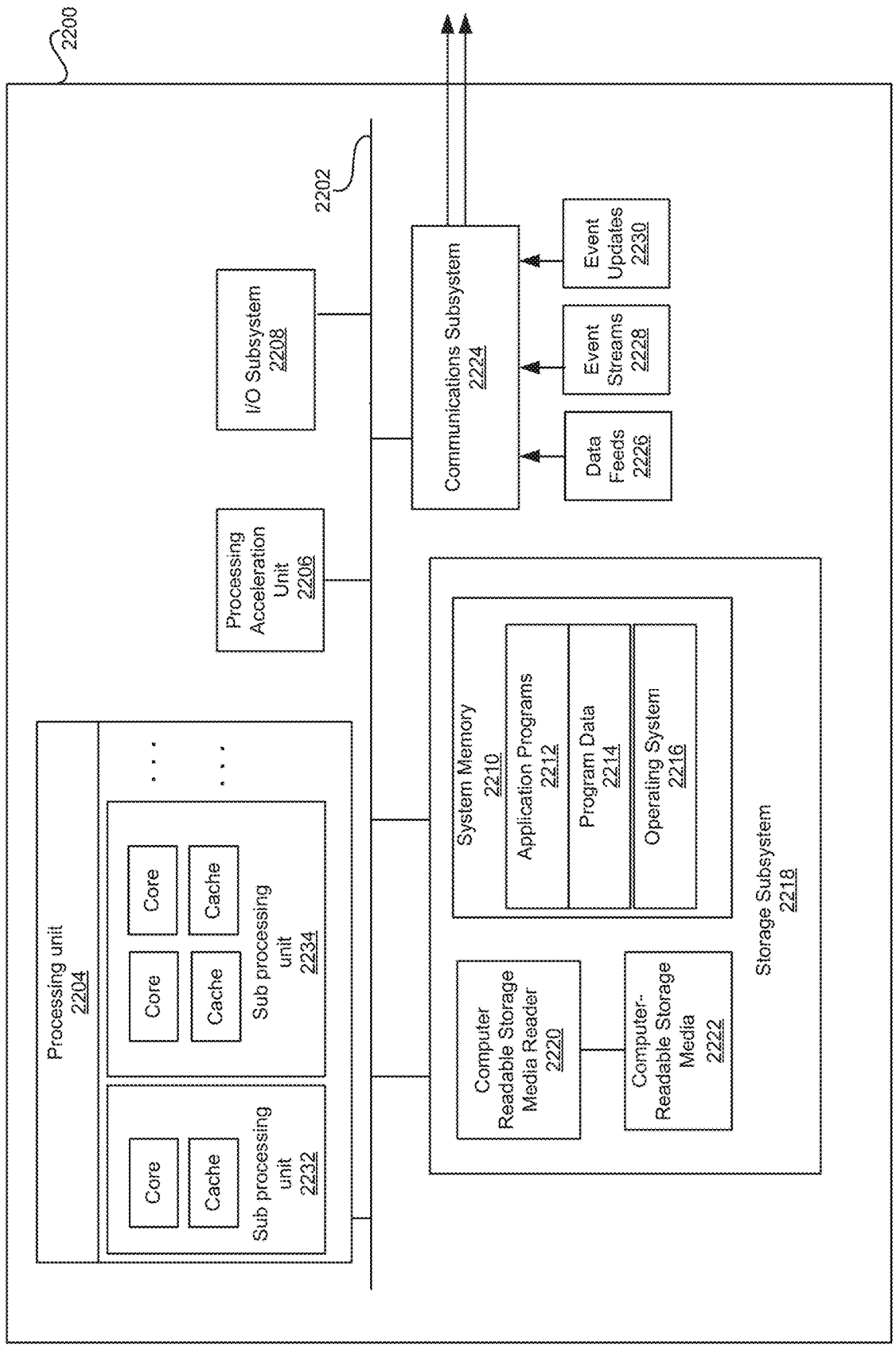
FIG. 22 illustrates an exemplary computer system, in which various embodiments of the present invention may be implemented.

FIG. 22 illustrates an exemplary computer system 2200, in which various embodiments of the present invention may be implemented. The system 2200 may be used to implement any of the computer systems described above. As shown in the figure, computer system 2200 includes a processing unit 2204 that communicates with a number of peripheral subsystems via a bus subsystem 2202. These peripheral subsystems may include a processing acceleration unit 2206, an I/O subsystem 2208, a storage subsystem 2218 and a communications subsystem 2224. Storage subsystem 2218 includes tangible computer-readable storage media 2222 and a system memory 2210.

Bus subsystem 2202 provides a mechanism for letting the various components and subsystems of computer system 2200 communicate with each other as intended. Although bus subsystem 2202 is shown schematically as a single bus, alternative embodiments of the bus subsystem may utilize multiple buses. Bus subsystem 2202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2204, which can be implemented as one or more integrated circuits (e.g., a conventional microprocessor or microcontroller), controls the operation of computer system 2200. One or more processors may be included in processing unit 2204. These processors may include single core or multicore processors. In certain embodiments, processing unit 2204 may be implemented as one or more independent processing units 2232 and/or 2234 with single or multicore processors included in each processing unit. In other embodiments, processing unit 2204 may also be implemented as a quad-core processing unit formed by integrating two dual-core processors into a single chip.

In various embodiments, processing unit 2204 can execute a variety of programs in response to program code and can maintain multiple concurrently executing programs or processes. At any given time, some or all of the program code to be executed can be resident in processor(s) 2204 and/or in storage subsystem 2218. Through suitable programming, processor(s) 2204 can provide various functionalities described above. Computer system 2200 may additionally include a processing acceleration unit 2206, which can include a digital signal processor (DSP), a special-purpose processor, and/or the like.

I/O subsystem 2208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2200 may comprise a storage subsystem 2218 that comprises software elements, shown as being currently located within a system memory 2210. System memory 2210 may store program instructions that are loadable and executable on processing unit 2204, as well as data generated during the execution of these programs.

Depending on the configuration and type of computer system 2200, system memory 2210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2204. In some implementations, system memory 2210 may include multiple different types of memory, such as static random access memory (SRAM) or dynamic random access memory (DRAM). In some implementations, a basic input/output system (BIOS), containing the basic routines that help to transfer information between elements within computer system 2200, such as during start-up, may typically be stored in the ROM. By way of example, and not limitation, system memory 2210 also illustrates application programs 2212, which may include client applications, Web browsers, mid-tier applications, relational database management systems (RDBMS), etc., program data 2214, and an operating system 2216. By way of example, operating system 2216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2218 may also provide a tangible computer-readable storage medium for storing the basic programming and data constructs that provide the functionality of some embodiments. Software (programs, code modules, instructions) that when executed by a processor provide the functionality described above may be stored in storage subsystem 2218. These software modules or instructions may be executed by processing unit 2204. Storage subsystem 2218 may also provide a repository for storing data used in accordance with the present invention.

Storage subsystem 2218 may also include a computer-readable storage media reader 2220 that can further be connected to computer-readable storage media 2222. Together and, optionally, in combination with system memory 2210, computer-readable storage media 2222 may comprehensively represent remote, local, fixed, and/or removable storage devices plus storage media for temporarily and/or more permanently containing, storing, transmitting, and retrieving computer-readable information.

Computer-readable storage media 2222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2200.

By way of example, computer-readable storage media 2222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2222 may include, but is not limited to, Zip® drives, flash memory cards, universal serial bus (USB) flash drives, secure digital (SD) cards, DVD disks, digital video tape, and the like. Computer-readable storage media 2222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2200.

Communications subsystem 2224 provides an interface to other computer systems and networks. Communications subsystem 2224 serves as an interface for receiving data from and transmitting data to other systems from computer system 2200. For example, communications subsystem 2224 may enable computer system 2200 to connect to one or more devices via the Internet. In some embodiments communications subsystem 2224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 2224 can provide wired network connectivity (e.g., Ethernet) in addition to or instead of a wireless interface.

In some embodiments, communications subsystem 2224 may also receive input communication in the form of structured and/or unstructured data feeds 2226, event streams 2228, event updates 2230, and the like on behalf of one or more users who may use computer system 2200.

By way of example, communications subsystem 2224 may be configured to receive data feeds 2226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2224 may also be configured to receive data in the form of continuous data streams, which may include event streams 2228 of real-time events and/or event updates 2230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2224 may also be configured to output the structured and/or unstructured data feeds 2226, event streams 2228, event updates 2230, and the like to one or more databases that may be in communication with one or more streaming data source computers coupled to computer system 2200.

Computer system 2200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for automatically composing a machine learning pipeline for use in a production environment executed as a background process of a machine learning application, the method comprising:
identifying a first machine learning model, wherein the first machine learning model utilizes one or more first parameters, wherein the one or more first parameters identify and define properties of the first machine learning model;
identifying the one or more first parameters that affect a speed or a quality of a learning process of the first machine learning model;

generating one or more first results for a first data set as an input to the first machine learning model and a subset of the one or more first parameters;
identifying one or more metrics for the first machine learning model, wherein the metrics define how a performance of the first machine learning model is measured;
comparing the one or more first results with a second data set to calculate a first scoring based at least in part on a difference in the one or more first results with the second data set, wherein the second data set comprises ground truth data;
analyzing the first data set to identify an ontology;
using the ontology of the first data set to identify a second machine learning model based at least in part on comparing first metadata of the second machine learning model with second metadata for the first machine learning model;
testing the second machine learning model on the first data set to produce one or more second results;
comparing the one or more second results with the second data set to generate a second scoring; and
based on the second scoring being less than the first scoring, replacing the first machine learning model with the second machine learning model for the machine learning application.

2. The method of claim 1, further comprising:
analyzing the ontology of the first data set to identify one or more second parameters based at least in part on comparing metadata of the first parameters with the metrics for the first machine learning model;
testing the second machine learning model using the one or more second parameters to produce one or more third results;
comparing the one or more third results with the second data set to generate a third scoring; and
based on the third scoring being less than the second scoring, replacing the one or more first parameters with the one or more second parameters for the machine learning application.

3. The method of claim 1, wherein the replacing the first machine learning model is replaced with the second machine learning model in a shadow mode until it the second machine learning model satisfies one or more conditions for auto-promoting the second machine learning model to production.

4. The method of claim 1, further comprising:
generating a log comprising the one or more first parameters, the first machine learning model, the second machine learning model, the one or more first results, and the one or more second results; and
storing the log in a memory.

5. The method of claim 4, further comprising analyzing the log to determine one or more patterns.

6. The method of claim 4, further comprising saving supplemental metadata concerning the second machine learning model, wherein the supplemental metadata includes at least the one or more first parameters the one or more second results.

7. The method of claim 1, wherein the first metadata comprises at least one of a number of levels for a decision tree and a number of parameters of an algorithm for the second machine learning model.

8. A computer-program product tangibly embodied in a non-transitory machine-readable storage medium, including instructions configured to cause a data processing apparatus to perform operations for automatically composing a machine learning pipeline for use in a production environment executed as a background process of a machine learning application, the operations comprising:
identifying a first machine learning model, wherein the first machine learning model utilizes one or more first parameters, wherein the one or more first parameters identify and define properties of the first machine learning model;
identifying the one or more first parameters that affect a speed or a quality of a learning process of the first machine learning model;
generating one or more first results for a first data set as an input to the first machine learning model and a subset of the one or more first parameters;
identifying one or more metrics for the first machine learning model, wherein the metrics define how a performance of the first machine learning model is measured;
comparing the one or more first results with a second data set to calculate a first scoring based at least in part on a difference in the one or more first results with the second data set, wherein the second data set comprises ground truth data;
analyzing the first data set to identify an ontology;
using the ontology of the first data set to identify a second machine learning model based at least in part on comparing first metadata of the second machine learning model with second metadata for the first machine learning model;
testing the second machine learning model on the first data set to produce one or more second results;
comparing the one or more second results with the second data set to generate a second scoring; and
based on the second scoring being less than the first scoring, replacing the first machine learning model with the second machine learning model for the machine learning application.

9. The computer-program product of claim 8, including instructions configured to cause a data processing apparatus to perform further operations comprising:
analyzing the ontology of the first data set to identify one or more second parameters based at least in part on comparing metadata of the first parameters with the metrics for the first machine learning model;
testing the second machine learning model using the one or more second parameters to produce one or more third results;
comparing the one or more third results with the second data set to generate a third scoring; and
based on the third scoring being less than the second scoring, replacing the one or more first parameters with the one or more second parameters for the machine learning application.

10. The computer-program product of claim 8, wherein the replacing the first machine learning model is replaced by the second machine learning model in a shadow mode until the second machine learning model satisfies one or more conditions for auto-promoting the second machine learning model to production.

11. The computer-program product of claim 8, including instructions configured to cause a data processing apparatus to perform further operations comprising:
generating a log comprising the one or more first parameters, the first machine learning model, the second machine learning model, the one or more first results, and the one or more second results; and
storing the log in a memory.

12. The computer-program product of claim 11, including instructions configured to cause a data processing apparatus to perform further operations comprising analyzing the log to determine one or more patterns.

13. The computer-program product of claim 11, including instructions configured to cause a data processing apparatus to perform further operations comprising saving supplemental metadata concerning the second machine learning model based at least in part on the one or more first parameters the one or more second results.

14. The computer-program product of claim 8, wherein the first metadata comprises at least one of a number of levels for a decision tree and a number of parameters of an algorithm for the second machine learning model.

15. A system for automatically composing a machine learning pipeline for use in a production environment executed as a background process of a machine learning application, comprising:
one or more data processors; and
a non-transitory computer-readable storage medium containing instructions which, when executed on the one or more data processors, cause the one or more data processors to perform operations comprising:
identifying a first machine learning model, wherein the first machine learning model utilizes one or more first parameters, wherein the one or more first parameters identify and define properties of the first machine learning model;
identifying the one or more first parameters that affect a speed or a quality of a learning process of the first machine learning model;
generating one or more first results for a first data set as an input to the first machine learning model and a subset of the one or more first parameters;
identifying one or more metrics for the first machine learning model, wherein the metrics define how a performance of the first machine learning model is measured;
comparing the one or more first results with a second data set to calculate a first scoring based at least in part on a difference in the one or more first results with the second data set, wherein the second data set comprises ground truth data;
analyzing the first data set to identify an ontology;
using the ontology of the first data set to identify a second machine learning model based at least in part on comparing first metadata of the second machine learning model with second metadata for the first machine learning model;
testing the second machine learning model on the first data set to produce one or more second results;
comparing the one or more second results with the second data set to generate a second scoring; and
based on the second scoring being less than the first scoring, replacing the first machine learning model with the second machine learning model for the machine learning application.

16. The system of claim 15, wherein the non-transitory computer-readable storage medium includes further instructions which, when executed on the one or more data processors, cause the one or more data processors to perform further operations comprising:
analyzing the ontology of the first data set to identify one or more second parameters based at least in part on comparing metadata of the first parameters with the metrics for the first machine learning model;
testing the second machine learning model using the one or more second parameters to produce one or more third results;
comparing the one or more third results with the second data set to generate a third scoring; and
based on the third scoring being less than the second scoring, replacing the one or more first parameters with the one or more second parameters for the machine learning application.

17. The system of claim 15, wherein the replacing the first machine learning model is replaced by the second machine learning model in a shadow mode until the second machine learning model satisfies one or more conditions for auto-promoting the second machine learning model to production.

18. The system of claim 15, wherein the non-transitory computer-readable storage medium includes further instructions which, when executed on the one or more data processors, cause the one or more data processors to perform further operations comprising:
generating a log comprising the one or more first parameters, the first machine learning model, the second machine learning model, the one or more first results, and the one or more second results; and
storing the log in a memory.

19. The system of claim 18, wherein the a non-transitory computer-readable storage medium includes further instructions which, when executed on the one or more data processors, cause the one or more data processors to perform further operations comprising saving supplemental metadata concerning the second machine learning model based at least in part on the one or more first parameters the one or more second results.

20. The system of claim 15, wherein the first metadata comprises at least one of a number of levels for a decision tree and a number of parameters of an algorithm for the second machine learning model.

\* \* \* \* \*

UNITED STATES PATENT AND TRADEMARK OFFICE
CERTIFICATE OF CORRECTION

PATENT NO. : 11,625,648 B2
APPLICATION NO. : 16/892935
DATED : April 11, 2023
INVENTOR(S) : Polleri et al.

It is certified that error appears in the above-identified patent and that said Letters Patent is hereby corrected as shown below:

On the Title Page

On page 2, Column 2, under Other Publications, Line 7, delete "Allow ance" and insert
-- Allowance --, therefor.

On page 2, Column 2, under Other Publications, Line 28, delete "H20" and insert -- H2O --, therefor.

In the Drawings

On sheet 3 of 22, in FIG. 3, under Reference Numeral 306, Line 1, delete "(w" and insert -- (with --, therefor.

On sheet 7 of 22, in FIG. 7, under Reference Numeral 708, Line 2, delete "one of" and insert -- one or --, therefor.

On sheet 12 of 22, in FIG. 12, under Reference Numeral 1202, Line 1, delete "RETREIVE" and insert -- RETRIEVE --, therefor.

On sheet 12 of 22, in FIG. 12, under Reference Numeral 1203, Line 1, delete "RETREIVE" and insert -- RETRIEVE --, therefor.

On sheet 17 of 22, in FIG. 17, under Reference Numeral 1708, Line 2, delete "one of" and insert -- one or --, therefor.

On sheet 17 of 22, in FIG. 17, under Reference Numeral 1712, Line 1, delete "one of" and insert -- one or --, therefor.

On sheet 17 of 22, in FIG. 17, under Reference Numeral 1714, Line 1, delete "on the on the" and insert -- on the --, therefor.

Signed and Sealed this
Thirteenth Day of February, 2024

Katherine Kelly Vidal
*Director of the United States Patent and Trademark Office*

CERTIFICATE OF CORRECTION (continued)
U.S. Pat. No. 11,625,648 B2

In the Specification

In Column 3, Line 39, delete "embodiments" and insert -- embodiments. --, therefor.

In Column 25, Line 65, delete "of more" and insert -- or more --, therefor.

In Column 35, Line 62, delete "of more" and insert -- or more --, therefor.

In Column 47, Line 55, delete "Internet" and insert -- Internetwork --, therefor.

In Column 47, Line 65, delete "Electronics" and insert -- Electronics Engineers --, therefor.

In Column 48, Line 29, delete "characteristics," and insert -- characteristics), --, therefor.

In Column 55, Line 6, delete "administrator" and insert -- administrator. --, therefor.

In Column 56, Line 20, delete "are can be" and insert -- can be --, therefor.

In Column 64, Line 47, delete "one of" and insert -- one or --, therefor.

In Column 64, Line 57, delete "on the on the" and insert -- on the --, therefor.

In Column 65, Line 27, delete "metrics" and insert -- metrics. --, therefor.

In Column 68, Line 2, delete "clustering" and insert -- clustering. --, therefor.

In Column 69, Line 20, delete "parameters" and insert -- parameters and --, therefor.

In Column 75, Line 15, delete "white list" and insert -- whitelist --, therefor.

In Column 79, Line 56, delete "evolution)," and insert -- evolution)), --, therefor.

In the Claims

In Column 84, Line 41, in Claim 19, delete "the a" and insert -- the --, therefor.

In Column 84, Line 46, in Claim 19, delete "parameters" and insert -- parameters and --, therefor.